Figure 1:
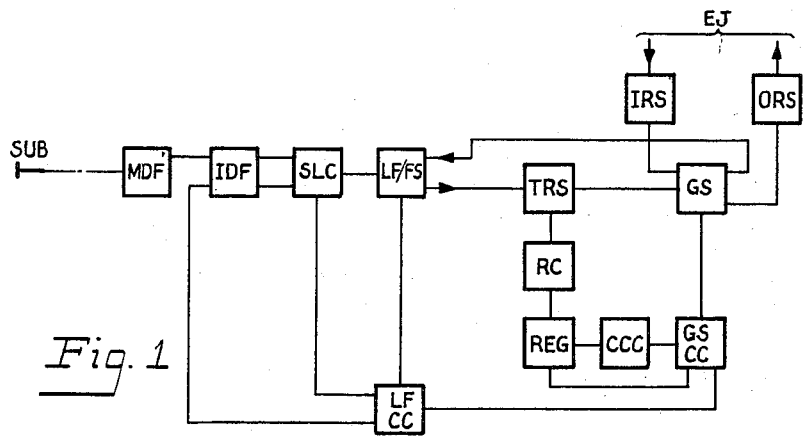

Aug. 28, 1956  L. J. MURRAY ET AL  2,761,012
TELECOMMUNICATION SYSTEMS
Filed Jan. 19, 1953  27 Sheets-Sheet 1

INVENTORS.
Lawrence John Murray; Alan Davison;
Ronald Threadgold & Robin Devenish Allum.

BY
ATTORNEYS

Aug. 28, 1956

L. J. MURRAY ET AL 2,761,012

TELECOMMUNICATION SYSTEMS

Filed Jan. 19, 1953

27 Sheets-Sheet 2

INVENTORS.
Lawrence John Murray; Alan Davison;
Ronald Threadgold & Robin Devenish Allum.

BY

ATTORNEYS

Aug. 28, 1956   L. J. MURRAY ET AL   2,761,012
TELECOMMUNICATION SYSTEMS
Filed Jan. 19, 1953   27 Sheets-Sheet 27
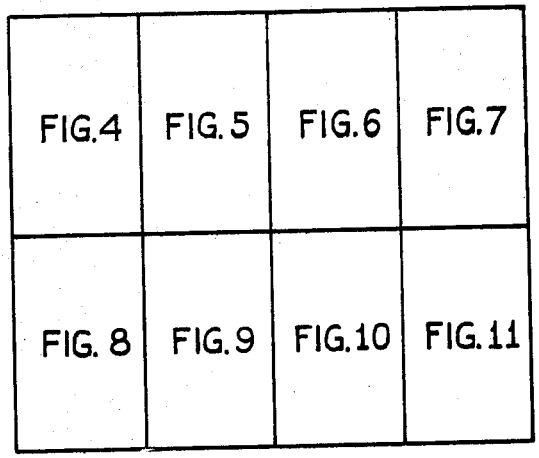
*Fig.* 29
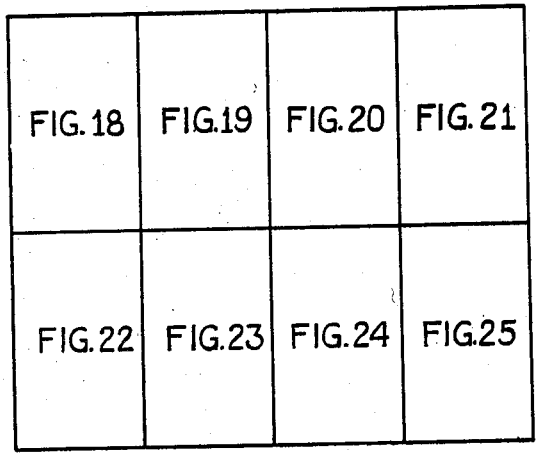
*Fig.* 30
INVENTORS.
Lawrence John Murray; Alan Davison;
Ronald Threadgold & Robin Devenish Allum.
BY
ATTORNEYS

United States Patent Office 2,761,012
Patented Aug. 28, 1956

2,761,012

TELECOMMUNICATION SYSTEMS

Lawrence John Murray, Alan Davison, Ronald Threadgold, and Robin Devenish Allum, Liverpool, England, assignors to Automatic Telephone & Electric Company Limited, Liverpool, England, a British company Application January 19, 1953, Serial No. 331,921

Claims priority, application Great Britain January 26, 1952

14 Claims. (Cl. 179—22)

The present invention relates to automatic telephone systems and while it is more particularly concerned with systems employing switching devices of the crossbar type, certain features have application to systems using other types of switching devices, for instance, electronic or electromechanical.

The main object of the present invention is the provision of improved electronic means for controlling the switching devices in automatic telephone exchanges while other objects are directed to the provision of improved electronic devices for use in telephone systems generally.

According to one feature of the invention, in a telephone system employing crossbar switches for completing connections between subscribers' lines the operating windings of the select and bridge magnets of the crossbar switches are arranged to be energised by current flow through associated gas discharge tubes which are adapted to be struck under the control of equipment common to a plurality of switches, the bridge magnets being maintained operated by a circuit local to the switch.

According to another feature of the invention, in a telephone system having a plurality of switching stages each consisting of primary and secondary crossbar switches connected by link circuits a connection is set up through a switching stage by marking all available paths from a primary switch to the secondary switches, by selecting one of said available paths and by causing the operation of the secondary switch magnets and the primary switch magnets appropriate to the selected path by current flow through gas discharge tubes associated with the switch magnets.

According to a further feature of the invention, in a telephone system employing crossbar switches for completing connections between subscribers' lines common electronic equipment is provided for controlling the operation of crossbar switch magnets and the switch magnets are individually associated with a gas discharge tube controlled from the common equipment, the arrangement being such that the common equipment is enabled to release upon the striking of the appropriate gas discharge tubes and before the operation of the switch magnets.

According to still a further feature of the invention, in a telephone system, a switching stage for completing speech paths comprising a plurality of primary and secondary crossbar switches arranged for link working the select magnets and bridge magnets controlling the switching operations of said crossbar switches are each associated with a separate gas discharge tube and the setting up of a connection through the switching stage is initiated by control equipment common to the whole or part of that stage, means being provided for enabling the completion of the setting up of the connection to be effected independently of the common control.

According to a final feature of the invention, in a telephone exchange having a plurality of switching stages consisting of primary and secondary crossbar switches connected by link circuits, electronic equipment is provided for the group selecting stage and serves to control the completion of a connection to a wanted line by markings extended directly to common equipment which controls the operation of a final selector stage.

The invention will be better understood from the following description of one embodiment, which should be read in conjunction with the accompanying drawings comprising Figs. 1 to 30.

Figure 2:
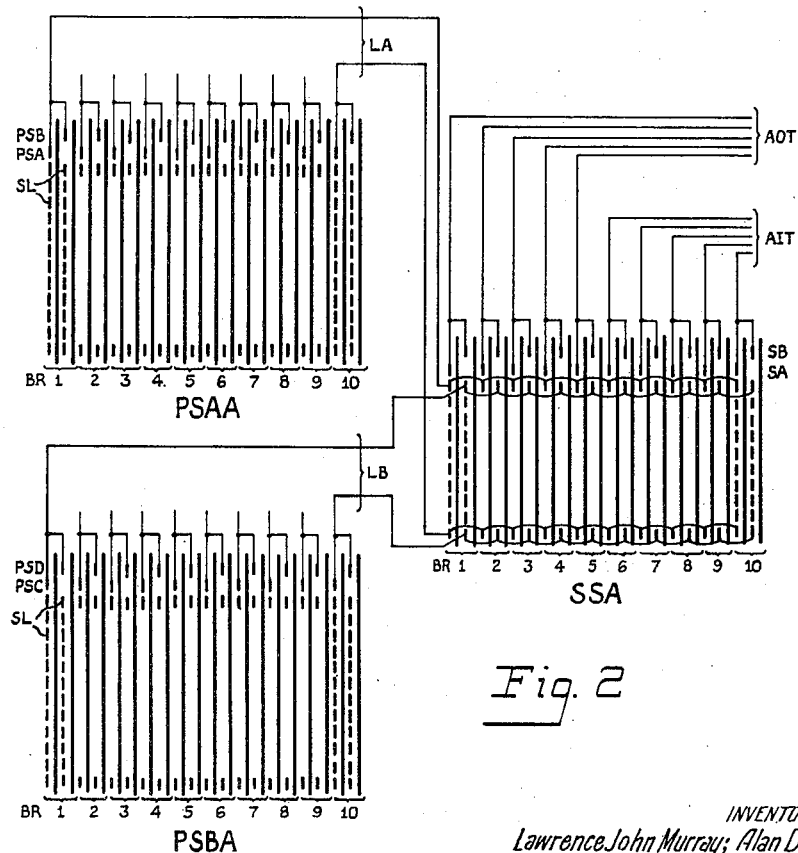
Figure 3:
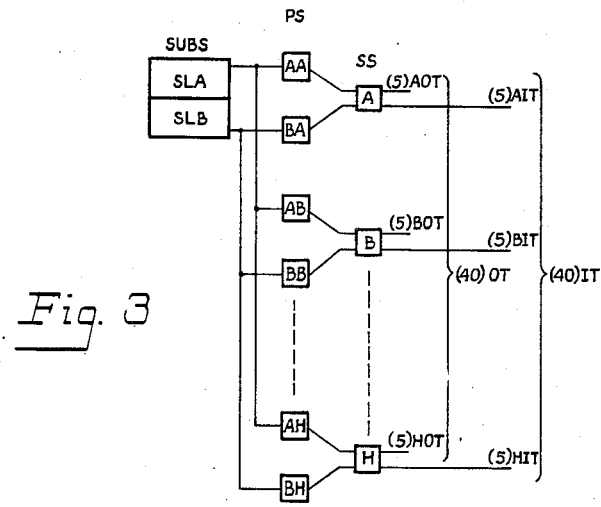
Figure 14:
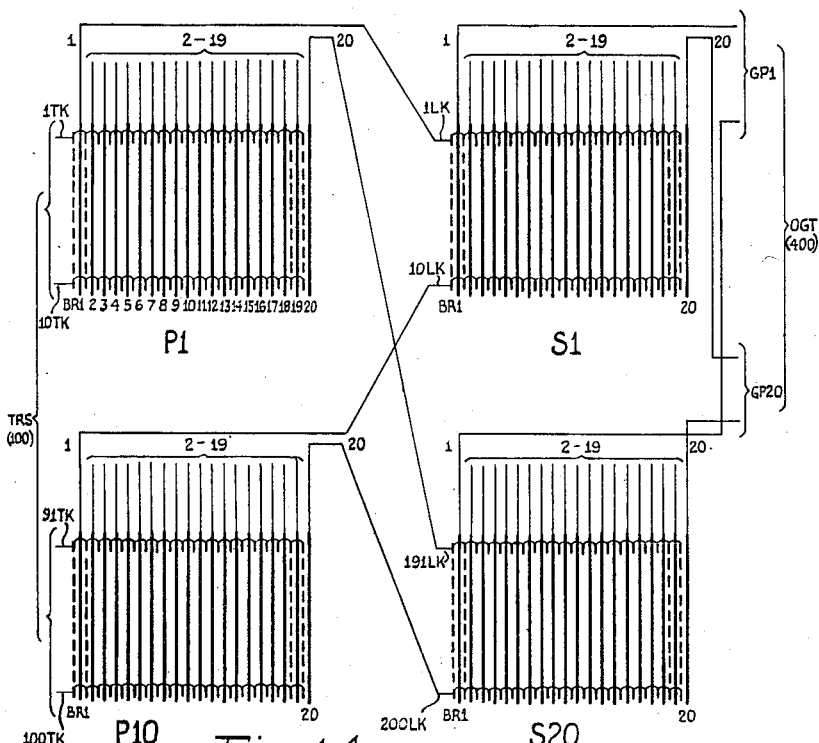
Figure 4:
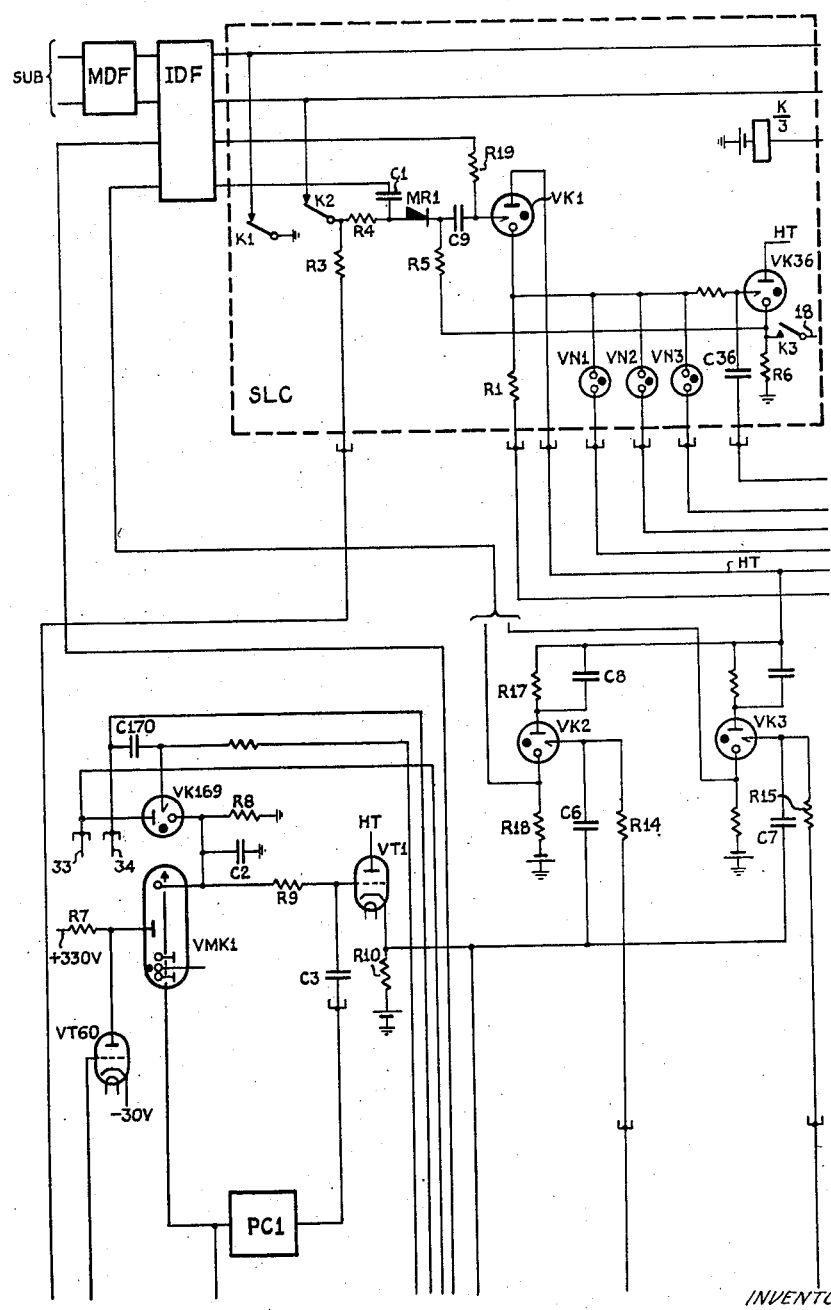
Figure 5:
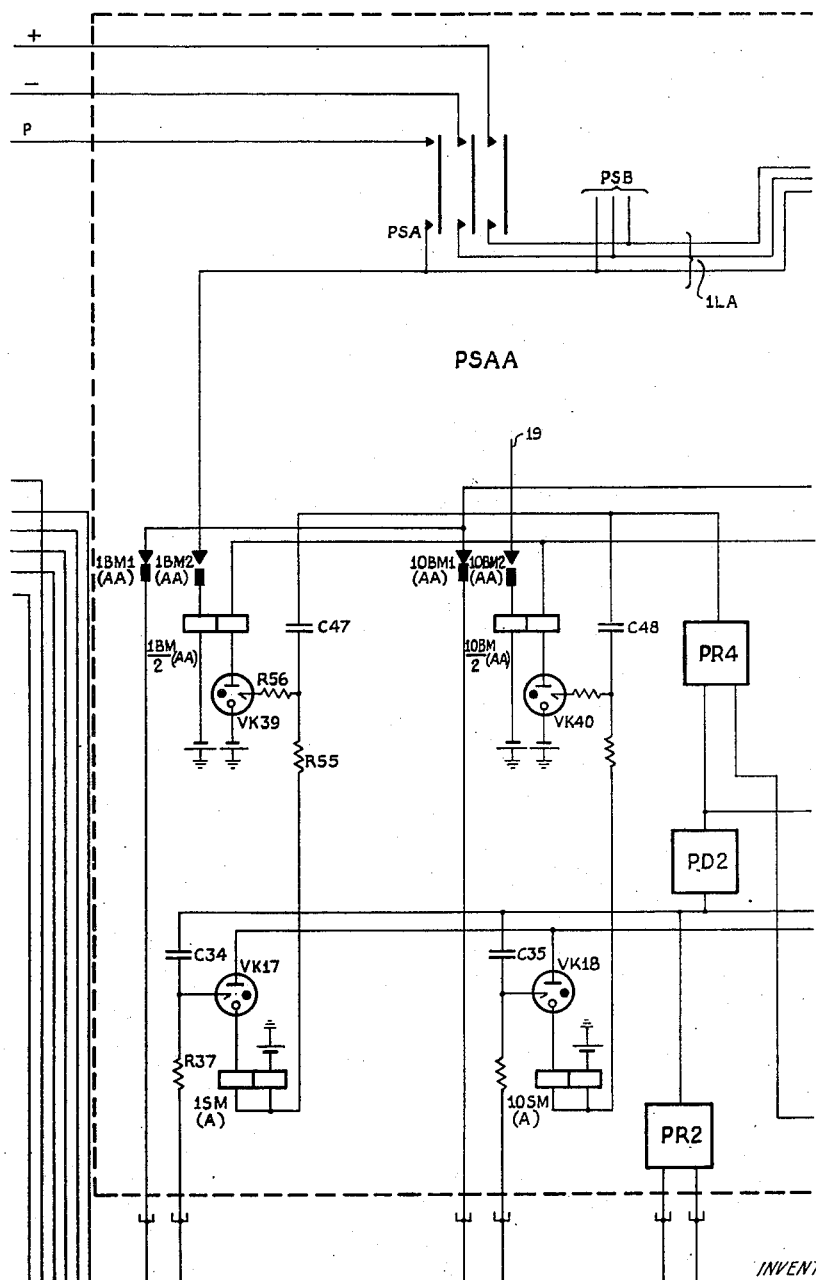
Figure 12:
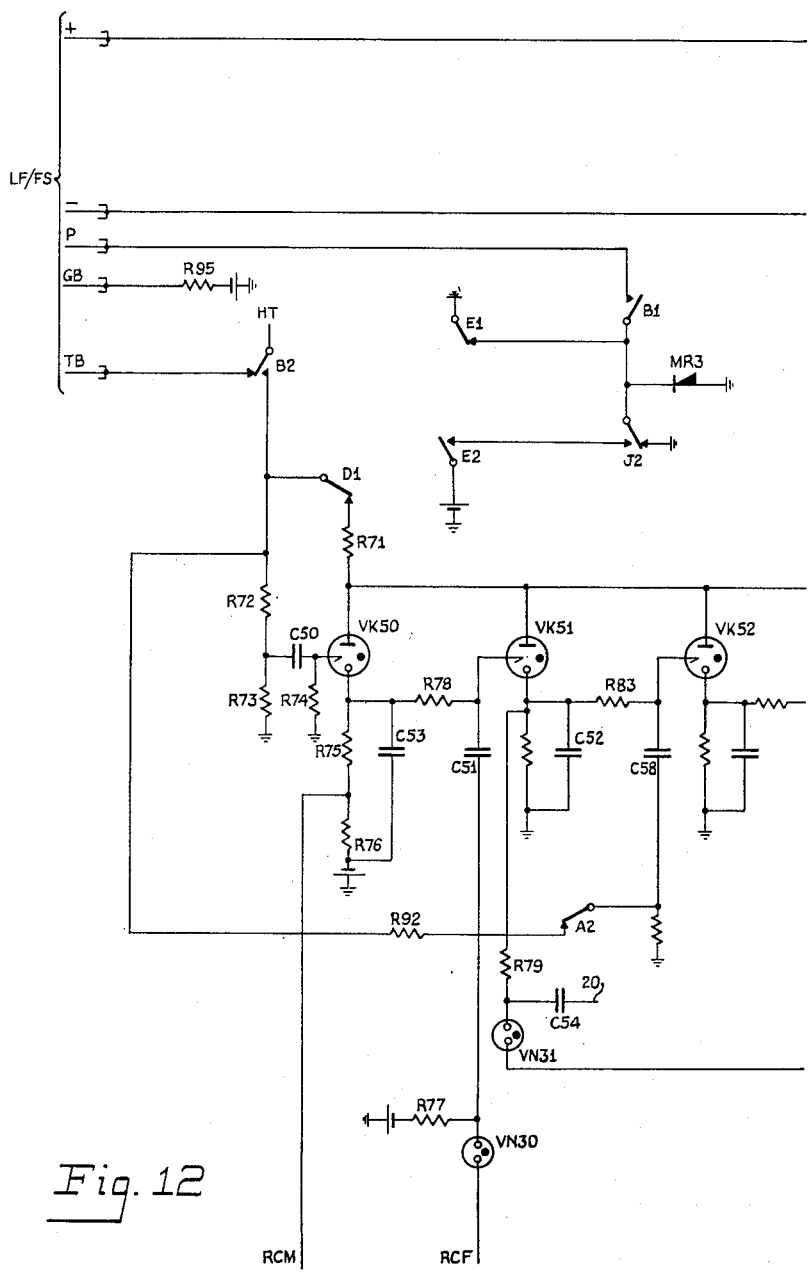
Figure 13:
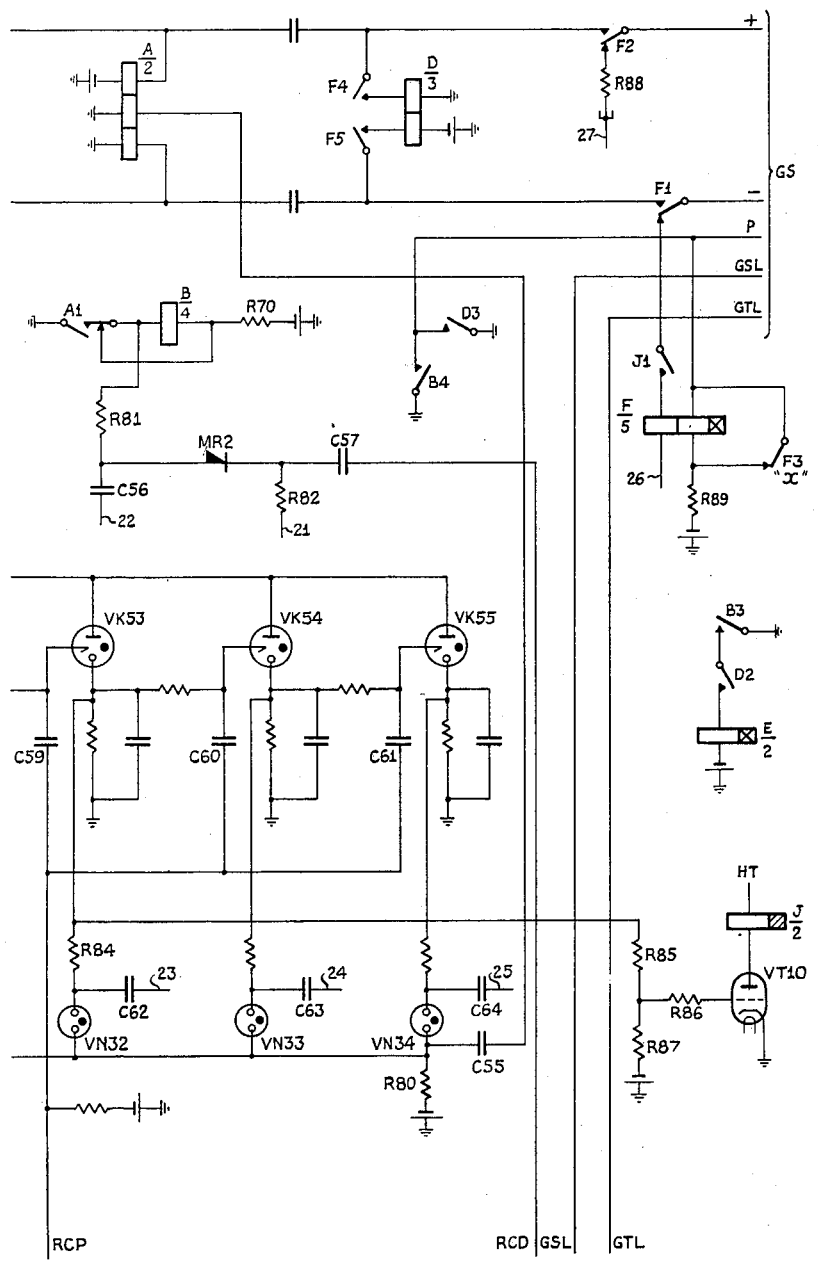

In the drawings:
Fig. 1 shows a block schematic of the system,
Fig. 2 shows the trunking diagram of the primary and secondary line finder/final selector switches,
Fig. 3 shows diagrammatically the method whereby subscribers' lines are given access to a group of line finder/final selector switches,
Figs. 4 to 11 when arranged as shown in Fig. 29 show the circuit of the line finder/final selector switches and the associated common control equipment.
Figs. 12 and 13 when arranged side-by-side with Fig. 12 on the left show the circuit of a trunk relay set,
Fig. 14 shows the trunking diagram of the group selector switches,
Figs. 15 to 17 when arranged side-by-side in order with Fig. 15 on the left show the circuit of a group selector switch.
Figs. 18 to 25 when arranged as shown in Fig. 30 show the circuits of a register connector and register, and
Figs. 26 to 28 when arranged side-by-side in order with Fig. 26 on the left show the circuit of the common control connector and the group selector common control equipment.

Referring first to Fig. 1, a subscriber's line extends from the subscriber's instrument SUB into the exchange and passes through the cross-connection fields of a main distribution frame MDF, and an intermediate distribution frame IDF. The exchange equipment individual to the subscriber's line circuit is indicated by SLC.

The switches comprising the combined line finder and final selector LF/FS are controlled by a line finder/final selector common control circuit LFCC. Outgoing calls are extended to a group selector GS through a trunk relay set TRS which also gives access to a register REG through a register connecting circuit RC and the register is connected to a common control circuit GSCC for the group selection stage by means of a connecting circuit CCC. Incoming and outgoing relay sets IRS and ORS respectively connect the group selector GS to junctions EJ to other exchanges.

When a subscriber calls, the appropriate line finder/final selector common control circuit is seized by the subscriber's line circuit and the common control sets up a free path through a line finder/final selector unit electronically and immediately releases. This operation occupies about 2-3 milliseconds, and is achieved by striking cold cathode gas discharge tubes associated with individual select and bridge magnets on crossbar switches, the tubes being maintained conducting to operate the switch magnets after the common control equipment has been released. The latter is therefore not held during the relatively long operating period of the switch magnets.

A trunk relay set is seized by the operation of the line finder/final selector unit and the trunk relay set takes into use a register over the register connector. In the trunk relay set dialled impulses from the subscriber's instrument are therein converted into voice frequency impulses for application to the register. When dialling is completed the register seizes and is connected to the group selector common control circuit and the group selector, being free, is seized by the common control via the register. The register has meanwhile transferred its stored digits to the group selector common control circuit, which in the case of a call to a subscriber on the same exchange, tests the common control circuit of the appropriate group of subscribers' lines.

If this is free the numerical digits are transferred to the line finder/final selector common control which then marks the called line. The marking on the called line causes it to act as a calling line and free paths to the incoming trunks of the line finder/final selector are chosen by the common control circuit. A free trunk which also corresponds to one marked by the group selector is selected and the call is set up over this path. The group selector common control and the register release after the call has been set up electronically in the group selector and line finder/final selector.

During the call, no cold cathode tubes remain conducting and the crossbar switches are held by energisation of the bridge magnets over the P-wire through their own mechanical contacts.

The various switching elements and their controls will now be described in more detail in the order outlined above.

*Line finder/final selector and common control*

Subscribers are arranged in nominal 500 line groups, there being 20 of these groups provided in a 10,000 line exchange. Each 500 line group, however, contains only 480 working line circuits and this is possible because there is always a small proportion of numbers unavailable because of discontinued lines, changed numbers, test numbers, and so on.

The line finder/final selector is shown in Fig. 2 and comprises a primary-secondary arrangement of crossbar switches each being adapted for double-group working by the provision of double contact units at the cross points in known manner. In each primary-secondary unit, there are two primary switches PSAA and PSBA of the 14 x 10 type, i. e. 14 select magnets and 10 bridge magnets, and one secondary switch SSA of the 12 x 10 type. 240 subscriber lines SL are accommodated on each of the primary switches, 24 subscribers being terminated on each bridge BR1–10. Ten links extend from the ten bridges of each primary switch and terminate on the double contact units of the secondary switch, these links being indicated by LA and LB in the drawing. The contact units associated with each magnet in the secondary switch are internally multipled, so that although each subscriber has access to only one link via a bridge common of the primary switch, each link is capable of being connected to any of the five outgoing or five incoming trunks AOT and AIT respectively, connected to the ten bridges BR1–10 of the secondary switch SSA. Switching between the two portions of the double contact units is carried out by means of two select magnets in each switch. In the primary switch PSAA for example, twelve double contact units associated with each bridge magnet are used for terminating the subscribers' lines, while the contact units PSA and PSB are used for connecting the required bridge common to the link. Contact units PSC and PSD in switch PSBA are used for the same purpose, while in the secondary switch SSA, contact units SA and SB are used for connecting links from either of the primary switches to a free trunk.

In order to provide for traffic requirements of the exchange, several line finder/final selector units, each comprising two primary switches and one secondary switch, are employed, each of the 480 subscribers' lines appearing on a primary switch of each unit. The arrangement is shown in Fig. 3. If, for instance, there are eight units provided, each subscriber would have a chance of connection to 40 possible outlets on both outgoing and incoming sides of the secondary switches. Referring to Fig. 3, a 500-line group of subscribers' lines SLA and SLB terminate on primary switches PSAA and PSBA and so on to PSAH and PSBH. The primary switches are linked to the secondary switches SSA to SSH in the manner described with reference to Fig. 2, and from the secondary switches, outgoing trunks AOT to HOT and incoming trunks AIT to HIT provide a total of 40 outgoing and 40 incoming trunks for each 500-line group.

With this arrangement of terminating 240 subscribers' lines on a single switch, the position of a subscriber's line cannot have any numerical significance in the decimal system of selection. An intermediate distribution frame is therefore provided so that the called number dialled by a subscriber can be converted into an indication of the position of the corresponding line circuit termination on a crossbar switch.

In the description which follows, all tubes are of the gas-filled cold cathode type unless it is specifically stated that a tube is thermionic. For the purposes of the description a pulse is defined as a steep-fronted surge of current, or the resulting voltage rise across a resistor through which the current surge passes, which rapidly diminishes after reaching its maximum value, and a bias is a voltage rise which remains at or near its maximum value for a period which is long compared with the duration of a pulse as above defined.

Referring now to Figs. 4–11 of the drawings, which should be arranged as shown in Fig. 29, a typical subscriber's line extends through the cross-connection fields of the main and intermediate distribution frames MDF and IDF to the line circuit SLC. All the equipment in the enclosure marked SLC is individual to each subscriber's line.

The line calling tube VK1 has its cathode connected to resistor R1 and thence in common with all other line calling tubes in the 500-line group to negative battery via resistor R2 (Fig. 9), while the anodes of all the line calling tubes are connected to the high tension conductor HT. The potential difference between the anode and cathode of tube VK1 is insufficient to cause the tube to strike until the potential of its trigger electrode is increased. The junction point of resistors R3 and R4 (Fig. 4) is normally lower than earth potential because of the negative battery connection over the secondary winding of transformer TR1 (Fig. 8), but when a subscriber calls, the looping of his line applies earth potential to the said junction point via contacts K1 normal, the subscriber's line and contacts K2 normal. The increased potential at this point removes the bias formerly applied to rectifier MR1 over the circuit: negative battery, secondary winding of transformer TR1, resistors R3 and R4, rectifier MR1, resistors R5 and R6 and earth. This allows positive pulses applied to rectifier MR1 via capacitor C1 to reach the trigger electrode of tube VK1.

The pulses are generated by a 5 kc./s. multivibrator MV1 (Fig. 8) and are applied to all the line calling tubes in the 500-line group in turn by hundreds and tens pulse distributors and units bias distributor. The output of the multivibrator has a square waveform, but pulses of short duration (say 20 microseconds) are required, and these may be obtained by connecting a series capacitor followed by a shunt resistor in the output of the multivibrator. The negative pulses produced may be blocked by a rectifier.

The pulses are applied to a hundreds counting tube VMK1 via a 2-way gate circuit GC1, which is normally set to allow the passage of pulses from this source and which will be described later. This gate circuit includes a thermionic tube (VT58) which is normally conducting but which can be biased back to block the transmission of pulses. The hundreds counter VMK1 is a gas-filled tube having a plurality of cathodes and arranged so that the anode-cathode gaps conduct sequentially on the application of negative impulses to a trigger electrode. The present tube requires five cathodes, but a multiple of five would be satisfactory the cathodes in that case being connected to give the effect of a five cathode tube. This tube requires a higher voltage than the single cathode tubes, and the anode is connected via a resistor R7 to a positive 330 volts source.

Each cathode in the hundreds counting tube VMK1 represents one particular hundred subscribers' lines in the 500-line group. The cathodes are connected to earth by way of resistors such as R8 and shunt capacitors such as C2, and also to the grids of five thermionic tubes such as VT1 by way of resistors such as R9. Tube VT1 is normally non-conducting because its grid is held at earth potential via resistors R8 and R9 while its cathode is connected to positive battery by resistor R10.

The gate circuit GC1 converts the 5 kc./s. positive pulses from the multivibrator MV1 to negative pulses for application to the hundreds counting tube VMK1, and negative pulses from the gate circuit are again converted to positive pulses by the pulse inverter circuit PC1 for application to the grids of the five tubes VT1 and so on, via capacitors such as C3. The pulse inverter comprises a thermionic tube with a resistive anode load. Pulses of one polarity are applied to the grid, and pulses of the opposite polarity may be taken from the anode. The 5 kc./s. positive pulses are of insufficient magnitude to drive the grid of tube VT1 positive with respect to the cathode, but when the cathode of tube VMK1 which is associated with tube VT1 is conducting, which it will do for 200 μs. (microseconds) each ms. (millisecond), the voltage rise across resistor R8 will raise the potential of the grid of tube VT1 sufficiently so that when a pulse is applied via capacitor C3, a corresponding sharp voltage rise occurs at the cathode of the tube.

Thus a sharp pulse may be derived from each of the five tubes such as VT1 sequentially, each tube producing its pulse once every 1 ms. These tubes are provided one for each hundred lines in the 500-line group.

There is provided one tens counter for the 500 lines in the group under consideration and this comprises the multicathode tube VMK2. The tube has 10 cathodes associated with the 10 tubes of the tens distributors of each hundred lines in the group, of which only the first and last tubes of the first hundred lines are shown, namely VK2 and VK3. It will be understood that although there is only one tens counting tube VMK2 there are five sets of tens pulse distributors, each containing ten tubes, and each associated with one of the five thermionic tubes VT1 and so on.

The anode of tube VMK2 is connected to a positive 280 volts supply by a resistor R11 and the ten cathodes are connected to negative battery by resistors R12, R13, and so on and also by capacitors C4, C5 and so on. 1 kc./s. positive pulses from the cathode of tube VT1 are applied to a pulse inverter circuit PC2, and the derived negative pulses are applied to the trigger electrode of tube VMK2, causing the cathodes to conduct successively. Corresponding positive voltages derived from the cathodes of tube VMK2 are applied as biases to the trigger electrodes of tubes such as VK2, VK3 and so on in all five tens distributors in turn via resistors such as R14, R15 and so on. These biasing voltages, which appear on the tens distributing tubes successively for periods of 1 ms., are insufficient to strike the tubes. Sharp positive 1 kc./s. pulses applied to all the trigger electrodes simultaneously via capacitors C6, C7 and so on from tube VT1 are also of insufficient magnitude to strike the tubes. However, when a biasing voltage and a sharp pulse appear simultaneously, which will occur for each tube once every 10 ms., the tube will strike.

The tubes in the pulse distributor are arranged to be self-extinguishing. Thus when one tube, e. g. VK2, strikes due to the coincidence of a biasing voltage and a sharp pulse on its trigger electrode, current flows through resistor R18 and capacitor C8. After the initial flow of current has charged the capacitor, the current drawn by the tube flows through resistors R17 and R18. Resistor R17 has a high value (several megohms) and due to the voltage drop across the tube, the remaining potential difference between the H. T. supply and the anode is insufficient to drive enough current through resistor R17 to maintain the discharge in the tube. The tube therefore extinguishes as the capacitor C8 becomes charged, and the capacitor subsequently discharges through resistor R17. Thus on the application of a suitable pulse to the trigger electrode, a sharp pulse may be derived from the cathode of the tube during the flow of charging current through the capacitor. The length of this pulse is dependent partly on the value of capacitor C8, which can be chosen to give a pulse of the required length.

The units counter is similar to the tens counter and comprises the multi-cathode tube VMK3, which is connected in the same manner as tube VMK2. Only one units counter is provided for each 500-line group. Negative pulses are applied to the trigger electrode of tube VMK3 from the gate circuit GC2 which receives pulses from the pulse inverter PC2. The gate circuit GC2 is similar to the circuit GC1. Pulses from circuit PC2 are transmitted to the gate circuit GC2 at the rate of 1 kc./s. but it is arranged that the latter circuit is normally biased off so that the 1 kc./s. pulses cannot pass. When the first cathode of tube VMK2 conducts, however, a positive biasing voltage from resistor R12 biases the grid of a thermionic tube of the gate circuit GC2 so that a single sharp 1 kc./s. negative pulse passes to the trigger electrode of tube VMK3. Thus the cathodes of tube VMK3 conduct sequentially at 10 ms. intervals and a 10 ms. biasing voltage may therefore be derived from a cathode of this tube once every 100 ms., since the tube has 10 cathodes.

It will be seen then, that while one cathode of the units counting tube VMK3 is conducting, all 10 cathodes of the tens counting tube VMK2 conduct in turn, and while one cathode of the tens counting tube is conducting all five cathodes of the hundreds counting tube VMK1 conduct in turn.

When a cathode of the units counting tube VMK3 conducts, a 10 ms. bias is applied to the trigger electrode of the associated line calling tubes such as tube VK1 via a resistor such as R19. While this bias exists on these particular line calling tubes, a bias is applied to the trigger electrode of each tube in turn in the tens pulse distributors. In the case shown in the drawing, while a bias is being applied to the first tube in all the hundreds distributors e. g. tube VK2, pulses are applied from the hundreds counter to the trigger electrodes of all the tubes in each tens pulse distributor in turn. As previously stated, a tube such as VK2 will strike on the coincidence of this pulse and the existing bias, and a pulse will be transmitted from the cathode of the tube to the trigger electrode of the line calling tube VK1 via capacitor C1, rectifier MR1 (which has previously had its bias removed by the looping of the subscriber's line) and capacitor C9.

The coincidence on the trigger electrode of tube VK1 of the bias from the units counter and the pulse from the tens distributor for the appropriate 100 lines, causes the line calling tube to strike. Thus it will be seen that for each 500-line group, once every 100 ms. a 10 ms. bias is applied to all the tubes associated with subscribers' lines whose exchange numbers end in the same units digit, and if one of these subscribers is calling, a pulse from the tens distributor for the appropriate hundred lines will cause the subscriber's tube to strike.

When a subscriber's line calling tube VK1 fires, the voltage rise across resistor R2 will bias off all other line calling tubes in the group to prevent them striking until a free path through the line finder/final selector unit has been found for the first call. The increased cathode voltage of tube VK1 is sufficient to strike the three diodes VN1, VN2 and VN3. In the case of tube VN1, the tube strikes in the circuit: cathode of tube VK1, tube VN1, resistor R2 to negative battery.

When tube VN1 strikes, current through resistor R20 applies a priming bias via resistor R21 to the trigger electrode of tube VK4 which, however, does not strike yet. Tube VK4 is one of 10 priming tubes associated with the ten bridge magnets of the first of the two primary switches in each line finder/final selector unit in the 500-line group, e. g. switch PSAA. A further series of ten tubes (not shown) is also provided for the other half of the 500-line group, which is associated with the second primary switch in each unit, e. g. PSBA. 24 line circuits are associated with each tube, only the first and last of which are shown, namely VK4 and VK5. Lead 10 is connected to a resistor which is the common cathode resistor of tubes such as VN1 associated with the tenth bridge of primary switch PSA.

A pulse caused by the initial surge of current as one of the line calling tubes (in this case tube VK1) fires is applied to all the trigger electrodes of tube VK4, VK5 and so on via a pulse delay trigger circuit PD1 and capacitors such as C10. The delaying action of this circuit is as follows. A pulse applied to the trigger electrode of tube VK6 via capacitor C11 strikes the tube, which was already primed by positive battery voltage applied through resistor R22. The subsequent current flow in resistor R23 raises the cathode of tube VK6 to about 50 volts above earth potential and this voltage, applied via resistor R24, charges capacitor C12. When this capacitor is partly charged, the voltage on the trigger electrode of tube VK7 becomes sufficient to strike this tube and the subsequent rise in voltage at the cathode of tube VK7 applies a positive pulse through capacitor C13 to the cathode of tube VK6. This sudden rise of voltage at the cathode of tube VK6, which is already above earth potential, is sufficient to strike the diode VN4 and a sharp pulse due to the current surge in resistor R25 passes to the output lead. The positive pulse applied to the cathode of tube VK6 from the cathode of tube VK7 extinguishes tube VK6, and tube VK7 is extinguished later by removal of the H. T. supply.

The delay is introduced to enable the appropriate primary switch bridge magnet priming tube to be primed before the firing pulse is applied to all the tubes in the series. When tube VK4, or the tube associated with the particular bridge upon which the calling subscriber's line terminates, has fired, the current flowing through resistor R27 raises the voltage across resistor R27 sufficiently to bias off the remaining nine tubes to prevent them firing in the event of another subscriber calling.

This bias is also applied to the trigger electrode of one of the tubes VK34 and VK35 (Fig. 6) in each line/finder/final selector unit via a resistor such as R60. Lead 11 is connected to the common cathode resistor of the bridge magnet priming tubes (not shown) of switch PSBA. Tubes VK34 and VK35 are the operating tubes for the select magnets controlling double group switching in the secondary switch, and the one which is primed will depend on which of the two primary switches terminates the calling subscriber's line. In the present case tube VK34 will be primed.

When tube VK4 fired, a test was made to find whether any of the links available to the subscriber are free. In the drawing, the links to be tested are those extending between switches PSAA and SSA, and the controlling circuit for this purpose is shown within the dotted line. Tube VK8 is normally primed by the connection of its trigger electrode to the potential divider comprising resistors R28 and R29 connected between the H. T. conductor and negative battery. One such tube is provided in each primary switch and if one or more links are free a path is available for striking the diode VN5 (Fig. 9) from the cathode of tube VK4 via break contacts associated with one of the bridge magnets of the primary switches in the multiple, e. g. contacts 1BM1 (AA) and resistor R30 or the corresponding resistor in another unit of the multiple, to negative battery.

Assuming that the link between the primary and secondary switches shown in the drawing is free, the firing of tube VN5 applies a pulse via capacitor C15 to the trigger electrode of tube VK8 which then strikes. This tube is, however, connected as a pulse repeater in the same way as the pulse distributing tubes VK2, VK3, and after delivering a pulse from its cathode, tube VK8 is extinguished. The output pulse tends to fire the diode VN6, and if a free path is available through the secondary switch, a circuit will exist for striking the diode over one of the sets of secondary bridge magnet break contacts 1BM1(A)—10BM1(A) and the associated resistor such as R31 to negative battery.

It should be explained that the trunk relay sets are accessible to more than one line finder/final selector unit and hence even though there is an available outlet through the secondary switch, the trunk relay set connected to such outlet may be in use from another switching unit. A test must now be made for the availability of the trunk relay sets accessible to the switching unit shown. If any of the trunk relay sets are free, a high positive voltage is returned over the appropriate leads TB to bias the corresponding tube or tubes of the five tubes VK9, VK10 and so on and also to supply H. T. to the anodes of tubes, VK15, VK16 and so on. If an incoming call is proceeding on another line finder/final selector unit, a bias would also appear over a lead FML on one or more of the five tubes VK11, VK12 and so on from a group selector. This condition will be considered later.

Although the series of tubes VK9, VK10 and so on, has been mentioned as including only five tubes corresponding to the five tubes VK15, VK16 and so on, of switch SSA, there will in fact be additional sets of five tubes in the common control circuit corresponding to tubes VK15, VK16 for all secondary switches serving the 500-line group and further tubes represented by tubes VK11, VK12 corresponding to tubes VK23, VK24 for all secondary switches of the group.

Any of the tubes VK9, VK12 and so on, which have been so marked will fire on receipt of a pulse from the switch test repeating tube VK8 via the diode VN6, the un-operated break contacts of the corresponding secondary bridge magnet and capacitors C16, C17 and so on. On firing, the rise in potential of the cathodes of the tubes corresponding to the free outlets will be sufficient to strike the associated diodes VN7—VN10 over paths such as cathode of tube VK9, diode VN7, resistor R23 to negative battery and also the diodes VN11—VN14 over common resistors R33 and R34 to negative battery. These latter resistors are also common to corresponding tubes in the other secondary switches, connection being made to these over leads 14 and 15. Supposing that the first outgoing trunk is free, then the striking of diode VN7 causes current to flow in resistor R32. This biases off tube VK13 by increasing the cathode potential, and a priming bias is applied to the corresponding secondary switch bridge magnet priming tube VK15 via resistor R35.

Thus the firing of diode VN5 has enabled a test to be made of the availability of all paths through all the line finder/final selector units and the tubes associated will all paths leading to free outlets to be marked. The second diode connected to tube VK4, i. e. tube VN15, strikes over the path including resistor R36, and a priming bias is thereby applied by way of resistor R37 to the trigger electrode of tube VK17 which is the operating tube for magnet 1SM(A) which is the secondary switch select magnet associated with the primary switch bridge upon which the calling subscriber's line terminates. It will be understood that the tube corresponding to tube VK17 in all the other units of the line finder/final selector multiple will also be primed when tube VK4 is struck while if the calling subscriber's line terminated on any of the remaining nine bridges of the primary switch, the firing of the appropriate tube in the series VK4, VK5 and so on, would result in the marking of the corresponding secondary switch select magnet operating tube in the series VK17, VK18 and so on.

Returning again to the subscriber's line circuit, the striking of the line calling tube VK1 strikes the diode VN2 over the path: cathode of tube VK1, tube VN2, resistor R38 to negative battery. A bias is thereby applied to the trigger electrode of tube VK19 via resistor R39, or to the appropriate tube in the series of 12 primary switch select magnet priming tubes, VK19, VK20 and so on, depending upon which contact row the subscriber's line terminates. Lead 12 is associated with diodes similar to VN2 which belong to subscribers' line circuits associated with the twelfth select magnet.

The third diode VN3 associated with the line calling tube also strikes over the circuit: cathode of tube VK1, tube VN3, resistor R40 to negative battery. The consequent biasing voltage is applied over resistor R41 to the trigger electrode of tube VK21. This tube VK21 and tube VK22 are the priming tubes associated with the double group switching select magnets PSA and PSB in the primary switch PSAA and the tube which is primed will depend upon which half of the contact column terminates the subscriber's line circuit. Lead 13 is associated with diodes similar to VN3 which belong to subscribers' line circuits associated with the second half of the contact column.

The tubes which are primed in the line finder/final selector common control circuit are now: one primary switch select magnet priming tube in the series VK19, VK20 and so on; one priming tube associated with the double group switching select magnet of a primary switch, i. e. either tube VK21 or VK22 and, in each free unit of the line finder/final selector multiple, all the secondary switch bridge magnet priming tubes associated with the free outgoing trunk, i. e. in the series VK15, VK16 and so on. If there is an incoming call in any switch in the multiple, a tube associated with an incoming trunk in the series, VK23, VK24 and so on, is struck, but when there is an outgoing call being set up the striking of one of these tubes is an unwanted condition and the method of discrimination will be described later.

Returning again to the operation of the line calling tube VK1, the pulse initiated as the tube fires is applied to the trigger electrodes of tubes VK25 and VK26 via capacitors C18 and C19. If there is no incoming call waiting, a negative potential is applied from the group selector common control circuit over lead ICW to the junction point of resistors R67 and R68, and this potential biases off the trigger electrode of tube VK26 to prevent the pulse from the line calling tube being effective on this tube. Tube VK25, however, is able to strike. If there is an incoming call waiting to seize the line finder/final selector common control, a positive bias is returned over lead ICW which primes tube VK26, enabling it to strike on receipt of the impulse from the line calling tube, and tube VK25 is biased off by the increase in its cathode potential. Thus for outgoing calls tube VK25 is struck, while for incoming calls tube VK26 strikes after the line finder/final selector common control has been seized.

In the present case, the firing of tube VK25 raises the potential of its cathode and the diode VN16 conducts in series with resistor R42. A positive biasing voltage is applied from resistor R42 to the gating lead of the outgoing test repeater circuit OTR.

The test repeater comprises a tube VK27, which is connected as a self-extinguishing pulse repeater in the same way as tube VK8, and which may be primed by application of a positive potential to the gating lead, which is connected to the trigger electrode by resistor R43. When this potential exists, a pulse applied to capacitor C20 strikes the tube momentarily and the pulse is repeated at the cathode.

The firing of the outgoing calls tube VK25 and the diode VN16 also applies a priming bias to the gating lead of the outgoing hunt repeater circuit OHR which is similar to the outgoing test repeater circuit OTR.

It has been assumed that at least one outgoing trunk is free and all the tubes in the series VK9, VK10, which correspond to free trunks in any of the line finder/final selector units are conducting, together with the associated diodes VN11, VN12. When one of these diodes strikes, a pulse is applied to the capacitor C20 in the outgoing test repeater OTR and an output pulse is applied via capacitors C22, C23 and so on to all twelve priming tubes VK19, VK20 and so on, associated with primary switch select magnets in all line finder/final selector units. The one tube in each unit which has been primed by the firing of the diode VN2 in the line circuit will now strike and the consequent rise in voltage across resistor R45 and its equivalents in the other units will bias off the remaining tubes. The diodes associated with the tubes which have struck, e. g. VN17, will also strike to negative battery over a resistor such as R46 to apply a bias to the corresponding primary switch select magnet operating tube in the series VK28, VK29 and so on, via a resistor such as R47.

The voltage rise at resistor R45 is applied to the trigger electrodes of the two tubes VK21 and VK22 via capacitors C24 and C25. The tube which is already primed by the striking of the diode VN3 in the subscriber's line circuit will now fire, and will bias off the other tube, due to the rise in voltage across resistor R48. The appropriate diode e. g. VN18, strikes to negative battery over resistor R49 and a priming bias is applied to the corresponding tube VK30 of the pair operating the double group switching magnets PSA(A) and PSB(A).

The voltage rise at resistor R48 is applied to the pulse input capacitors of the outgoing and incoming hunt repeaters OHR and IHR. Only the outgoing hunt repeater is primed, and a pulse is repeated to the trigger electrode of the secondary switch bridge magnet priming tube VK15 via capacitor C26. If this particular tube is primed because it is associated with a free outlet, the tube will now strike. If, however, the associated trunk is not free, tube VK15 will not be primed and therefore will not strike. However, the pulse from the outgoing hunt repeater circuit OHR will in this case strike tube VK13, to which it is applied via capacitor C27. This tube could not strike if tube VK15 were primed because the priming voltage derived from the diode VN7 would have biased off tube VK13.

Supposing then that the first outgoing trunk is not free, tube VK13 will strike and the resulting pulse from the cathode of this tube will tend to strike the next tube in the series of 40 tubes represented by tubes VK13, VK14 and so on (corresponding to tubes VK15, VK16 and so on, in all secondary switches of the group), and also the second tube in the series VK15, VK16, and so on in the first switch to be tested. If the second outlet is free, the latter tube will fire, if not, the former will fire and the third and subsequent outlets will be tested in the same way until the first free trunk of the 40 trunks available has been found. Connection is made to the remaining hunting tubes over leads 16 and 17. When the first primed tube in the series VK15, VK16 and so on, in one of the units of the multiple has been fired, the corresponding diode, e. g. VN19, will strike to negative battery over resistor R50, and a bias will be applied to the trigger electrode of the corresponding secondary switch bridge magnet operating tube, i. e. one of the tubes VK32, VK33 and so on, via resistors such as R51.

Tubes VK15, VK16 and so on, have cathode resistors situated in the trunk relay set to which each tube corresponds, the resistors being common to the corresponding tubes in other line finder/final selector units associated with that trunk relay set. When one of these tubes fires the rise in voltage across the common resistor is returned over a lead GB and raises the cathode voltage of all the corresponding tubes in other units to prevent them from firing, an indication that the trunk has been seized even though the mechanical path has not yet been completed.

The striking of a tube in the series VK15, VK16 will also strike the corresponding diode, e. g. VN20 to negative battery over resistor R53 and a pulse will be applied to the pulse repeater circuit PR1. This is a self-extinguishing tube connected in a manner similar to tubes VK2, VK3 and so on in the tens distributor and its object is to amplify the input pulse.

The pulse repeater circuit PR1 is provided on the basis of one per line finder/final selector unit and since only one outlet from one secondary switch in only one of the multipled units has been selected, the pulse repeater in only one unit will receive a pulse.

The output pulse from the repeater PR1 is applied via capacitors C28 and C29 to the trigger electrodes of both operating tubes VK30 and VK31 controlling the select magnets associated with double group switching in both primary switches and the tube in both primary switches which has been primed will strike. In due course the corresponding magnets, e. g. PSA(A), will operate. The same pulse is also applied via capacitors C30, C31 and so on to the trigger electrodes of all the primary switch select magnet operating tubes VK28, VK29 and so on, and the tube in this series which has been primed in both primary switches will strike. In due course a primary switch select magnet in each switch e. g. 1SM(AA) will operate.

The pulse from the repeater PR1 is also applied via capacitors C32 and C33 to the trigger electrodes of tubes VK34 and VK35, the operating tubes for the double group switching select magnets SA and SB in the secondary switch of the unit. In the case shown in the drawing, tube VK34 has been primed and will strike on receipt of the pulse and in due course the magnet SA will operate. The same pulse is also applied via capacitors C34, C35 and so on to the trigger electrodes of all the secondary switch select magnet operating tubes VK17, VK18 and so on, and the tube which has previously been primed is struck. The corresponding magnet, e. g. 1SM(A), will operate in due course.

The same pulse is also applied via capacitor C41 to the trigger electrode of tube VK43 and the tube, which is already primed by the resistor connection to earth of its trigger electrode, strikes. The firing of this tube indicates that a call is being set up and current in resistors R57 and R58 raises the potential of the junction point of resistors R58 and R59 and hence of the cathode of tube VK8, to bias off the latter tube and prevent it from striking in the event of another test being made for a free path through this switch.

The pulse from circuit PR1 is further applied to a pulse repeater circuit PR2, which is similar to the circuit PR1 and shares a common cathode resistor R61 (Fig. 9) with similar repeater circuits in the group.

Figure 10:
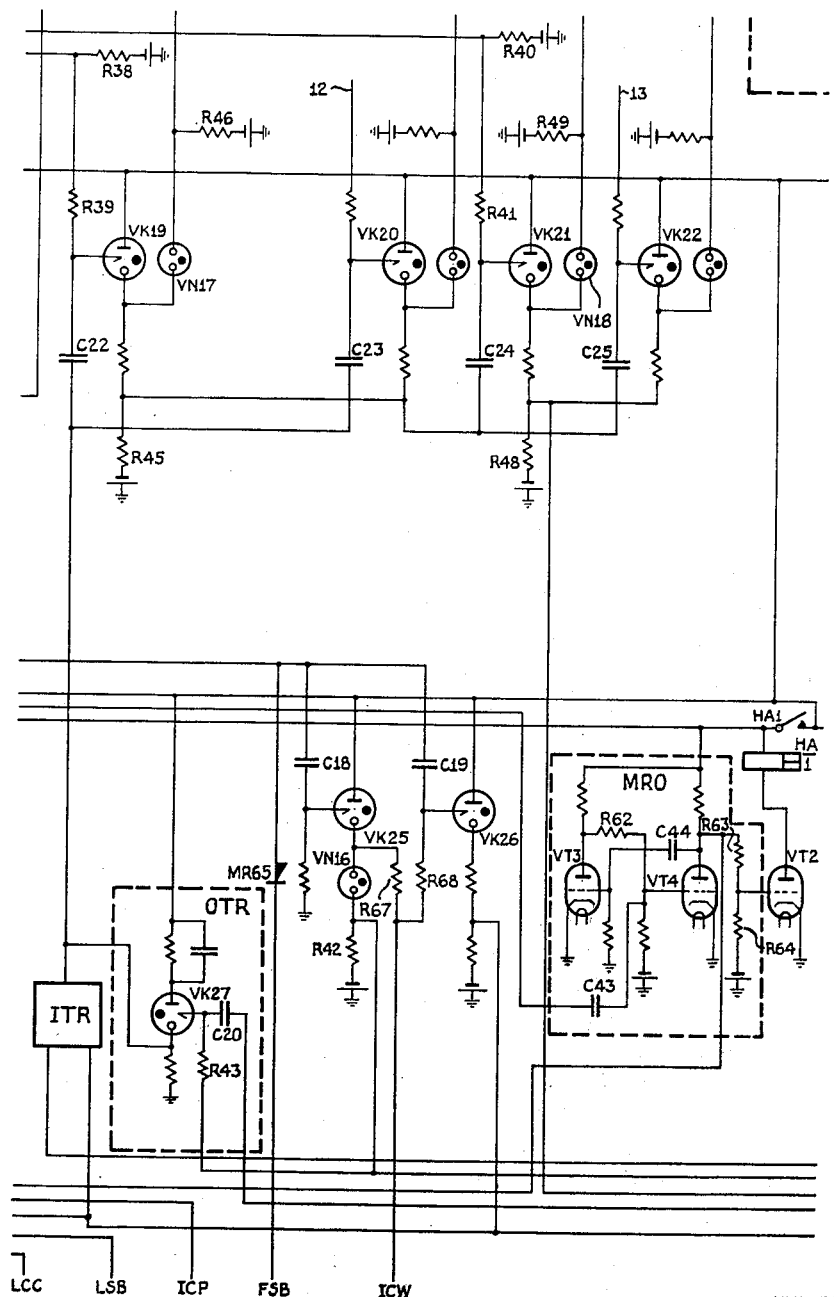
Figure 11:
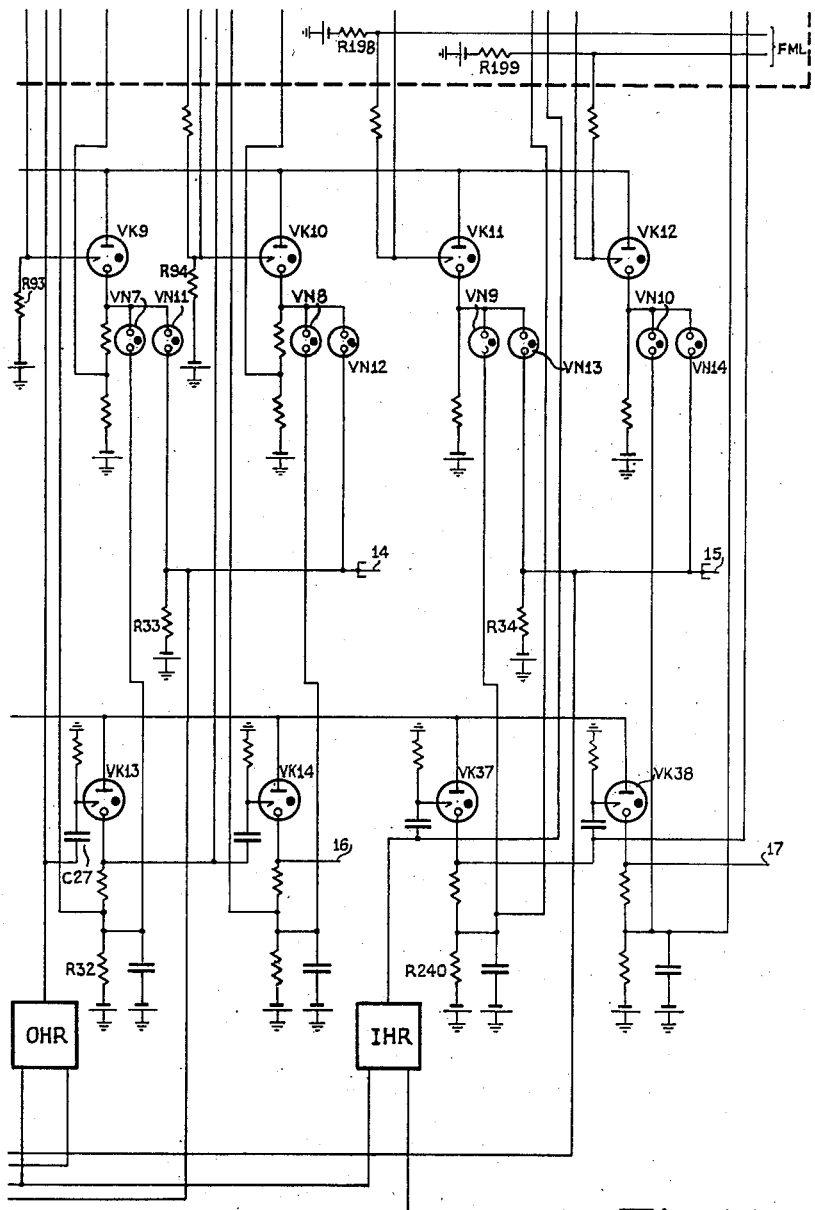

An amplified pulse is thereby applied to the trigger electrode of tube VK36 in the subscriber's line circuit via capacitor C36. This tube is already primed by connection to the cathode of tube VK1 and consequently it strikes. The rise in voltage across resistor R6 biases rectifier MR1 to prevent an incoming call from reaching the busy subscriber and also prevents tube VK1 from firing again. The pulse from the repeater circuit PR2 is further repeated by a similar repeater circuit PR3 and the amplified output pulse is applied to a reset trigger circuit MRO (Fig. 10). The operation of this circuit is as follows. The thermionic tube VT3 is normally conducting because the grid and cathode are at the same potential and the termionic tube VT4 is biased off by the reduced anode voltage of tube VT3. If a positive pulse is applied to the grid of tube VT4 via capacitor C43, tube VT4 will conduct momentarily, and a negative pulse from the anode will be applied via capacitor C44 to the grid of tube VT3 to cut off this tube. The resulting rise in voltage at the anode of tube VT3 is applied to the grid of tube VT4 via resistor R62 and tube VT4 therefore continues to conduct. Capacitor C44 will, however, discharge through the battery and series resistors, with the result that the grid of tube VT3 will go more positive until the tube eventually conducts again and tube VT4 is cut off as before.

An output lead is taken from the junction point of resistors R63 and R64, connected between the anode of tube VT4 and negative battery. On the application of a pulse via capacitor C43 then, the anode of tube VT4 and hence the output lead will be driven negative and will remain in that condition during the discharge period of capacitor C44 which can be made as long as is desired. In the present case, a 1 ms. output bias is satisfactory.

The output bias from the circuit MRO is applied to the grid of the thermionic tube VT2, which is normally conducting. The tube is now cut off and relay HA releases. Contacts HA1 in opening disconnect the HT supply from all tubes in the common control circuit except those which are shown as having a separate HT connection. The tubes which were operated and now have the HT supply disconnected are extinguished. After about 1 ms. relay HA re-operates and the common control circuit is reset to deal with another call.

Meanwhile, the firing of one of the operating tubes VK34 or VK35 associated with the secondary switch double group switching magnets has caused current to flow in the appropriate select magnet, e. g. SA, and a gating bias is applied to a pulse repeater PR4 in the appropriate primary switch. Pulse repeater PR4 is similar to repeater OTR.

A pulse from the pulse repeater PR1, which has already been mentioned as striking operating tubes associated with a select magnet and a double group switching select magnet of a primary switch, is applied to the pulse repeater PR4 in both primary switches by way of a delay circuit PD2 similar to the circuit PD1. The pulse from the circuit PD2 is to be applied to the operating tubes of the primary and secondary switch bridge magnets and a delay is provided of 60 ms. to ensure that the select magnets operate before the bridge magnet in both switches.

The firing of the marked tube in the series VK17, VK18 and so on produces current flow in the windings of one of the secondary switch select magnets, e. g. 1SM(A) and as the current builds up, a voltage will appear at the tapping on the magnet windings which will prime the corresponding primary switch bridge magnet operating tube in the series VK39, VK40 and so on, when applied to the trigger electrode via a resistor such as R55. The pulse which has been delayed in the pulse delay circuit PD2 and amplified in the repeater PR4 which is biased, is now applied to the trigger electrodes of all the tubes in the series VK39, VK40 and so on, through capacitors C47, C48 and so on in the appropriate primary switch and the tube which has been primed now fires. The corresponding magnet, e. g. 1BM(AA), will operate in due course.

The pulse from the pulse delay circuit PD2 is also applied via capacitors C37 to C40 and the corresponding resistors such as R52 to the trigger electrodes of the secondary switch bridge magnet operating tubes VK32, VK33 and so on and VK41, VK42 and so on. Only one tube in the outgoing group of trunks is primed and this tube will now strike. The corresponding magnet, e. g. 1BM(A), will operate in due course.

The tubes operating a select magnet, a bridge magnet and a double group switching select magnet in a primary and secondary switch are now conducting and in due course the corresponding magnets will operate in the order in which the tubes were struck to provide a physical path through the unit from the subscriber to a free trunk into the trunk relay set.

The operation of a bridge magnet in the two switches also operates the associated mechanical contacts. Assuming that the first bridge in each switch is operated, contacts 1BM2(AA) and contacts 1BM2(A) close to complete holding circuits for the second winding of the respective magnets to the *p*-wire of the selected trunk, to which earth is connected in the trunk relay set.

The pulse from the pulse delay trigger circuit PD2 is applied to a similar pulse delay circuit PD3 which introduces a delay of about 100 ms. which is sufficient to enable the bridge magnets to operate. A pulse is then delivered to the trigger electrode of tube VK44 via capacitor C45. Tube VK44 is already primed by the connection to earth over resistor R65 and consequently it strikes. Relay HB is pre-energised by current through its right-hand winding in series with resistor R66 and the current in tube VK44 now operates the relay. The HT supply to the tubes of the three switches of the unit, including tube VK44, is now disconnected at contacts HB1 and all the tubes in the switching unit are extinguished. Relay HB has its right-hand winding disconnected at contacts HB2, but remains operated for a short period due to the discharge current of capacitor C46.

Relay K now operates to earth over the *p*-wire through the bridge common as the subscriber's contact column in the primary switch is operated. Contacts K1 and K2 disconnect the line equipment from the speech path while contacts K3 connect a positive voltage from lead 18 to the cathode of tube VK36 to exinguish this tube and also to bias rectifier MR1 to prevent tube VK1 from being struck by an incoming call.

All the tubes concerned in setting up the connection between the subscriber's line and the trunk relay set are now extinguished and the connection is maintained by the bridge magnets being energised over the *p*-wire, while all select magnets including those used for double group switching are released.

The case has been considered of a calling subscriber being allotted a free path through a line finder/final selector unit. It may be, however, that no path is available because of busy conditions. There are four conditions which would prevent a subscriber obtaining immediate access to a trunk relay set.

(1) *All links busy.*—Each subscriber has access to only one link in each line finder/final selector unit, and the number of possible links available to a subscriber is the same as the number of units provided in multiple for a 500-line group.

If all links corresponding to a subscriber's line termination are in use, the associated primary switch bridge magnets will be operated, and the mechanical break contacts, e. g. 1BM1(AA), will be open. There is thus no testing path for a pulse from, say, tube VN5 to strike the switch test tube VK8, and hence only the priming tubes associated with a primary switch of each unit in the multiple will fire after a delay of about 200 ms., due to the pulse delay circuit PD1. The pulse initiated at the line calling tube VK1 is amplified in the calling pulse repeater circuit PR5 and applied to the "forced release" or "time throw-out" circuit TTO which introduces a delay of about 4 ms.

This circuit is similar to the pulse delay circuit PD1, and the output pulse is applied via a further repeater circuit PR6 to the reset circuit MRO. As mentioned previously, this circuit is arranged, in response to a single pulse, to release relay HA connected in the anode of tube VT2 and so disconnect the H. T. supply from the primary switch priming tubes now conducting. The disconnection lasts for about 1 ms. and all the tubes in the common control circuit extinguish together with the line calling tube VK1.

The delay of 4 ms. introduced by the time throw-out circuit TTO is sufficient, in the case of a free path being available, to enable the magnet operating tubes to be struck in a primary and a secondary switch.

The subscriber's tube VK1 will strike again when the hundreds, tens and units counter again applies the appropriate bias and pulse after 100 ms. and a test will be made again for a free link.

(2) *All trunks busy.*—In the case of none of the outlets from the secondary switches of the multipled units being free, no high voltage is returned over leads TB from the trunk relay sets, and tubes VK9, VK10 and so on, are negatively biased over resistors R93, R94 respectively. Even though all the bridges in the secondary switch to which a free link has been found are not in use, a pulse from the switch test repeater tube VK8 applied via the diode VN6 is unable to strike one of the tubes VK9, VK10 and so on.

The time throw-out circuit TTO operates as before, and H. T. is removed from the priming tubes and line calling tube which extinguish. Tube VK8 is self-extinguishing. The subscriber's tube VK1 again strikes after 100 ms. and the free trunk test is repeated.

Figure 6:
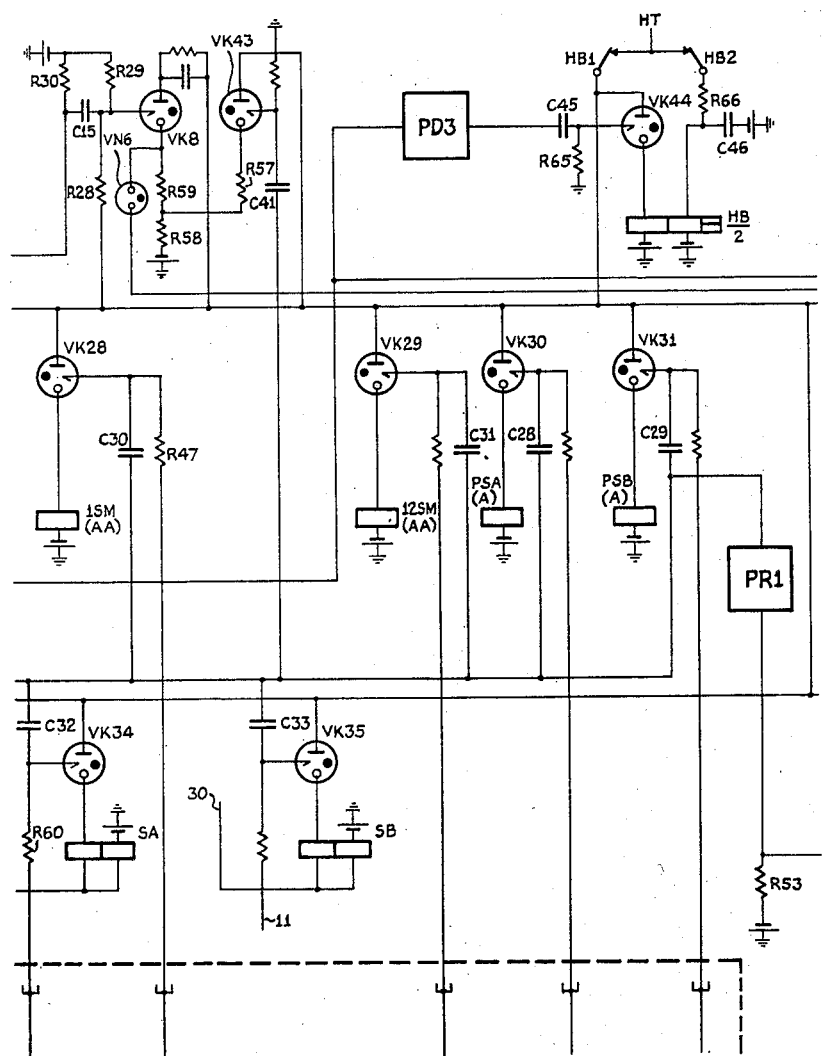
Figure 7:
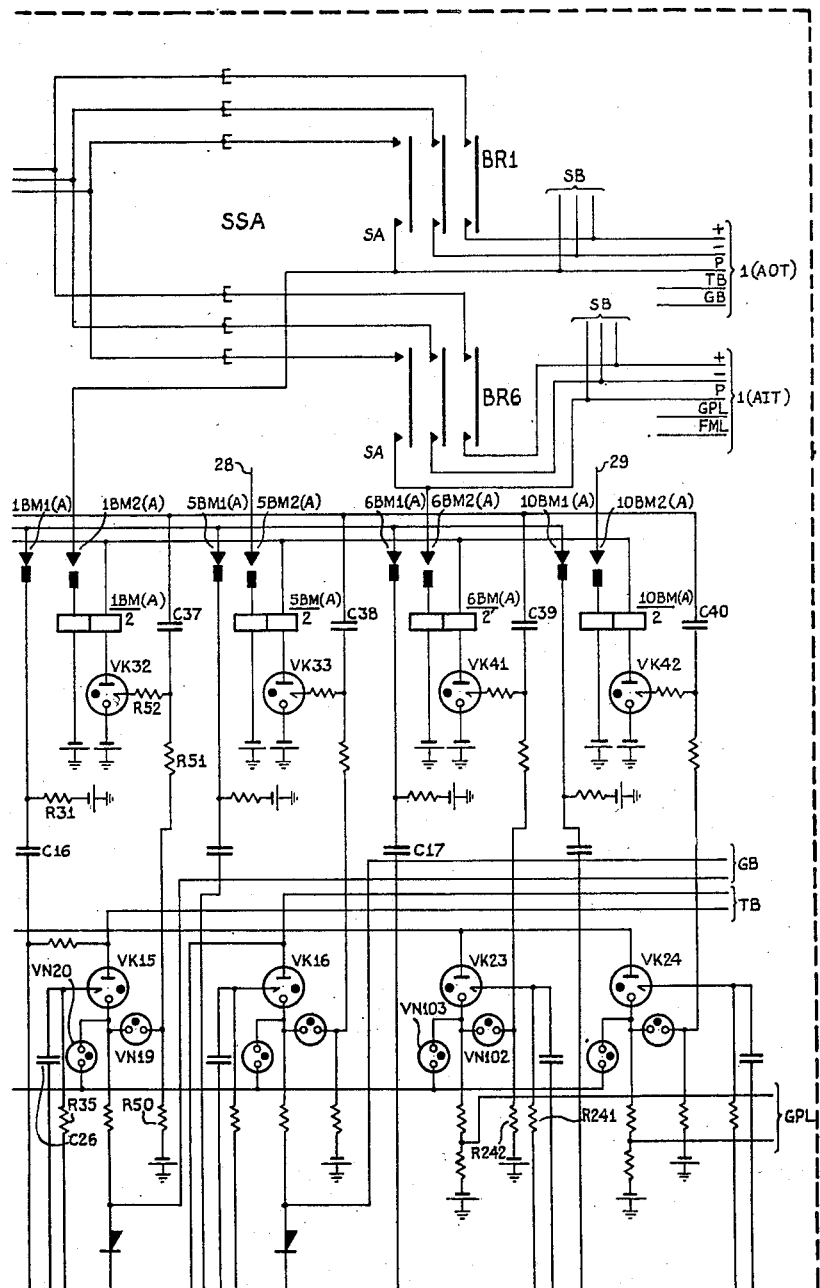
Figure 8:
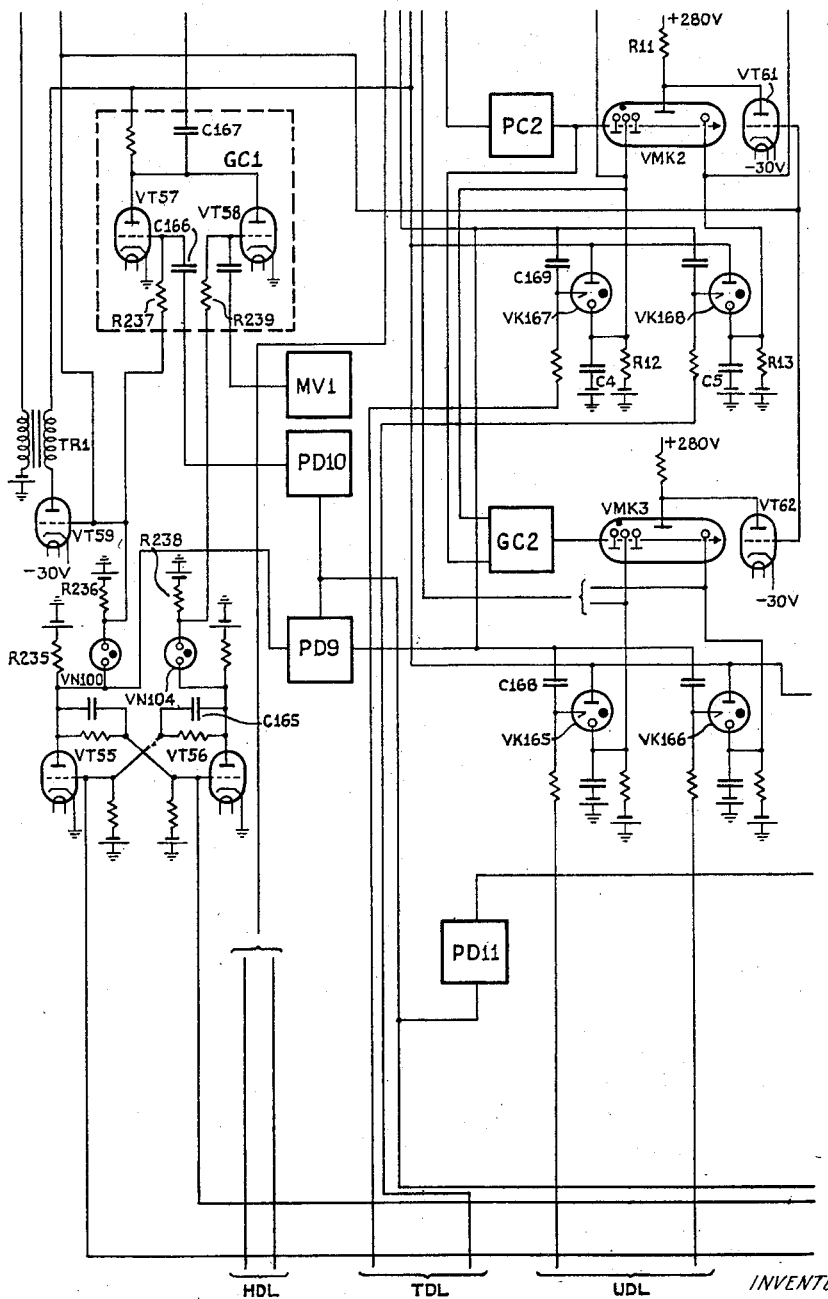
Figure 9:
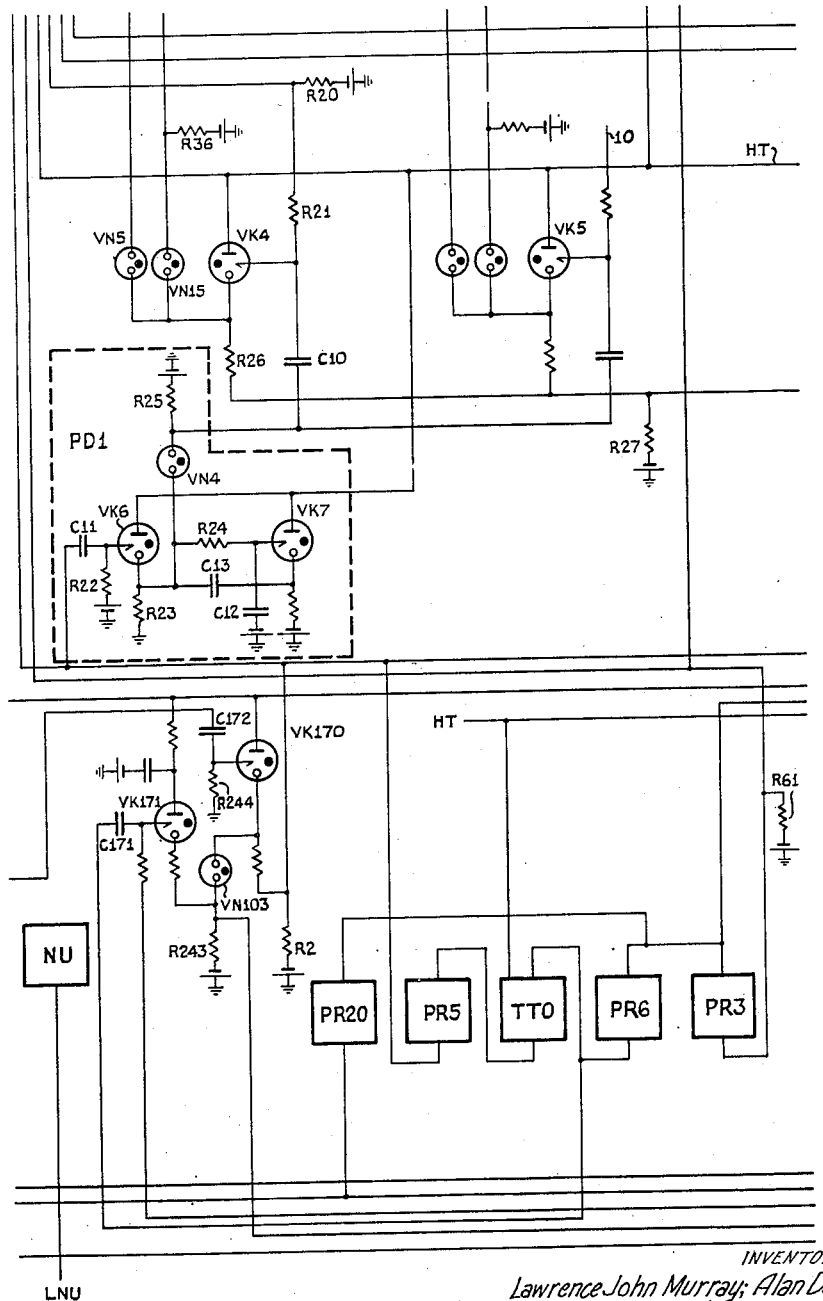

(3) *Switch being set up.*—This is an artificial busy condition and exists from the time a free outlet has been found to the time a trunk relay set is seized. This applies only to the unit through which a free path has been selected and is guarded by the tube VK43 (Fig. 6). This tube strikes on receipt of a pulse from the pulse repeater PR1 indicating that a free outlet has been found, and is extinguished on removal of the H. T. by the switch reset relay HB indicating that a trunk relay set has been seized and that a physical path exists between the subscriber's line and a trunk relay set.

When conducting, tube VK43 backs off tube VK8 and prevents the latter striking in response to a search pulse initiated by a calling subscriber's line circuit.

(4) *H. T. supply disconnected.*—This is an artificial busy condition and exists when a free path through a unit has been selected and a pulse is effective on the marker reset circuit MRO to remove the H. T. supply from certain tubes. If the pulse applied to the calling subscriber's line tube VK1 by the tens and hundreds counter coincides with this disconnection of H. T. the line tube will not strike. It will, however, strike on receipt of the next pulse after 100 ms.

*Trunk relay set*

The operation of the bridge magnets of a primary and a secondary switch in a line finder/final selector extends the +ve, —ve and private conductors of the calling subscriber's line over the selected free trunk to the corresponding trunk relay set. Referring to Figs. 12 and 13 which show the circuit of a trunk relay set, relay A operates to battery and earth on its outer windings, the circuit being completed over the subscriber's looped line. Contacts A2 are ineffective at this stage and contacts A1 remove the short-circuit from the slow-release relay B and complete an operating circuit for the latter including resistor R70.

Relay B in operating applies a backwards holding earth over contacts E1 normal and contacts B1 operated to the *p*-wire of the line finder/final selector and a forward holding earth over contacts B4 to the *p*-wire of the group selector. Contacts B2 remove H. T. from the lead TB to indicate that the trunk is busy and apply this H. T. to the anodes of tubes VK50 to VK55 over contacts D1 normal and resistor R71. At the same time the potential of the junction point of resistors R72 and R73 is increased and as capacitor C50 charges over the circuit including resistor R74 the rise in potential at the trigger electrode of tube VK50 causes this tube to strike.

The subsequent rise in voltage at the junction point of resistors R75 and R76 applies a priming bias to a tube in all the register connectors over lead RCM. A pulse distributing circuit applies a pulse to the trigger electrode of a tube in each free register connector in turn and one which has been marked by the trunk relay set strikes. A positive bias from the cathode of this tube is returned over lead RCF and strikes the diode VN30 to negative battery, in series with resistor R77. The resulting pulse is applied via capacitor C51 to the trigger electrode of tube VK51 which has previously been primed from the cathode of tube VK50 via resistor R78, and tube VK51 fires. The resistor R71, which is a common anode resistor for tubes VK50 to VK55, has a resistance such as to maintain only one of these tubes conducting and tube VK50 is extinguished. Tube VK51 remains conducting because its cathode is still near earth potential due to the relatively slow charging rate of capacitor C52, hence its anode/cathode voltage is greater than that of tube VK50, whose cathode capacitor C53 is fully charged.

The precise circuit operation in the register connector outlined above will be described later.

The firing of tube VK51 raises its cathode potential and the diode VN31 fires in series with resistors R79 and R80. A path is now available for dial tone to reach the subscriber, from lead 20 via capacitor C54, tube VN31, capacitor C55 and the centre winding of relay A, from which it is induced into the balanced outer windings and into the subscriber's line.

On hearing dial tone, the subscriber dials the required number and relay A responds. In the normal position of contacts A1, rectifier MR2 is backed off by the connection to negative battery through resistors R70 and R81, resistor R82 being connected over lead 21 to a point about 25 volts negative. In the operated position of contacts A1, current through relay B and resistor R70 increases the potential at resistor R81, and voice frequency signals from a source 22 are able to pass through the rectifier MR2 due to the reversed bias.

Thus each time relay A, operates, V. F. current is transmitted to the register connector via capacitor C56, rectifier MR2, capacitor C57 and lead RCD and during an impulse train the V. F. signal is interrupted in accordance with the digit dialled. Relay B remains operated during the short releases of relay A because of the short-circuit on its winding.

The release of relay A applies a pulse to the trigger electrode of tube VK52 from H. T. over contacts B2 operated, resistor R92, contacts A2 normal and capacitor C58. Tube VK52 is already primed due to its connection with the cathode of tube VK51 through resistor R83 and the tube therefore strikes at the commencement of dialling. Tube VK51 is thereupon extinguished for the reason mentioned in connection with tube VK50. Hence the diode VN31 is extinguished and dial tone is removed from the subscriber's line.

The dialled impulses are effective in causing a test to be made of the wanted subscriber's line by means which will be described in detail later. As a result of this test a series of impulses is transmitted from the register to the trunk relay set over lead RCP to the trigger electrodes of tubes VK53 to VK55 via capacitors C59 to C61. The number of impulses in the series depends on the condition of the wanted subscriber's line and is as follows:

| | Impulses |
|---|---|
| Line free | 1 |
| Line busy | 2 |
| Line disconnected | 3 |

Tube VK53 is primed by the firing of tube VK52 and an impulse from lead RCP will fire the former. If two impulses are received tube VK54 will be struck, extinguishing tube VK53, and three impulses will cause tube VK55 to strike and tube VK54 to be extinguished.

If only one impulse is received, indicating that the wanted subscriber's line is free, the firing of tube VK53 causes the diode VN32 to strike in series with resistors R84 and R80 and ring tone is transmitted from a source 23 via capacitor C62, diode VN32, capacitor C55 to relay A and the calling subscriber's line. If tube VK54 strikes, diode VN33 is struck and busy tone is transmitted from a source 24, via capacitor C63 and tube VN33 and thence to the calling subscriber's line. In the event of tube VK55 firing, tube VN34 is struck and N. U. (number unobtainable) tone from a source 25 reaches the calling subscriber's line over a similar path including capacitor C64.

Returning to the case when the wanted subscriber's line is free and a connection is completed to it, the firing of tube VK53 applies a positive bias to the grid of the thermionic tube VT10 from the cathode of tube VK53 over resistors R85 and R86. This tube is normally biased to cut-off by negative battery applied to its grid via resistors R97 and R86, but the positive bias now causes the tube to conduct and relay J operates.

In operating, relay J at contacts J1 applies ringing current to the called subscriber's line from a source 26 over the left-hand winding of relay F, contacts J1 operated, F1 normal, subscriber's instrument, contacts F2, resistor R88 to ring return battery over lead 27. Contacts J2 are ineffective at this stage. When the called subscriber replies, a D. C. path is completed at the subscriber's instrument and relay F tends to operate over the ringing circuit. The "x" contacts F3 immediately open the short-circuit on the right-hand winding of the relay which operates fully to earth on the p-wire over the right-hand winding and resistor R89 in series.

Contacts F1 and F2 disconnect ringing current and connect the +ve and —ve conductors between the line finder/final selector trunk and the group selector. Contacts F4 and F5 connect relay D to the line and this relay operates over the called subscriber's loop. Contacts D1 disconnect H. T. from the anodes of tubes VK50 to VK55 which are extinguished. The positive bias is thereby removed from the grid of tube VT10 which is cut off, and slow-release relay J commences to release. Contacts D2 complete a circuit for relay E which operates and contacts D3 apply an additional forward holding earth to the p-wire.

Operation of relay E removes earth from the p-wire at contacts E1 and contacts E2 apply positive battery to the p-wire over contacts J2 operated and B1 operated to operate the calling subscriber's meter. Relay J releases after its slow-release period and contacts J2 in releasing replace positive battery on the p-wire by earth. The rectifier MR3 is included to maintain earth on the p-wire during operation of relay E.

When the calilng subscriber replaces his handset, the line loop is opened and relay A releases. Contacts A1 in closing short-circuit relay B, which releases after a delay, and the V. F. signal from source 22 is again blocked by the rectifier MR2. Relay B in releasing, at contacts B1 removes the holding earth from the p-wire to the line finder/final selector, releasing the two line finder bridges employed in the call. Contacts B2 apply H. T. to lead TB, indicating that the trunk is no longer busy, contacts B3 release relay E and contacts B4 remove one earth connection from the p-wire to the group selector. When the called subscriber replaces his receiver, relay D releases and at contacts D3 removes earth from the p-wire to the group selector. The two bridges employed for the call through the group selector release and relay F also releases.

*Register connector and common control*

Reference will now be made to Figs. 18 to 25 which when arranged as shown in Fig. 30 show the circuit of a register connector and register. In the drawings provision for 100 trunk relay sets and 10 registers is shown by way of example, each register having one register connector. The register connectors are under the control of an allotter and a cyclic testing circuit, the two comprising the common control.

Each register connector, RC1 to RC10 is capable of connecting any of the 100 trunk relay sets to one register and for this purpose each register connector comprises 100 connector units RCU1 to RCU100 which are arranged so that when one unit of a connector is in use the remaining 99 units are prevented from being taken into use.

Each connector unit RCU1 to RCU100 has a group of conductors TRS e. g. TRS1 and TRS100 extending to one of the hundred trunk relay sets. Each connector RC1 to RC10 has a group of conductors REG, e. g. REG10, extending to its associated register and a pair of leads AL extending to an associated tube in the allotter.

The biasing signal from a trunk relay set indicating that a register is required appears on lead RCM, which makes an appearance in each register connector RC1 to RC10.

Hunting for a seized trunk relay set is controlled by a generator and pulse distributor comprising the multivibrator MV2 (Fig. 22) and multi-cathode tubes VMK4 and VMK5. The arrangement is similar to that of the pulse generator and distributor in the line finder/final selector common control circuit. Negative pulses of a frequency of 5 kc./s. are derived from the multivibrator MV2 and applied to the trigger electrode of tube VMK4. This tube has ten cathodes, the first and last of which are shown. The cathodes conduct in turn as pulses are applied and as each cathode conducts a positive bias is applied to the grid of the associated thermionic tube VT20, VT21, and so on, over resistors R101, R102 and so on.

As each cathode conducts, a positive pulse is applied from the pulse inverter tube VT22 via capacitors C70, C71 and so on to the grids of all tens tubes VT20, VT21 and so on and as biases appear on each of these tubes in turn, pulses are transmitted sequentially over the ten leads PL. When the last tube in the series, VT21, receives a pulse, a corresponding pulse from its cathode is applied over capacitor C72 to the grid of the thermionic pulse inverter tube VT23. Corresponding negative pulses are thereby applied to the trigger electrode of tube VMK5 at the rate of 500 C./S.

Tube VMK5 also has ten cathodes which are arranged to conduct in turn on the receipt of negative pulses on the trigger electrode. Positive bias voltages are therefore transmitted over the ten leads BL sequentially at the rate of 500 C./S.

Each of the ten leads BL is connected to the trigger electrodes of ten tubes such as VK60 in each register connector via resistors such as R103, rectifiers such as MR10 and capacitors such as C73 there being 100 tubes such as VK60 in each register connector. Each of the ten leads PL is connected via capacitors such as C74, rectifiers such as MR10 and capacitors such as C73, to the trigger electrode of one tube such as VK60 in each group of ten to which one of the leads BL is common.

Rectifier MR10 is normally biased off by earth potential connected via resistor R104 and negative battery from one of the cathode resistors of VMK5, but the application of a positive bias via resistor R103 when the cathode of VMK5 conducts enables a pulse via capacitor C74 to pass through the rectifier to capacitor C73 and the trigger electrode of the tube.

The particular register connector which is to be used by a calling trunk relay set is determined by an allotter, comprising the ten tubes VK61, VK62 and so on. Each of these tubes is associated with a register connector and it is arranged that one of these tubes associated with a free connector is conducting. Assuming that the register connector RC1 is not in use and that tube VK61 is conducting, a positive bias from the cathode of this tube is applied to rectifiers such as MR11 associated with the trigger electrodes of all tubes such as VK60 in the connector RC1.

Supposing now that a trunk relay set is calling e. g. the first. A bias will be applied to rectifiers such as MR12 associated with tube VK60 in unit RCU1 and to rectifiers associated with the corresponding tube in each of the connectors RC1 to RC10. A bias applied to rectifiers MR10 and MR12 simultaneously, raises the potential of the trigger electrode of tube VK60 and a coincident pulse and bias from leads PL and BL causes the tube to fire.

The firing of tube VK60 returns a positive pulse to the trunk relay set from the cathode over lead RCF as previously mentioned. The rise in voltage across resistor R105, which is common to all units in the connector RC1, biases off the remaining 99 tubes corresponding to tube VK60 and prevents this connector from being taken into use again. The voltage rise is applied via resistor R106 to rectifier MR13, and together with the positive voltage existing at the cathode of tube VK61 which is conducting, biases the grid of the thermionic tube VT24 positive with respect to the cathode. This tube now conducts and pulses applied to its grid from a pulse source 30 via capacitor C75 are amplified and applied to the trigger electrodes of the ten tubes VK61, VK62 and so on via capacitors C76, C77 and so on.

The tube already conducting (VK61 in this case) has primed the next tube by connection of the cathode of the former to the trigger electrode of the latter which then fires. If the register connector RC2 is free, a negative battery connection over the common resistor in the connector (like resistor R105 in connector RC1) and resistor and rectifier in series (corresponding to resistor R106 and rectifier MR13) biases off tube VT24 which cuts off the pulse supply to the other tubes of the allotter. The tube corresponding to connector RC2 thus remains conducting and this connector is the next that will be taken into use. If, however, this connector is already in use when connector RC1 is seized, the positive voltage developed across the common resistor of the former together with the rise in voltage at the cathode of the tube corresponding to connector RC2 in the allotter maintains a positive bias on the grid of tube VT24. A further pulse from the pulse source 30 is then applied to the trigger electrodes of tube VK61, VK62 and so on and the next in sequence strikes, extinguishing the one previously conducting. A similar test is made to determine whether the corresponding connector is in use and the allotter eventually stops with the tube corresponding to the first free connector conducting.

Returning now to the register connector RC1, the register connector unit RCU1 and the tube VK60 which is now conducting, the rise in potential at the cathode of this tube is sufficient to strike the diode VN40 to negative battery over resistor R107. A bias is thereby applied to the trigger electrode of tube VK63 via resistor R108.

The diode VN41 strikes in series with resistors R100 and R109 to negative battery to prepare a path for a test to be made over lead GTL by the group selector common control circuit to determine whether the group selector is free for this call. Diode VN42 strikes to negative battery in the circuit: cathode of tube VK60, resistor R110 and winding of transformer TR2. Voice frequency current from the trunk relay set now has access over lead RCD via capacitor C106 and diode VN42 to this transformer. Diode VN39 also strikes in series with resistors R99 and R98 and prepares a path for a signal to be returned from the group selector to the common control circuit over GSL.

Register

From the secondary winding of transformer TR2, the V. F. signal indicating that subscriber is about to dial is applied to the grid of the thermionic tube VT25 via resistor R111. The amplified signal is rectified in the voltage doubling circuit comprising rectifiers MR14 and MR15 and capacitors C107 and C108 and is used to bias the grid of the thermionic tube VT26, by connection over resistor R112. This tube is normally biased beyond cut-off by the negative battery connection over resistors R113 and R112, and the application of the rectified V. F. signal causes it to conduct.

Diode VN43 is normally conducting and the potential of its cathode is sufficient to bias the thermionic tube VT27 so that it conducts, but the drop in anode voltage of tube VT26 when the latter starts conducting causes the diode VN43 to be extinguished. The rectified V. F. signal, however, applied via resistor R112 and rectifier MR16 biases the grid of tube VT27 positively with respect to cathode and this tube remains conducting. The reduced voltage at the anode of tube VT27 prevents tube VK100 from firing.

Tube VT28 (Fig. 22) is normally conducting because of the positive voltage applied to its grid via resistor R118 from the potential divider comprising resistors R115, R116 and R117. The voltage drop at the anode of tube VT26 when the latter starts to conduct reduces the potential of the grid of tube VT28, which is cut off. The rise in voltage at the anode of tube VT28 charges capacitor C78 through resistor R119 and when the potential on the trigger electrode has risen sufficiently tube VK64 will strike. Tube VK65 will also strike in the same way, but it is arranged that resistor R120 and capacitor C79 have a comparatively long time constant and tube VK65 fires after tube VK64.

When tube VK64 fires the rise in voltage at its cathode is applied to a pulse repeater circuit PR10 which transmits a pulse to two groups of pulse repeaters comprising tube VK66, VK67 and so on and VK68, VK69 and so on. The repeaters in these two groups are each associated with a set of digit storing tubes for storing the information transmitted by the subscriber's dial. In the drawing provision is shown for three code digits (determining the wanted exchange) and four numerical digits (determining the wanted line within the exchange) to be stored. This is shown by way of example and may be altered to suit the requirements of any selection system. In the arrangement shown, then, there are three pulse repeaters represented by tubes VK66 and VK67 associated with code digit storing circuits CDS1 to CDS3 and four pulse repeaters represented by tubes VK68 and VK69 associated with numerical digit storing circuits NDS1 to NDS4.

The application of this first pulse from pulse repeater PR10 to all the seven pulse repeater tubes is not effective because the tubes are not yet primed. When tube VK65 (Fig. 22) fires, the rise in voltage at its cathode is applied to pulse repeater PR11 and a pulse is thereby applied to the trigger electrode of tube VK70 via capacitor C80. This tube is already primed by a positive battery connection over resistor R121 and it therefore fires. The rise in voltage at the cathode of tube VK70 is applied to the trigger electrode of tube VK71 via capacitor C81 and the tube, which is primed by an earth connection over resistor R122, thereupon fires. This tube is the first of three tubes VK71, VK72 and so on, comprising a distributor circuit for the code digits. The rise in voltage at the cathode of tube VK71 is employed to prime via resistor R123 the pulse repeater tube VK66, associated with the first code digit storing circuit CDS1.

The rise in voltage at the cathode of tube VK70 is also applied to the trigger electrode of the pulse repeater tube VK73 via capacitor C82. This tube is primed by earth connection over resistor R124 and consequently fires. The rise in potential at its cathode is sufficient to strike the diode VN44 to negative battery in series with the resistor R125 and the resulting pulse is applied to the trigger electrode of tube VK74 in circuit CDS1 via capacitor C83. The latter tube is already primed by the positive battery connection over resistor R126 and the tube therefore fires.

The firing of tube VK73 also fires tubes corresponding to tube VK74 in all the other digit storing circuits. Tube VK75 in circuit CDS3 is primed by the positive battery connection over resistor R127 and the rise in voltage at the junction joint of resistors R128 and R129 when tube VK73 fires is applied to the trigger electrode of tube VK75 via capacitor C84 and the latter tube fires. Similarly tube VK76 fires when the same voltage rise is applied to its trigger electrode via capacitor C85.

The initial pulse from pulse repeater PR11 is also applied to the trigger electrode of tube VK77 via capacitor C86. This tube is primed by earth connection over resistor R130 and consequently it fires. The rise in voltage at its cathode strikes the diode VN45 to negative battery in series with resistor R131 and the resulting voltage rise across this resistor applies a priming bias to the trigger electrode of the pulse repeating tube VK101 via resistor R132.

After a brief interval the subscriber commences dialling and the V. F. signal received by tube VT25 is interrupted for the duration of the break period of each impulse. During the train of impulses corresponding to the first digit therefore, tube VT26 is repeatedly cut-off due to the fluctuations in voltage at the anode of tube VT25. The consequent successive rises in voltage at the anode of tube VT26 are insufficient to strike the diode VN43, but the bias on tube VT27 is controlled by the anode voltage of tube VT25 and tube VT27 is cut-off once for each impulse in the train. The rises in voltage at the anode of this tube, however, are not maintained long enough to charge capacitor C87 through resistor R133 sufficiently to strike tube VK100.

The rises in voltage at the anode of tube VT26 during impulsing are applied to the grid of tube VT28 which conducts once for each impulse in the train. On receipt of the first impulse, the reduction in voltage at the anode of this tube causes tubes VK64 and VK65 to be extinguished. The time constant of the circuit comprising resistor R120 and capacitor C79 is such that tube VK65 does not fire again during the impulse train, rectifier MR17 being included to provide a rapid discharge path for capacitor C79 to prevent its charge building upon successive impulses. Tube VK64, however, is struck at the end of each impulse and is extinguished at the beginning of the following one.

Positive voltages are therefore generated at the cathode of tube VK64 corresponding to the dialled impulses. Corresponding pulses from the pulse repeater PR10 are applied to the trigger electrodes of the seven repeater tubes VK66, VK69 and so on. Of these, only tube VK66 is at present primed by the first tube VK71, of the code digits distribution circuit being fired. Pulses from the pulse repeater PR10 applied to tube VK66 via capacitor C88 are repeated at the cathode of the tube, which, like the other pulse repeating tubes, is arranged to be self-extinguishing as previously described.

From the junction point of resistors R134 and R135, pulses corresponding to the first dialled digit are applied to the trigger electrodes of the ten tubes VK78, VK79, VK80 and so on via capacitors C89, C90, C91 and so on. Tube VK78 is primed by its connection to the cathode of the already conducting tube VK74 by resistor R136 and the first impulse causes tube VK78 to strike. Tube VK74 is thereby extinguished due to the voltage drop in the common anode resistor R137 as previously described. Successive impulses in this train cause the tubes to strike in turn, each one firing extinguishing the one previously conducting. The tube remaining conducting at the end of the train of impulses representing the first code digit is an indication of the digit dialled.

If the subscriber's receiver rest has been accidently depressed to simulate a single dialled impulse or if the subscriber has inadvertently dialled "1" as the first digit, tube VK78 remains conducting and the pulse repeating tube VK81 is primed by the connection of its trigger electrode to the cathode of tube VK78 by resistor R138 and the pulse repeating tube VK101 will be backed off by the connection to its cathode via rectifier MR18 from the cathode of tube VK78.

At the end of the first impulse train tube VT28 is again cut-off and tube VK64 remains conducting. During the interdigital pause, capacitor C79 becomes sufficiently charged to cause tube VK65 to strike and the rise in voltage at the cathode of this tube results in a pulse being delivered by the pulse repeater PR11.

If tube VK81 is primed as a result of the dialling of "1" as the first digit, a pulse from pulse repeater PR11 applied to the trigger electrode of this tube via capacitor C92 will cause the tube to strike. The rise in voltage at its cathode will be sufficient to strike the diode VN46 to negative battery in series with resistor R125 and the resulting pulse will strike tube VK74 and tube VK78 will be extinguished. Conditions will now prevail as before the commencement of dialling.

In the normal event of one of the remaining nine tubes VK79, VK80 and so on being conducting, the pulse applied to tube VK81 will have no effect since the tube will not be primed. A pulse from the repeater PR11 is applied to the trigger electrode of the pulse repeater tube VK101 which has previously been biased by the firing of tube VK77 and the diode VN45. Tube VK101 will therefore fire and from its cathode a positive pulse will be applied to the second of the three tubes, VK71, VK72 and so on of the code digits distributing circuit via a capacitor such as C93. The tube will already be primed by its connection to the cathode of tube VK71 and the application of a pulse will cause the second tube of the series to fire, extinguishing tube VK71 because of the voltage drop at the common anode resistor R139.

The firing of this tube applies a pulse to prime the second pulse repeater in the series VK66, VK67 and so on i. e. the one associated with the second code digit storing circuit CDS2. The extinguishing of the tube VK71 removes the bias from the pulse repeater VK66.

When the second digit is dialled, the sequence of events is the same as for the first digit. Tube VK65 is extinguished and pulses from the cathode of tube VK64 are applied to the trigger electrodes of the seven pulse repeaters VK66, VK69 and so on via pulse repeater PR10. Only the one which is primed, i. e. the one associated with the circuit CDS2 will deliver pulses and these are effective in striking the tubes in this digit storing circuit in sequence. Circuit CDS2 is similar to circuit CDS3, but no discrimination is necessary against the digit "1."

At the end of the second impulse train, tube VK65 is again fired and a pulse from its cathode is supplied via pulse repeater PR11 and capacitor C94 to fire the pulse repeater tube VK101. The output pulse from this tube is applied to the trigger electrodes of the second and third tubes of the code digits distributor circuit via capacitors such as C93 and tube VK72, which was primed by the firing of the previous tube, will now fire, extinguishing the former. Pulse repeater VK67 now becomes primed from the cathode of tube VK72 and the third code digit will be recorded in circuit CDS3.

One tube in each of the code digit storage circuits CDS1 to CDS3 is now conducting and markings from the cathodes of these tubes will appear in the primary translation field PTF. The object of the translation field is to give an indication of the destination of the call and of the number of code and numerical digits which can be expected by the code and numerical digits distributor circuits. The destination of a call may be determined from the first or the first two code digits dialled and even in the case where three digits are required to route the call to the required exchange, the first or first two digits may determine whether the call is a local one or is for a distant exchange.

For local and non-local calls the number of code digits required may vary. For example, the code digits "0" and "999" may route calls to the manual board at the local exchange, while for regular calls the local exchanges may be distinguished by two digits such as "51." In such a system, it is essential to know how may code digits will be dialled so that the numerical digits will be stored in the correct digit storage circuits.

The cathodes of all the digit storage tubes in the three code digit storage circuits CDS1 to CDS3 with the exception of tube VK78 in cricuit CDS1, are connected to 29 terminals in the primary translation field PTF. Ele ments in the opposite side of the translation field are typified by the three sets of tubes associated with the three resistors R140, R141 and R142. Each of these resistors is connected to a positive battery supply at one end and at the other to a group of diodes, e. g. VN47 to VN49, VN50 to VN52 and VN53 to VN55. The battery tends to strike these diodes in series with resistors in the group R143—R150, but the shunting effect of rectifiers MR19–MR24 reduces the voltage between the electrodes of the tubes.

If, however, the tube in one of the code digit storage circuits to which the rectifier is connected is in the conducting state, the rectifier is backed off by the high voltage at the cathode of the tube and its shunting effect is greatly reduced. Consider, for example, the case of resistor R142. This is shunted by three rectifiers, MR21, MR23 and MR24, which connect respectively to the cathodes of tube VK79 (the second storage tube in circuit CDS1), the last storage tube in circuit CDS2 and the last storage tube in circuit CDS3. Thus if the subscriber had dialled "200" as the code of the required exchange, all three rectifiers would be backed off and the resistor R142 would apply substantially 50 volts to the tubes VN53, VN54 and VN55. These three tubes would then fire in series with resistors R143, R147 and R149 respectively.

The resulting rise in voltage at resistor R143 would be applied over lead LCL to the trigger electrode of tube VK82 via resistor R151 to prime this tube, which is indicative of a call to the local exchange. The voltage rise at resistor R147 would be applied over one of the three leads ECL and resistor R152 to the trigger electrode of the third tube VK84 of the series of three tubes VK83, VK84 and so on, to prime this tube. The three tubes in this series are used to give an indication of the number of code digits required and the priming of tube VK84 indicates that in this case three code digits will be necessary to determine the wanted exchange. Similarly the voltage rise at resistor R149 is applied over one of the four leads ENL and resistor R153 to the trigger electrode of the fourth tube VK86 of the series of four tubes VK85, VK86 and so on to prime this tube. The four tubes in this series are used to give an indication of the number of numerical digits required to determine the position of the wanted subscriber's line and the priming of tube VK86 indicates that in this case four numerical digits will be necessary to complete the call.

The tubes associated with resistors R140 and R141 serve a similar purpose but are connected to other combinations of conductors at their second electrodes. If, for instance, the subscriber dials the digits "21," tubes VN50, VN51 and VN52 will fire after the second digit has been stored in the circuit CDS2. A priming bias is extended over lead NLL to the trigger electrode of tube VK87 via resistor R154, giving an indication that the call is for a distant exchange. A priming bias is also extended over one of the leads ENL to the trigger electrode of tube VK86 via resistor R153, giving an indication that four numerical digits will be required to complete the call. A priming bias is also extended over one of the leads ECL to the trigger electrode of the second tube in the series VK83, VK84 and so on, giving an indication that only two code digits are required to route the call and that the next digit dialled should therefore be stored in the storage circuit NDS1.

In the third example shown, tubes VN47, VN48 and VN49 are arranged to fire when the subscriber dials "0" as the first digit. Since the subscriber merely wishes to be connected to the manual board (say at the local exchange), there will be no further digits dialled, either code or numerical. Tube VK83 is therefore primed over one of the leads ECL, as an indication that only one code digit is required and tube VK88 is primed via lead NN and resistor R155. This latter tube is used as an indication that no numerical digits are to be expected.

The manual board being at the local exchange, tube VK82 will be primed via lead LCL and resistor R151.

It will be appreciated that although only three examples have been given, the translation field is adaptable to cater for any code used in the setting up of a call by the use of more resistors such as R140 and its associated diodes, together with suitable cross-connection to the code digit storing circuits by way of rectifiers. Special conditions may also be catered for by the provision of further common conductors such as NN and so on. For example, a conductor LDL is shown having access to the trigger electrode of tube VK89 via resistor R156. The priming of this tube causes N. U. tone to be connected to the subscriber's line and a diode connected to lead LDL would therefore be arranged to strike if the subscriber dialled a code not allocated to any exchange within the area.

Moreover, provision is shown in the drawings for a maximum of three code digits (three storage circuits CDS1–CDS3, three code digit distributing tubes VK71, VK72 and so on and three associated tubes in the series VK83, VK84 and so on) and four numerical digits (four storage circuits NDS1–NDS4, four numerical digits distributing tubes VK90, VK91 and so on and four associated tubes in the series VK85, VK86 and so on). It will be appreciated, however, that these quantities are not limited to three and four respectively, but can be any number required by facilities offered to subscribers and the trunking arrangements of the network of which the exchange is part.

Assuming, then, that the subscriber has dialled all the code digits required in setting up the call, one tube in the series VK83, VK84 and so on will be primed from the primary translating field PTF. If this is, for example, tube VK84, three code digits will have been dialled and tube VK72 in the code digits distribution circuit will be conducting. From the cathode of this latter tube a positive potential will be applied via resistor R157 to the rectifier MR25. This rectifier is normally backed off by the earth connection over resistor R158, but the positive voltage now applied via resistor R157 renders it conducting in its low resistance direction.

One of the tubes VK82 and VK97 representing a local and non-local call respectively will also be primed and so will one of the tubes in the series VK85, VK86 and so on.

At the end of the train of impulses representing the last code digit, tube VK65 conducts again and the rise of potential at its cathode initiates a pulse from the pulse repeater circuit PR11. The pulse from the repeater is applied to the trigger electrodes of tubes VK83, VK84 and so on via circuits such as: capacitor C95, rectifier MR25 and capacitor C96. The tube in this series which is primed will now fire, provided the correct number of code digits has been dialled to render the associated rectifier, e. g. MR25, conducting. In the case under consideration, tube VK84 fires.

The rise in potential at the cathode of tube VK84 is applied as a pulse via capacitor C97 to the trigger electrode of tube VK92 which is alraedy primed by the earth connection over resistor R159 and this tube now fires. The tubes VK77 and VK92 have a common anode resistor R160 and it is arranged that only one of these tubes can be conducting at a time. Tube VK77 which was previously conducting is therefore extinguished together with the diode VN45 and the priming bias is therefore removed from the trigger electrode of the pulse repeater VK101. The firing of tube VK84 applies a positive voltage via rectifier MR26 to the junction point of resistors R161 and R162 in the cathode circuit of tube VK77 to bias off the tube and prevent it from firing when a pulse from the pulse repeater PR11 is next applied to its trigger electrode via capacitor C86.

The pulse from pulse repeater PR11 applied to the trigger electrode of tube VK101 via capacitor C94 will not strike this because its priming bias has been removed, but the firing of tube VK92 has now applied a priming bias to the trigger electrode of tube VK93 via resistor R163.

The firing of tube VK84 also applies a pulse via capacitor C98 to the trigger electrode of the first tube, VK90, of the series comprising the numerical digits distribution circuit, i. e. tubes VK90, VK91 and so on. Tube VK90 is already primed by earth connection to its trigger electrode over resistor R164 and fires on receipt of the pulse. Tubes VK71, VK72 and so on and VK90, VK91 and so on, share the common anode resistor R139 and the firing of tube VK90 extinguishes the tube previously conducting (VK72).

The rise in potential at the cathode of tube VK90 is applied as a priming bias to the trigger electrode of the pulse repeater tube VK68 via resistor R165, this tube being associated with the first numerical digit storage circuit NDS1.

The pulse from pulse repeater PR11 also tests tube VK89 via capacitor C99 and if this tube is primed from the primary translation field because the subscriber has dialled a spare code, the tube will fire and N. U. tone will be applied to the calling subscriber's line. The circuit details for providing this facility will be described later.

The firing of tube VK84 also applies a testing pulse to the trigger electrode of tube VK88 via capacitor C101. If this tube has been primed from the primary translating field to indicate that no numerical digits are to be expected, the tube now fires and a pulse from its cathode is applied to the trigger electrodes of tubes VK82 and VK87 via capacitors C104 and C105 respectively. One of these tubes will now fire, depending upon which tube has been primed by the primary translation field, to indicate a local or a non-local call. The result of one of these tubes firing will be described later.

Assuming that the call is one requiring numerical selection, the subscriber will continue dialling and at the beginning of the next impulse train tube VK65 will again be extinguished. Tube VK64 will respond again to the dialled impulses, and pulses transmitted via pulse repeater PR10 will again be applied to the trigger electrodes of the pulse repeating tubes VK66–VK69. Tube VK68 is primed by the firing of tube VK90 in the numerical digits distributing circuit and will now fire, repeating pulses from pulse repeater PR10 to the trigger electrodes of all ten tubes in the first numerical digit storage circuit NDS1. These tubes will fire in turn as previously explained, and at the end of the impulse train, the tube remaining conducting will be indicative of the digit dialled.

At the end of the impulse train, tube VK65 will again fire and a pulse from its cathode will be applied by pulse repeater PR11 to the trigger electrodes of tubes VK101 and VK93. Tube VK93, being primed will repeat the pulse to the trigger electrodes of all tubes except the first (VK90) in the numerical digits distribution circuit. The second tube in this series will fire, being primed from tube VK90, which latter tube will be extinguished as previously explained. A priming bias will thereby be applied to the pulse repeater tube corresponding to VK68 but associated with the storage circuit NDS2.

The second numerical digit will be stored in circuit NDS2 and after each digit the conducting tube in the numerical digit distributor circuit is extinguished and the next in sequence strikes, so that the remaining digits are stored in the circuits NDS3 and NDS4.

When the penultimate digit has been completed, a tube will fire in the numerical digits distributor (e. g. VK91) which corresponds to the tube in the series VK85, VK86 and so on (e. g. VK86) which has previously been primed from the primary translation field to indicate the number of numerical digits required. The firing of tube VK91 applies a biasing voltage to rectifier MR27 via resistor R166. At the end of the dialling, when tube VK65 conducts again a pulse applied via the pulse repeater PR11, capacitor C102, rectifier MR27 and capacitor C103 to the trigger electrode of tube VK86 strikes this tube.

A pulse is thereby applied from the cathode of tube VK86 to the trigger electrodes of tube VK82 and VK87 via capacitors C104 and C105 respectively. The one of these tubes which is primed from the primary translating field will strike depending on whether the call is for the local or a distant exchange. Leads MLL and MNL extend from the respective cathodes of these tubes to local and non-local group selector common control connectors. A bias is applied to one or other of these connectors as the appropriate tube fires and if the common control is free a bias is returned over lead RSL. If the common control is busy, the bias remains on the appropriate lead MLL or MNL until the common control is free to deal with the call. The bias returned over lead RSL primes the seven tubes VK95, VK96 and so on, VK97, VK98 and so on associated with the seven digit storage circuits and also the three tubes VK99, VK102 and VK94, for controlling the transmission of ringing, busy and N. U. tones respectively.

The striking of either tube VK82 or VK87 causes the associated diode, either VN85 or VN86 to strike and a bias is applied to the junction point of resistor R210 and R211 in the cathode circuit of tube VK150, which is part of the time throwout circuit. This latter tube is thereby biased off and prevented from firing.

When the connection has been set up, a pulse from the group selector common control circuit over lead CCL is applied via capacitor C145 to the trigger electrode of tube VK99. This tube is already primed from the common control circuit over lead RSL and fires on receipt of the pulse. On firing, tube VK99 applies a pulse via capacitor C112 to the trigger electrode of tube VK125 which is primed by earth connection over resistor R188. Tube VK125 fires and extinguishes tube VK82 or VK87 which removes the bias from tube VK150 in the time throw-out circuit. A pulse from the cathode of tube VK99 is applied via rectifier MR51 and capacitor C146 to the trigger electrode of tube VK63 in the register connector unit RCU1 and to corresponding tubes in the other 99 units of connector RC1. The tube which is primed now fires and repeats the pulse to the appropriate trunk relay set over lead RCP, which applies ring tone to the calling subscriber's line as previously described.

If the called subscriber's line is busy, a pulse from the group selector common control circuit over lead SBL is applied to the trigger electrode of tube VK102 via capacitor C147. The tube is already primed from the common control circuit over lead RSL and fires on receipt of the pulse. A pulse from its cathode is transmitted via rectifier MR51 and is repeated by tube VK63 or its equivalent in the register connector RC1 over lead RCP to the trunk relay set. The rise in voltage at the cathode of tube VK102 is applied via rectifier MR52 and resistor R212 to the trigger electrode of the pulse repeating tube VK151. As capacitor C148 charges through resistor R212, the potential of the trigger electrode of tube VK151 is increased to a point at which the tube fires. The pulse repeated from its cathode strikes the diode VN87 and a further pulse is thereby applied to the pulse repeater VK63 and a second pulse is received by the trunk relay set over lead RCP. The receipt of two pulses, as previously explained, causes busy tone to be applied to the calling subscriber's line.

In the case of the called line being disconnected, tube VK94 is fired by a pulse received from the group selector common control circuit over lead NUL. The firing of tube VK94, or of tube VK89 in the case of a spare code being dialled by the calling subscriber, causes a pulse to be applied via rectifier MR51 and pulse repeater VK63 or its equivalent to the trunk relay set. A charging potential is also applied to capacitor C149 via resistor R213 and when the capacitor is sufficiently charged, the pulse repeating tube VK152 fires. A pulse from its cathode fires the diode VN88 which in turn applies a second pulse to tube VK63 or its equivalent which is repeated to the trunk relay set. From the cathode of tube VK152 a pulse is also applied via rectifier MR53 and resistor R212 to capacitor C148. This capacitor charges and after a brief delay, tube VK151 and diode VN87 fire and a third pulse is repeated by tube VK63 or its equivalent to the trunk relay set. On the receipt of three pulses over lead RCP the trunk relay set applies busy tone to the calling subscriber's line.

In any of the three conditions just mentioned, the first pulse applied to the register connector via rectifier MR51 is also applied via capacitor C150 to the trigger electrode of tube VK152. This tube is already primed by the positive battery connection over resistor R214 and consequently fires. The rise in potential at its cathode charges capacitor C151 through resistor R215 and after a delay the trigger electrode of tube VK153 becomes sufficiently positive to cause the tube to fire. The resulting pulse from its cathode is applied via capacitor C152 to tube VK154 which is already primed by earth connection over resistor R216. Tube VK154 fires and operates relay HE which is arranged to reset the circuit in a manner similar to that described for relay HS in the line finder/final selector. Contacts HE1 disconnect the H. T. supply from all tubes in the sequence counting, distributing and storage circuits of the register and from the tubes corresponding to tube VK60 in the register connector. The tubes which were conducting are now extinguished and relay HE releases again to re-connect the H. T. supply.

In the event of the calling subscriber replacing his receiver before the call is complete, the V. F. signal from the trunk relay set is cut-off and the positive bias is therefore removed from tubes VT26 and VT27. The increased anode voltage of tube VT27 charges capacitor C87 through resistor R133 and when the capacitor is sufficiently charged tube VK100 strikes. The rise in potential at the cathode of this tube applies a pulse via capacitor C153 to the anode of tube VN43 and this pulse together with the high-voltage applied via resistor R115 and rectifier MR54 strikes the diode VN43. The rise in voltage at the cathode of tube VK100 strikes diode VN88 in series with resistor R217 and a pulse is applied via capacitor C150 to the delay circuit described above. After a short delay the H. T. supply is momentarily disconnected to reset the circuit.

In the event of dialling not being completed, the time throw-out circuit operates. Tube VK155 is primed when the register is seized by the application of rectified V. F. signal from tube VT25 via resistor R218. Lead 35 connects the trigger electrode of tube VK155 via capacitor C154 to the "S" pulse source and the next pulse from this source strikes the tube. Tube VK150 is primed in turn from tube VK155 and lead 36 connects the trigger electrode of tube VK150 via capacitor C155 to the "Z" pulse source. The next "Z" pulse fires tube VK150 provided it is not biased off by one of the tubes VK82 or VK87 having fired, and the firing of tube VK150 causes tube VN89 to strike and a pulse to be applied via capacitor C152 to strike tube VK154. H. T. is disconnected as previously described and the register reset. The "Z" pulse follows an "S" pulse after an interval of 30 seconds, which represents the minimum period before the reset circuit operates. Under certain conditions the delay is increased, depending upon the time which elapses between seizing a register and the receipt of an "S" pulse.

*Group selector common control and connector*

The connector circuit comprises a series of 100 tubes, VK110, VK111 (Fig. 26) and so on, each associated with a register by a lead MLL in the case of local calls, or a lead MNL in the case of non-local calls. A pulse and bias distributor circuit MDC2, similar to the circuit MDC1 in the register connector, applies a pulse successively to the trigger electrodes of the hundred tubes via capacitors such as C110. A bias from the distributor is applied to the rectifiers e. g. MR30, associated with the tubes, in groups of ten, and a pulse from the distributor is applied in turn to the ten tubes in each group. The pulse will be blocked by the rectifiers except in the group to which a bias is being applied.

When a register has received its full complement of digits, a bias will be applied over lead MNL or MLL to prime one of the hundred tubes VK110, VK111 and so on and the marked tube will fire when a pulse is received from the distributors. The rise in voltage at the cathode of the tube will return a bias to the register over a lead RSL. This bias strikes the diode VN90 in the register in series with resistor R219 and thereby applies a priming bias to tubes VK94, VK99 and VK102. A priming bias is also applied to the digit display tubes VK95, VK96, VK97 and so on to VK98, and a biasing voltage is applied via resistor R220 to rectifier MR55. The rise in voltage at the common cathode resistor R170 of the common control connector will also be applied to bias positively the grid of a gating tube in the circuit GC5. This allows a V. F. signal from a source 31 to be applied via lead GTL capacitor C156, rectifier MR55 biased to conduct, capacitors C157 and C158 and diode VN41 and through the trunk relay set to the group selector to test whether the group selector with which the calling trunk relay set is associated is free. The V. F. signal will be applied via lead CTL to all registers, but will be blocked by the rectifier corresponding to MR55 in all registers except the one which has seized the group selector common control. All other rectifiers are biased off by the negative potential at resistor R220 but the rectifier MR55 in the register under consideration is rendered conducting by the bias applied over lead RSL. A pulse from resistor R170 (Fig. 26) is also applied via capacitor C111 and rectifier MR31 to the grid of the thermionic tube VT36. Tube VT36 and tube VT35 are connected as a one-shot circuit, that is, a relaxation circuit having one stable and one unstable condition of equilibrium. This circuit is arranged to have a delay time of about 3 ms. Tube VT35 is normally conducting and tube VT36 is cut off by the decreased potential at the anode of tube VT35. The positive pulse applied to the grid of tube VT36 causes the latter to conduct, partly discharging capacitor C113 and thus impressing a negative potential on the grid of tube VT35, which is thereby cut off. After 3 ms., however, capacitor C113 will have re-charged sufficiently to drive the grid of tube VT35 to a potential at which the tube conducts and tube VT36 is again cut off. The effect of this circuit operation will appear later.

If the group selector tested by the V. F. signal is free, a V. F. pulse is returned over lead GSL and is applied to the trigger electrode of tube VK112 via capacitor C114. Tube VK112 is already primed by the earth connection over resistor R174 and fires on receipt of the V. F. pulse. A pulse from the cathode of this tube is applied to the binary circuit BC1. This comprises two thermionic tubes VT37 and VT38 with their anodes and grids interconnected to give the circuit two stable conditions of equilibrium. Tube VT37 is normally conducting so that tube VT38 will be cut off. A pulse applied to the grid of tube VT38 via capacitor C115 will cause this tube to conduct, and a negative pulse from its anode will drive the grid of tube VT37 negative to cut off this latter tube. The grid of tube VT38 will then receive a positive bias from the rise in anode voltage of tube VT37 and will remain conducting. A pulse applied to the grid of tube VT37 via capacitor C116 would then reverse the state of the tubes again.

Thus, when a pulse is received from the cathode of tube VK112, tube VT37 will be cut off and the rise of potential at its anode will strike the diode VN60 and a bias from resistor R175 will be applied to prime the ten tubes of the first digit storage circuit DSC1 comprising the five tubes VK113, VK114 and so on and the five tubes VK115, VK116 and so on. From resistor R175 a pulse is transmitted via repeater circuit PR15 over lead ONL1 to the display tube (VK97) associated with the first numerical digit storage circuit (NDS1) in all registers. The display tubes in only one register will be primed by the group selector common control circuit via its connector circuit over lead RSL, and so only tube VK97 in the calling register will strike. This tube, like the other display tubes, is connected as a pulse repeater, and a pulse will thereby be applied to the cathodes of all the storage tubes in the circuit NDS1.

The tube in this circuit corresponding to the first numerical digit dialled will be conducting and its cathode will therefore be at a higher voltage than those of the remaining nine tubes in the circuit. The increased voltage caused by the firing of tube VK97 will momentarily increase the cathode voltage of the conducting storage tube, e. g. VK117 and its associated diode, e. g. VN61, will strike. A pulse will thereby be returned to the group selector common control over one of the ten leads NDL, according to the digit stored in circuit NDS1.

The pulse will be applied to the trigger electrode of the corresponding tube in all the digit storage circuits in the common control, but since only the tubes in the first digit storage circuit DSC1 are at this time primed, the appropriate tube in this circuit only will fire. If, for example, tube VK117 in the register is conducting, indicating that the first numerical digit dialled was "1," tube VK113 in the common control would be struck by a pulse applied via capacitor C117.

The firing of a tube in the first digit storage circuit causes a voltage rise across the common cathode resistor R176 and a pulse is applied to tube VT37 in the binary circuit BC1 via capacitor C116 to reset this circuit to its original state and thereby remove the priming bias from the tubes of the first digit storage circuit.

The rise in voltage at resistor R176 also applies a pulse to the binary circuit BC2 associated with the second digit storage circuit DSC2. This binary circuit is similar to circuit BC1, and on receipt of the pulse, a priming bias is applied to all the ten tubes in the second digit storage circuit. A pulse is also aplied from BC2 through the pulse repeater PR16 and lead ONL2 to the display tubes of the second numerical digit storage circuits in all registers and in the same way as for the first numerical digit, the second numerical digit is transferred from the calling register to the second digit storage circuit DSC2 and is indicated by the striking of one tube in this circuit.

Similarly for the third and fourth numerical digits, transfer is effected sequentially from the register to the third and fourth digit storage circuits DSC3 and DSC4.

When a tube in the fourth and last digit storage circuit strikes, the rise in voltage across the common cathode resistor R179 resets the associated binary circuit, as in the case of the other digit storage circuits and applies a bias to the gating circuit GC6 and a pulse to the trigger electrode of tube VK118 via capacitor C118. This latter tube is already primed by the earth connection over resistor R180 and consequently fires. The rise in voltage at the junction points of resistors R181 and R182 biases off tube VK123 and prevents it from firing when the one-shot circuit delivers a pulse from the anode of tube VT35, 3 ms. after the group selector common control has been seized. The rise in anode voltage at tube VT35 strikes the diode VN63 and a pulse is applied to the trigger electrode of tube VK123 via capacitor C119. Tube VK123 would only fire if after 3 ms. the four digits have not been transferred from the register and in consequence tube VK118 has not been struck.

The bias applied from resistor R179 to the gating circuit GC6, which is similar to the circuit GC5, allows a V. F. signal from a source 32 to be applied to the trigger electrodes of 20 tubes arranged in two groups of ten comprising VK119, VK120 and so on and VK 122 and so on. These tubes are connected to the final selector marking circuits in the common control circuits of the line finder/final selectors of the local exchange.

The first and second numerical digits establish the 500-line group and hence the marking circuit with which the wanted subscriber is associated. The tube which has fired in the first digit storage circuit DSC1 causes its associated diode to fire in series with the appropriate one of the ten resistors R183, R184 and so on. Thus if tube VK113 is fired, VN62 fires in series with resistor R183. Each of the ten resistors R183, R184 and so on, is associated with two of the 20 tubes VK119, VK122 and so on. The first resistor is associated with the first and eleventh tubes, the second resistor with the second and twelfth tubes and so on. In the examples shown, resistor R183 is connected to the trigger electrode of tube VK119 via rectifier MR32 and to the trigger electrode of the eleventh tube VK121 via rectifier MR36, while resistor R184 is connected to the trigger electrode of the tenth tube VK120 via rectifier MR34 and to the trigger electrode of the twentieth tube VK122 via rectifier MR38.

The first five tubes in the second digit storage circuit DSC2 have a common cathode resistor R185 and the remaining five tubes have a common cathode resistor R177. These two resistors are connected to the resetting lead of the binary circuit BC2 via rectifiers MR40 and MR41 respectively which are inserted to prevent back-coupling. The resistors are also connected respectively to the trigger electrodes of the first ten and the second ten tubes of the series VK119, VK122 and so on. In the drawing, resistor R185 is shown connected to the trigger electrode of tube VK119 via rectifier MR33 and to the trigger electrode of tube VK120 via rectifier MR35, representing the first ten tubes, while resistor R177 is shown connected to the trigger electrode of tube VK121 via rectifier MR37 and to the trigger electrode of tube VK122 via rectifier MR39, representing the second ten tubes.

Assuming that the wanted subscriber is connected in the first 500-line group, i. e. the one to which tube VK119 is connected, the first dialled numerical digit will be "1" and the second will be any of the digits "1" to "5." The arrangement of rectifiers connected to the trigger electrodes of tube VK119 or of the remaining 19 tubes is such that when no tubes in the first or second digit storage circuits are conducting the voltage on the trigger electrode concerned is that of negative battery. If a bias is applied to only one of the rectifiers by an associated tube in only one of the first or second digit storage circuits being fired, the voltage on the trigger electrode rises to slightly above that of negative battery, due to the high back resistance of the biased rectifier. If, however, both rectifiers are biased because on associated tube in both the first and second digit storage circuits is fired, the trigger electrode rises in potential to a value sufficient to prime the tube.

Thus in the case under consideration, tube VK119 is primed by the simultaneous rise in voltage across resistors R183 and R185 and the V. F. signal, which is applied from the source 32 to all 20 final selector marking tubes, is applied to the trigger electrode of tube VK119 via capacitor C120 and tends to strike this tube. If, however, the line finder/final selector common control is in the process of setting up an outgoing call, a bias is returned over lead FSB which biases off tube VK119 by raising the potential of the junction point of resistors R186 and R187 and thus of the cathode of the tube so that the tube cannot strike as long as the line finder/final selector common control is in use. The tube will, however, fire later when the line finder/final selector common control is free and the bias removed from lead FSB, because the V. F. signal remains on the trigger electrode of the tube.

When tube VK119 fires, the rise in voltage at its cathode causes the diodes VN64 and VN65 to fire and biases are applied to the line finder/final selector common control circuit over leads ICW and ICP. Meanwhile the numerical digits are being displayed to all line finder/final selector common control circuits over the 25 multipled conductors. Of these conductors, 10 "units" leads UDL are taken from the ten cathodes of the fourth digit storage circuit, 10 "tens" leads TDL are taken from the ten cathodes of the third digit storage circuit and 5 "hundreds" leads HDL are taken from the ten cathodes of the second digit storage circuit. In this last case, cathodes 1 and 6 are connected through rectifiers to the first lead, cathodes 2 and 7 through rectifiers to the second lead, and so on.

When the call is set up, a pulse is returned to the common control from the group selector over one of the 20 leads CSL. All the tubes VK126, VK127 and so on, are primed by an earth connection to their trigger electrodes and the tube which receives a pulse from a lead CSL is struck. All these tubes have a common cathode resistor R221 and the rise in potential at this resistor when one of the tubes fire strikes diode VN91 in series with resistor R222. From resistor R222 a pulse is applied to the register over lead CCL indicating that the connection has been set up. The rise in voltage at resistor R221 also strikes the diode VN69 in series with resistor R224. A pulse is thereby applied to the trigger electrode of tube VK128 which is primed by earth connection over resistor R225. Tube VK128 therefore fires.

Tube VK128 controls the circuit reset relay HF, which is pre-energised over its right-hand winding in series with resistor R226. Relay HF operates when tube VK128 fires and at contacts HF1 disconnects the H. T. supply from all the cold cathode tubes of the group selector common control and also from certain tubes in the group selectors which are supplied over lead HTL.

If the called line is busy, a pulse is returned from the final selector over lead LSB and is applied to the trigger electrode of tube VK128 via rectifier MR42. The tube fires and the circuit is reset as described above. The pulse from lead LSB is extended via lead SBL to the register.

If the called line is disconnected, a pulse is returned from the final selector over lead LNU and is applied to the trigger electrode of tube VK128 via rectifier MR43. The tubes fires and resets the circuit. The pulse from lead LNU is extended to the register over lead NUL.

In the event of the fourth numerical digit not having been transferred from the register to the storage circuit DSC4 within 3 ms. of the common control being seized, a pulse from the time throw-out circuit is effective in striking tube VK123 and the diode VN67 strikes in series with resistor R224. A pulse is thereby applied to the trigger electrode of tube VK128 which fires and the circuit is reset.

When tube VK128 fires, diode VN66 strikes in series with resistor R227 and a pulse is transmitted over lead LCC to the line finder/final selector common control circuit indicating that the call has been set up.

*Group selector*

Referring to the trunking diagram of Fig. 14, 100 trunks 1TK—100TK from 100 trunk relay sets terminate on 10 primary crossbar switches P1 of the 10 x 20 type, i. e. having 10 select magnets and 20 bridge magnets. Ten contact columns are multipled from bridge to bridge on each primary switch, so that each incoming trunk is capable of being connected to any of the bridges BR1 to BR20 of the switch on which the trunk terminates. Outlets from the bridge commons of the primary switches are numbered 1 to 20.

There are 20 secondary switches S1 to S20, which are shown by way of example as being of the 10 x 20 type. 200 links 1LK to 200LK extend from the bridges of the primary switches and terminate on the secondary switch contact columns, which are multipled from bridge to bridge as in the primary switches. The first link from each of the ten primary switches terminates on the first secondary switch, the second link from each of the primary switches terminates on the second secondary switch and so on. The outlets from the secondary switches are again taken from the bridges, which are numbered 1 to 20. In the case shown in the diagram, 400 outgoing trunks OGT are taken from the secondary switches and are arranged in 20 groups GP1 to GP20. These will give access to the 20 groups of subscribers' lines by way of the final selectors. Further outlets will be required for switching to junctions outgoing to other exchanges, but these are not shown, and would comprise further bridges added to the secondary switches. This may entail the use of additional secondary switches connected in parallel with those giving access to the local exchange.

Since each link has access to any of the outgoing trunks from the secondary switch on which the link terminates and each incoming trunk to a primary switch has access to any of the links from that primary switch, it follows that any one of the incoming trunks 1TK to 100TK can be connected to any of the 400 outgoing trunks OGT.

It will be appreciated that, in order to cater for the traffic requirements of the exchange, several group selectors may be provided, each associated with 100 trunk relay sets.

Figure 15:
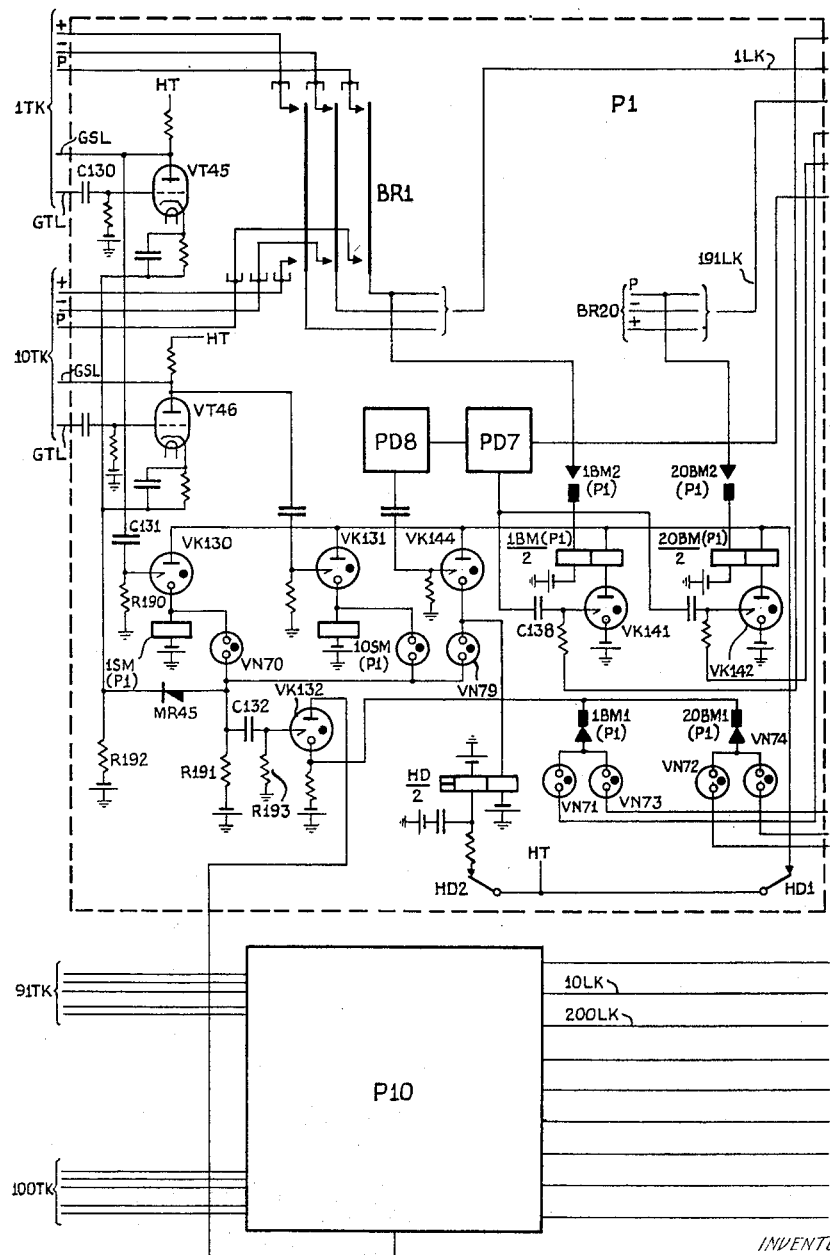
Figure 16:
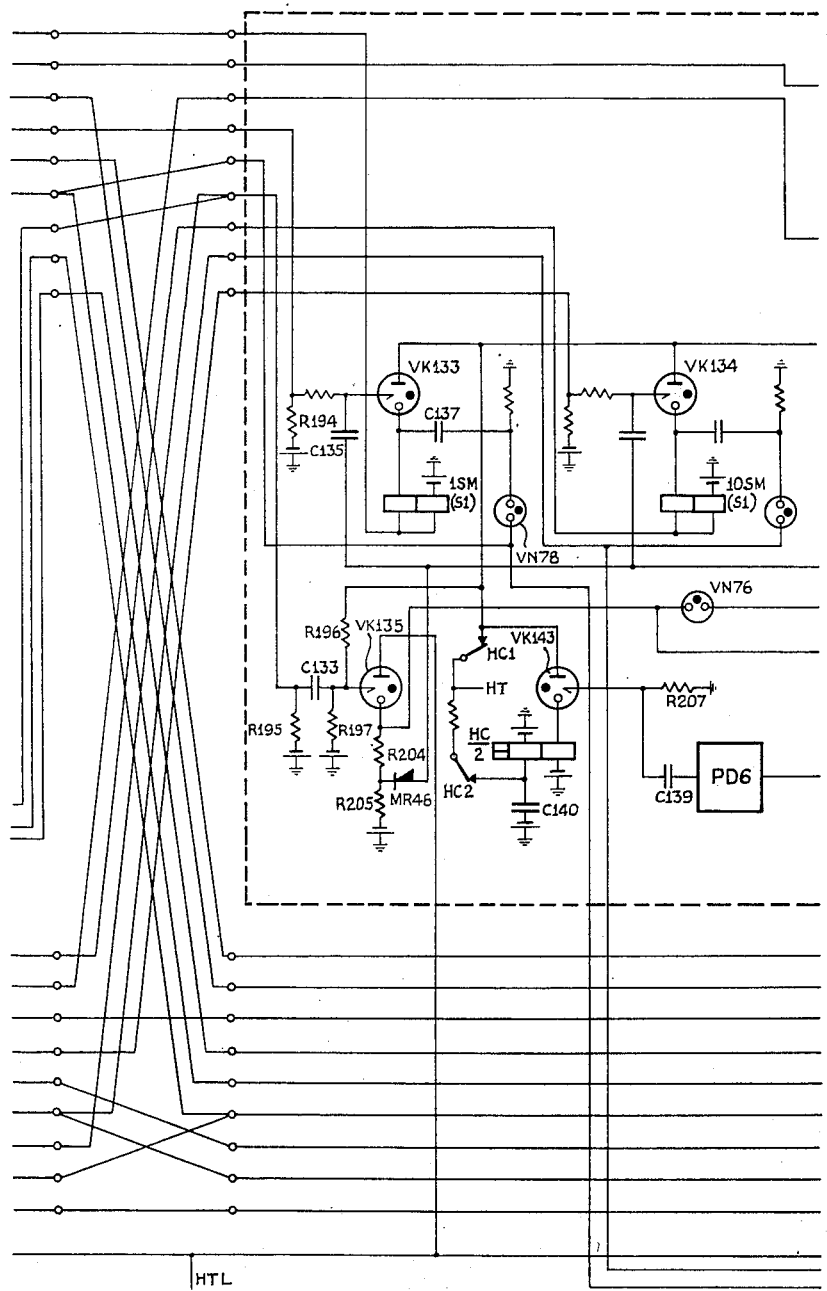
Figure 17:
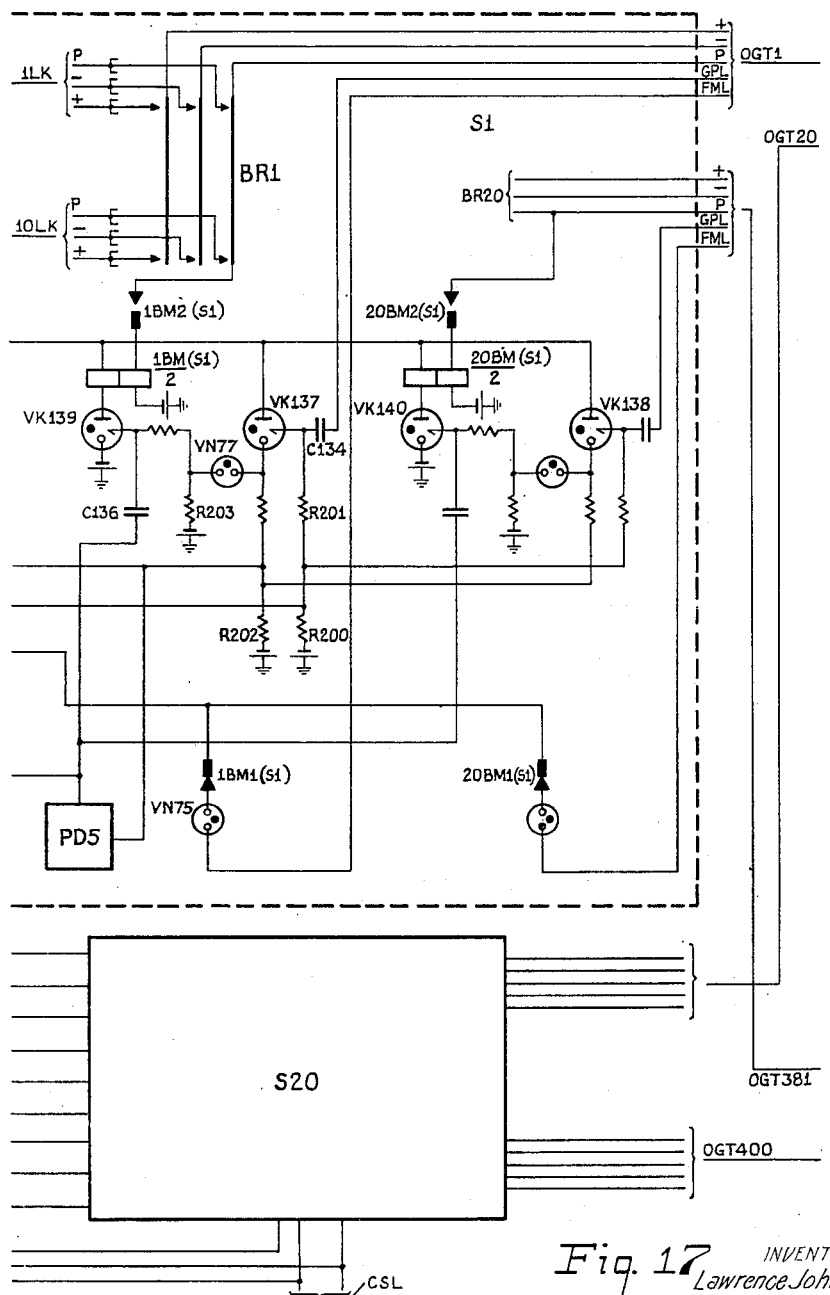
Figure 18:
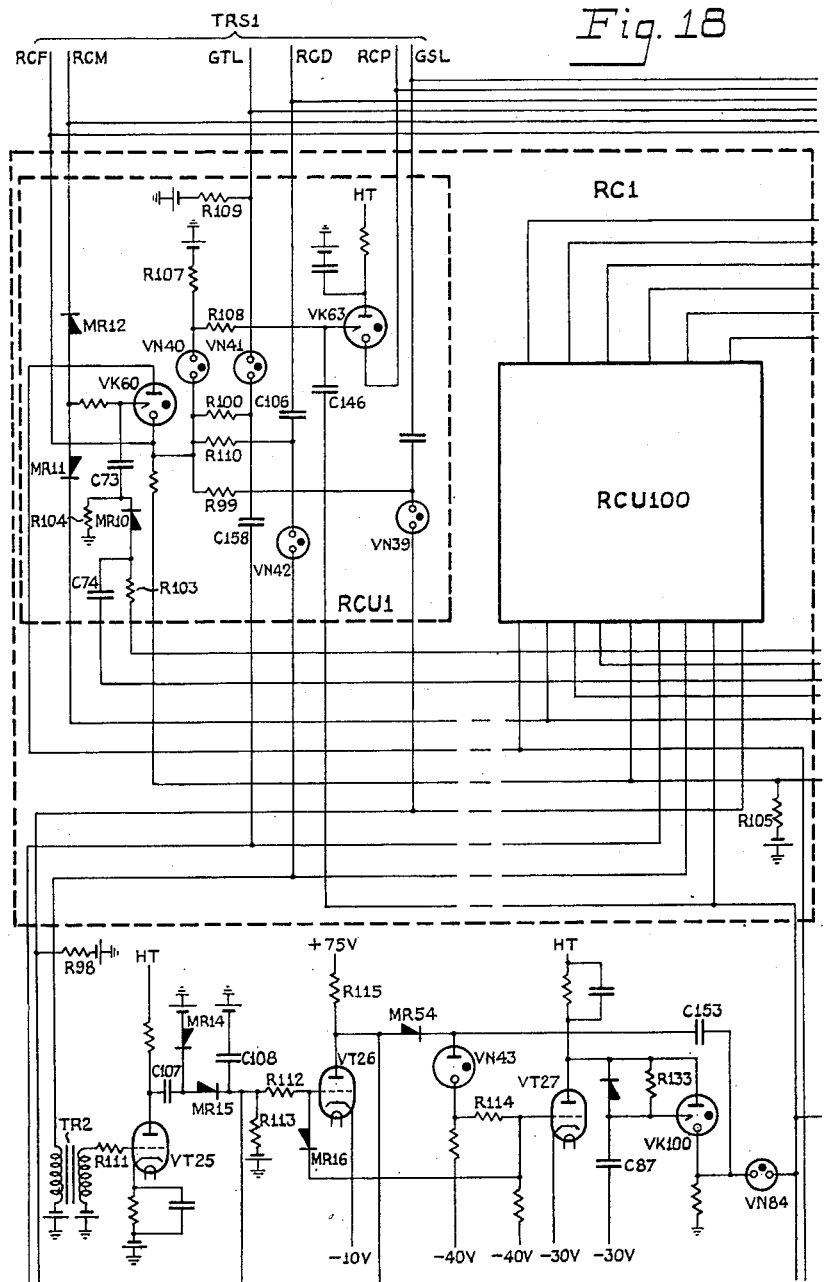
Figure 19:
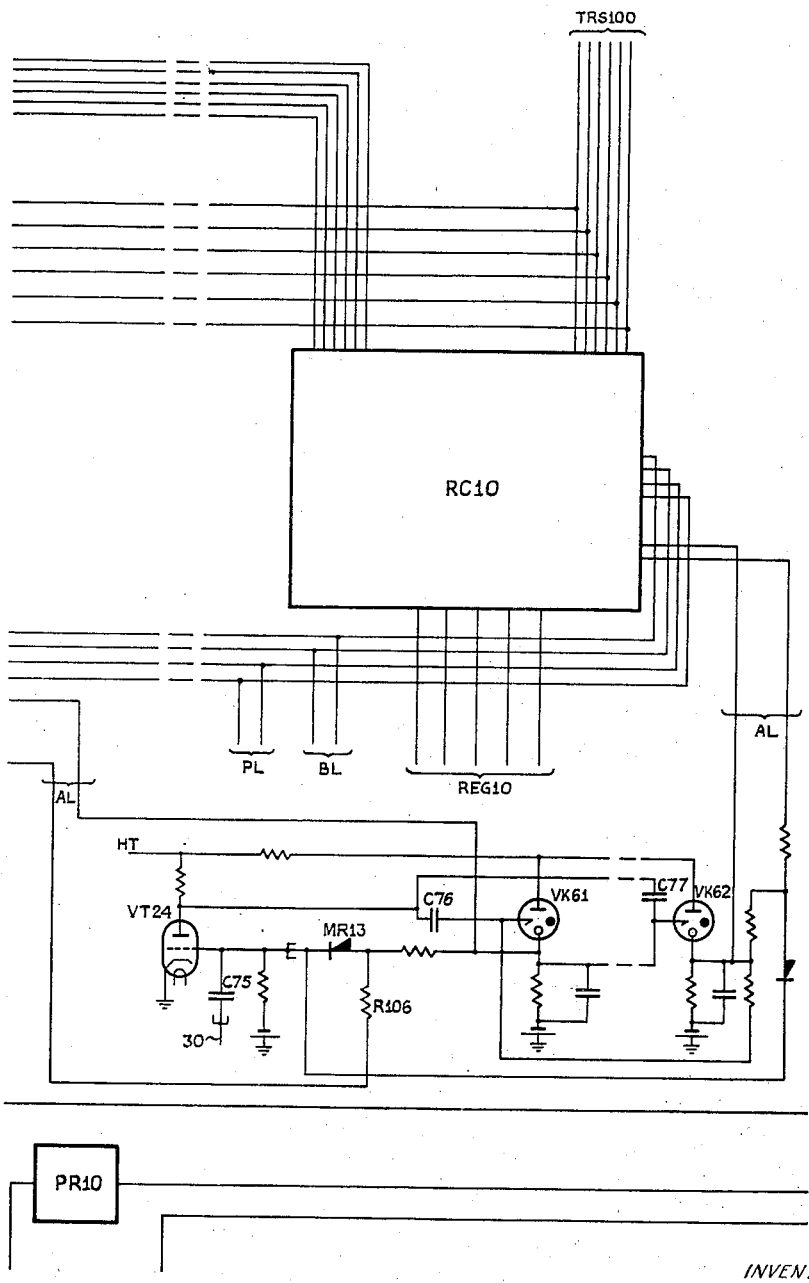
Figure 20:
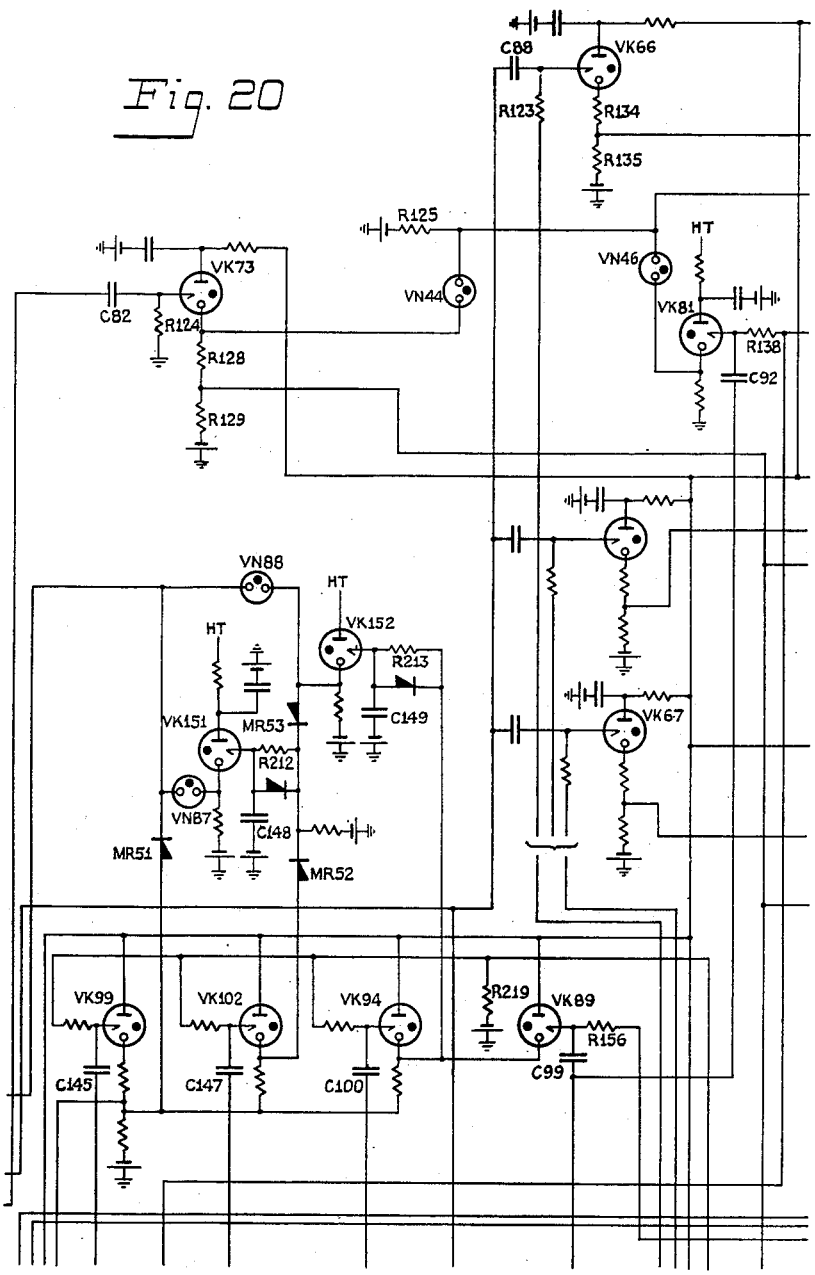
Figure 21:
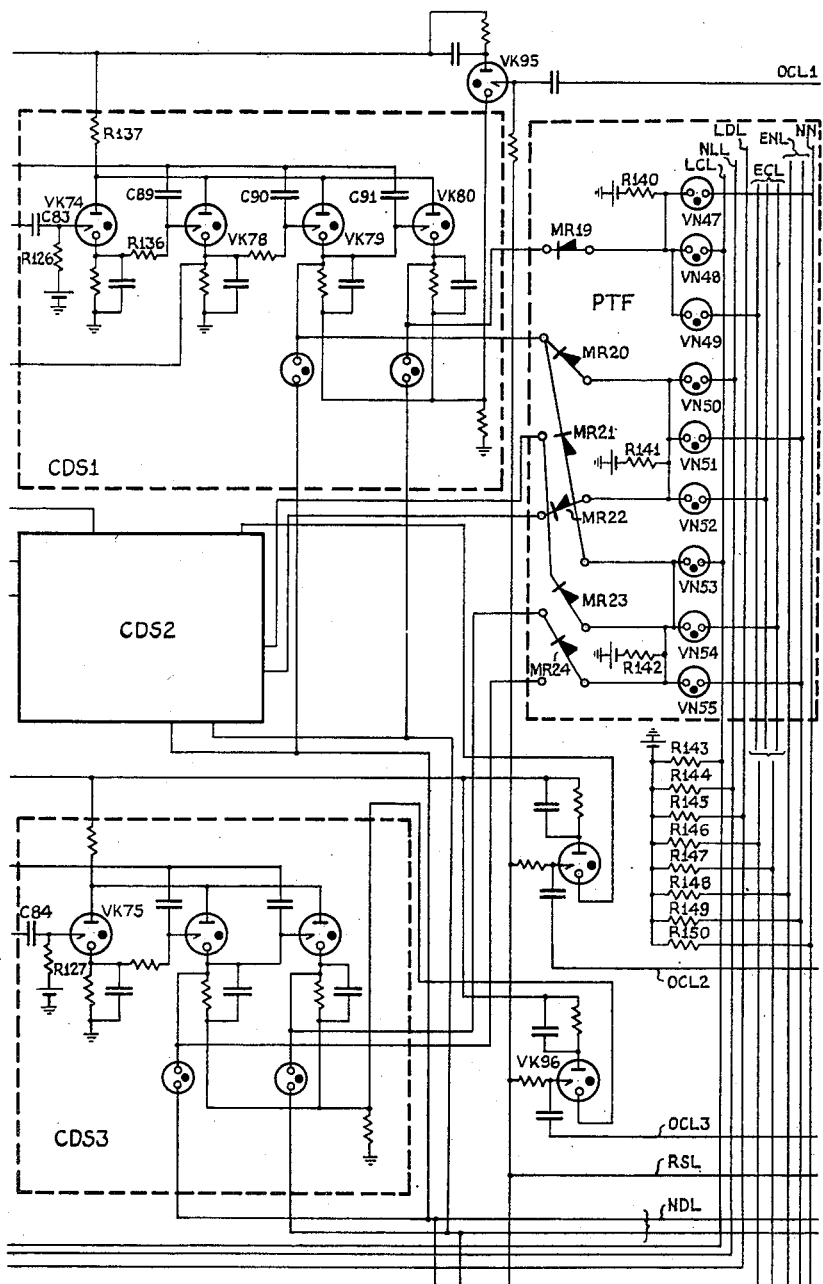
Figure 22:
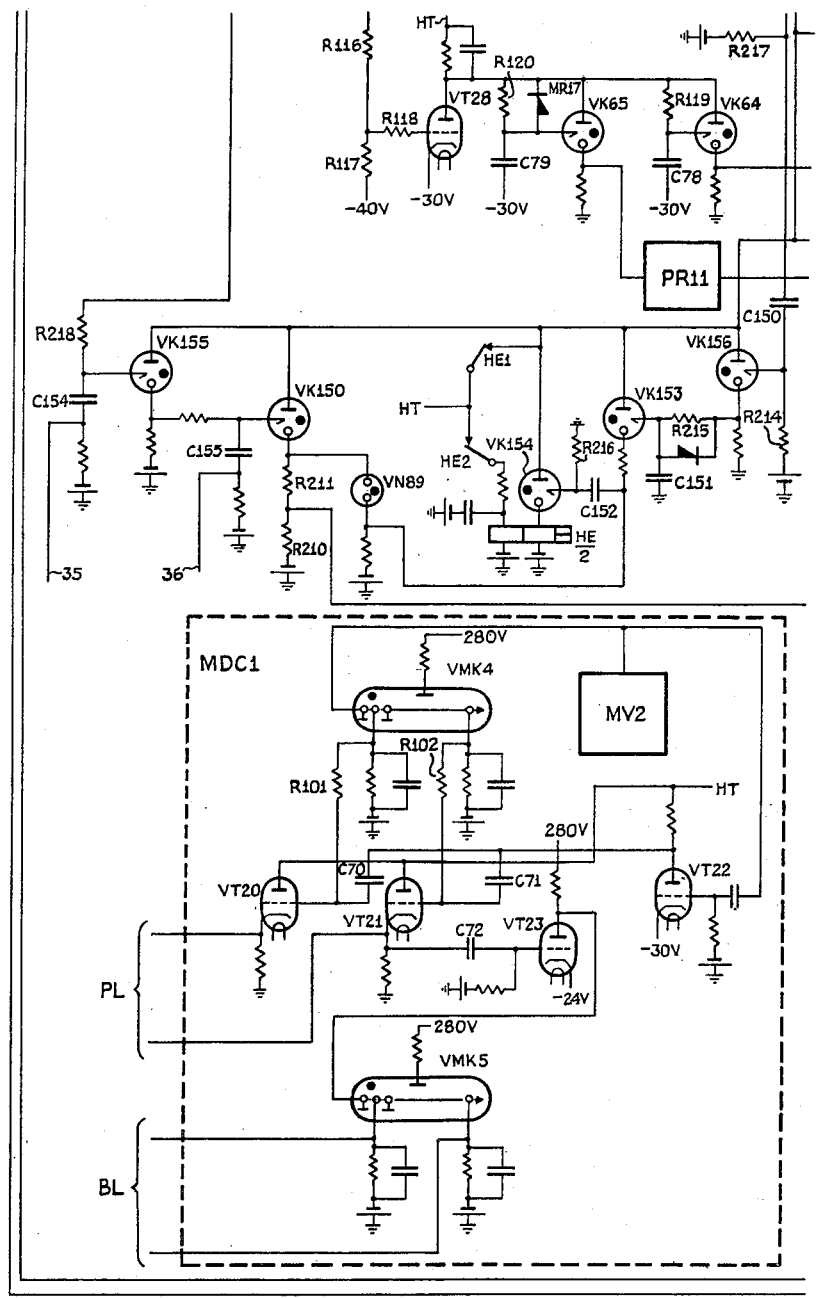
Figure 23:
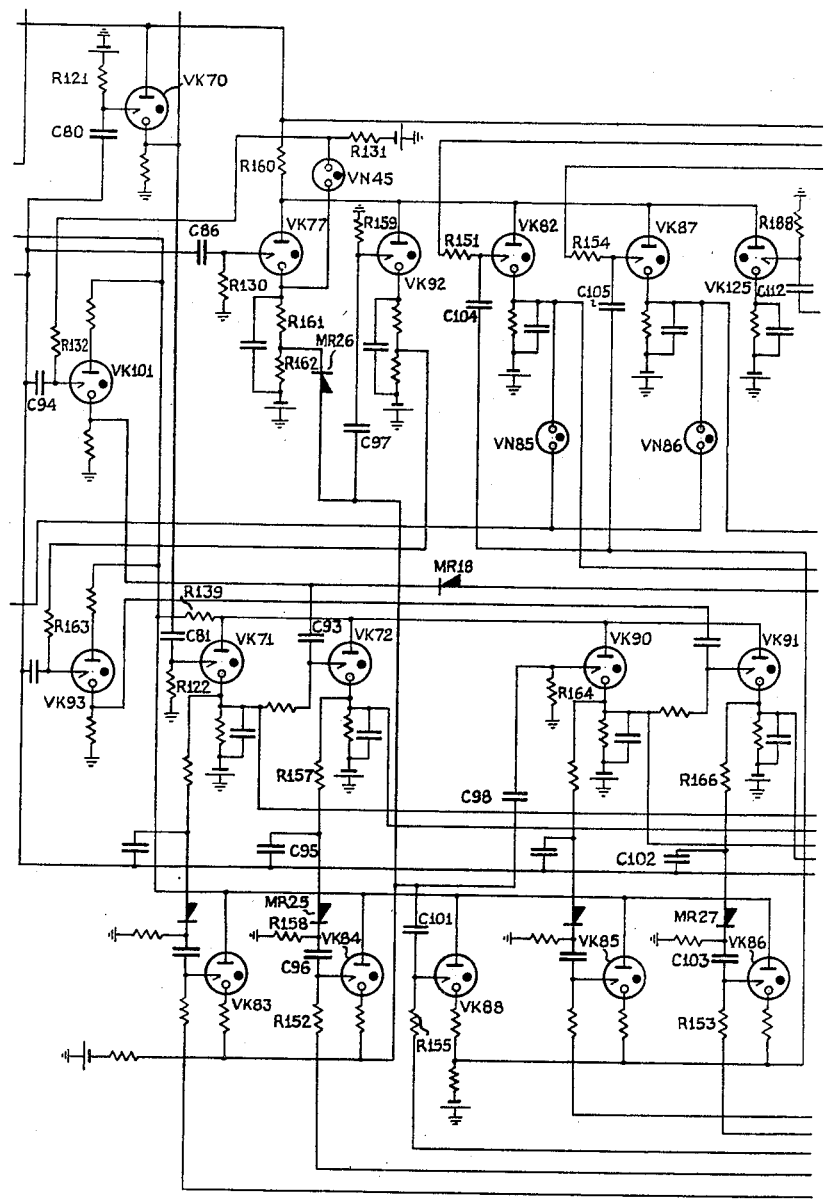
Figure 24:
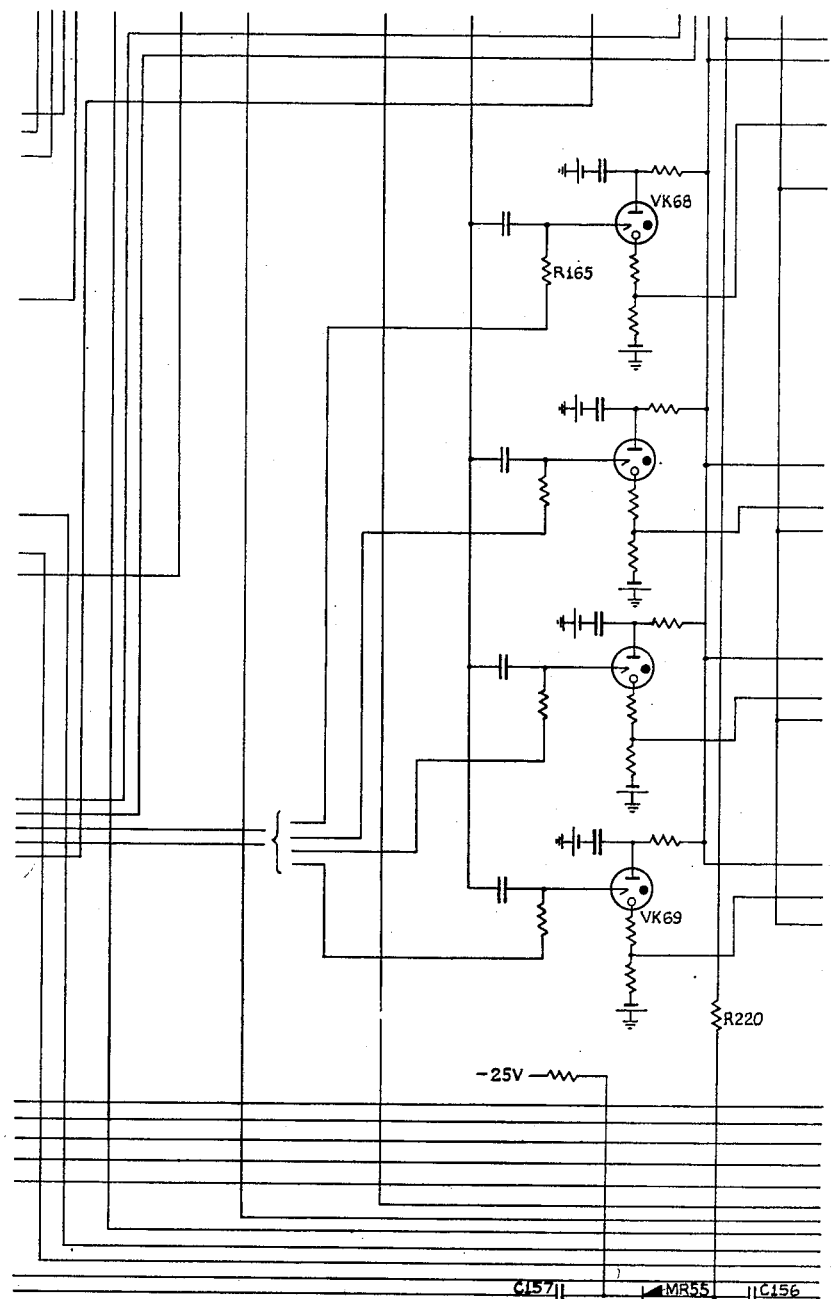
Figure 25:
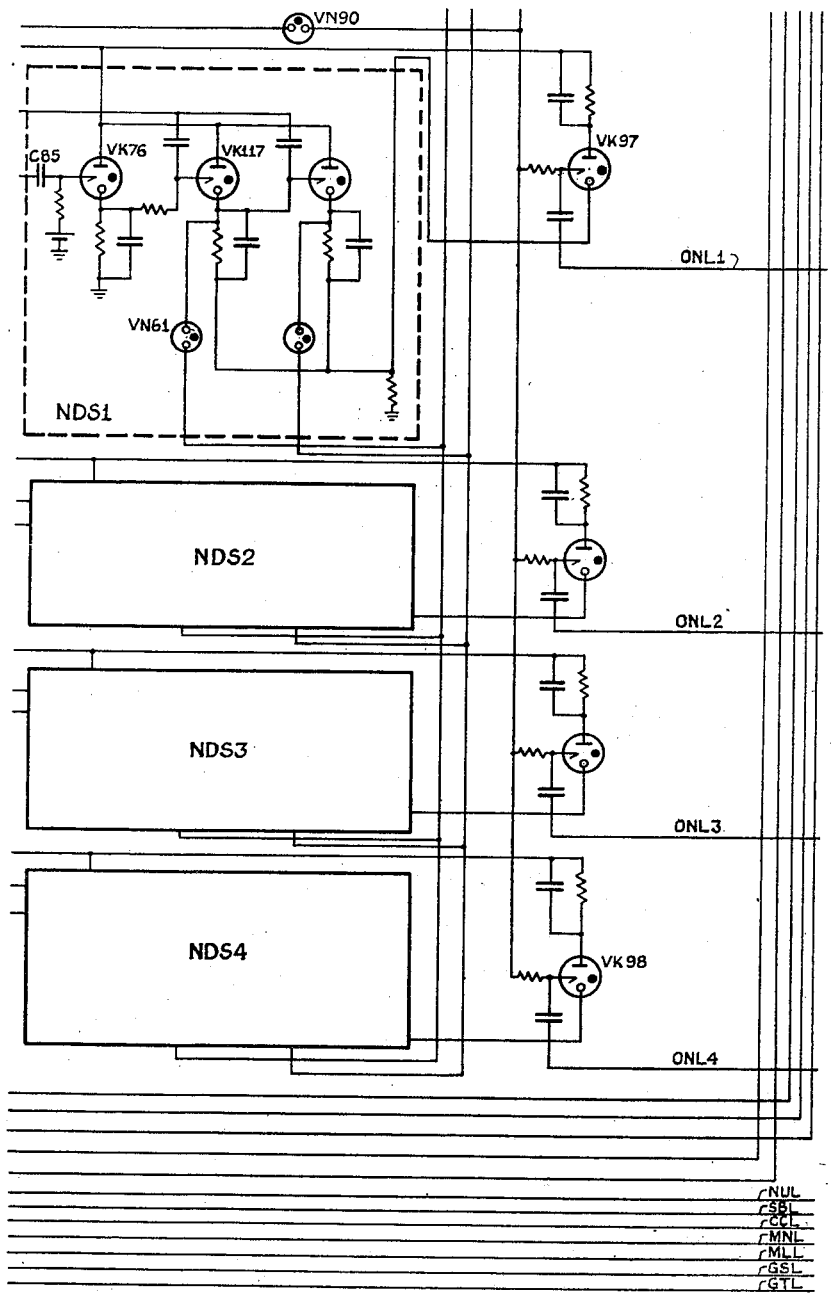
Figure 26:
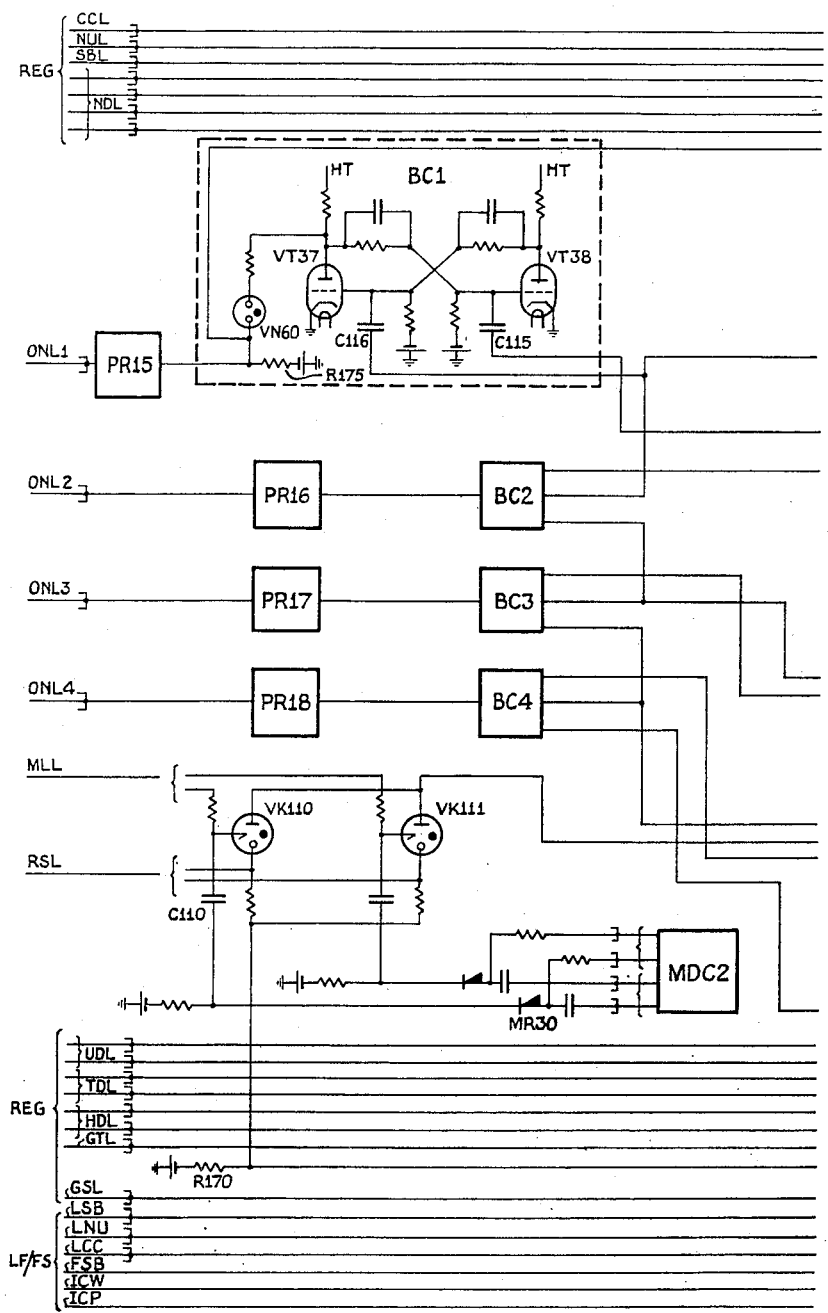
Figure 27:
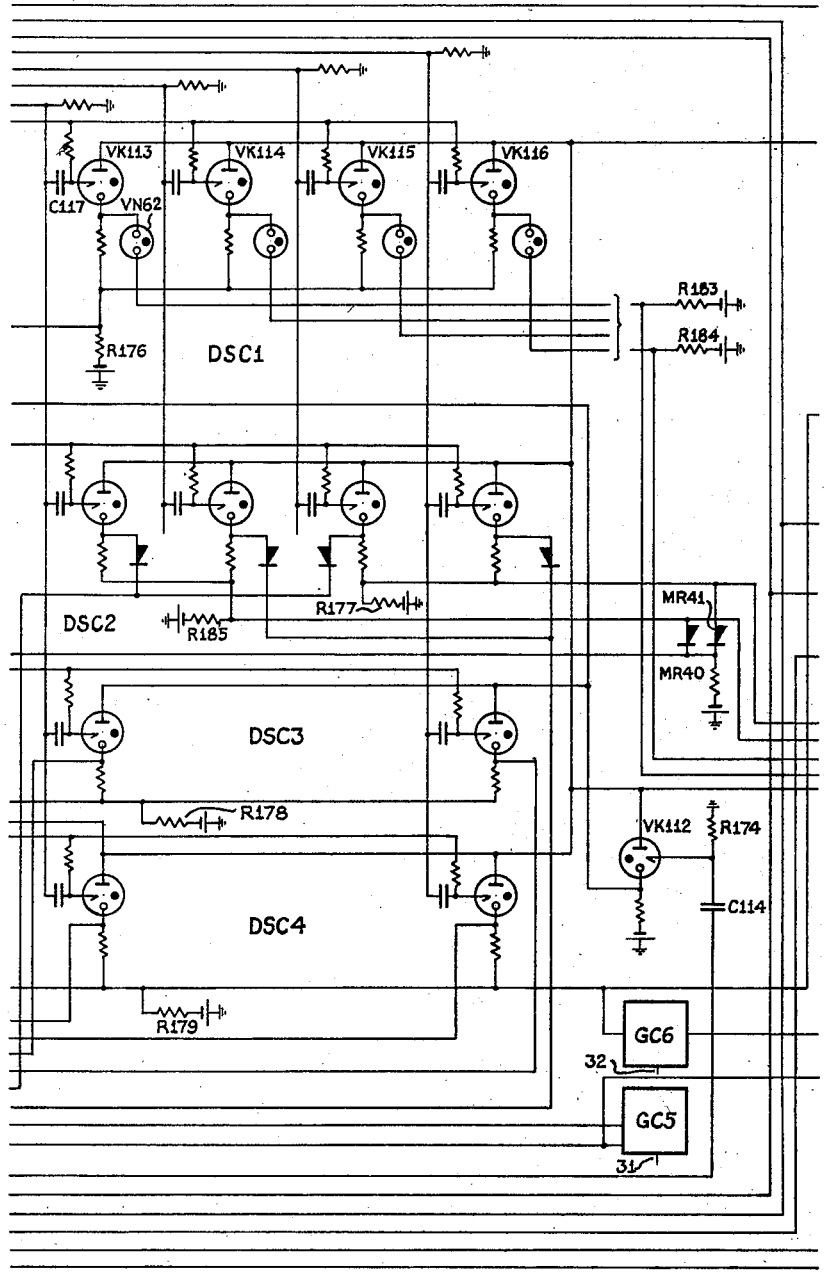
Figure 28:
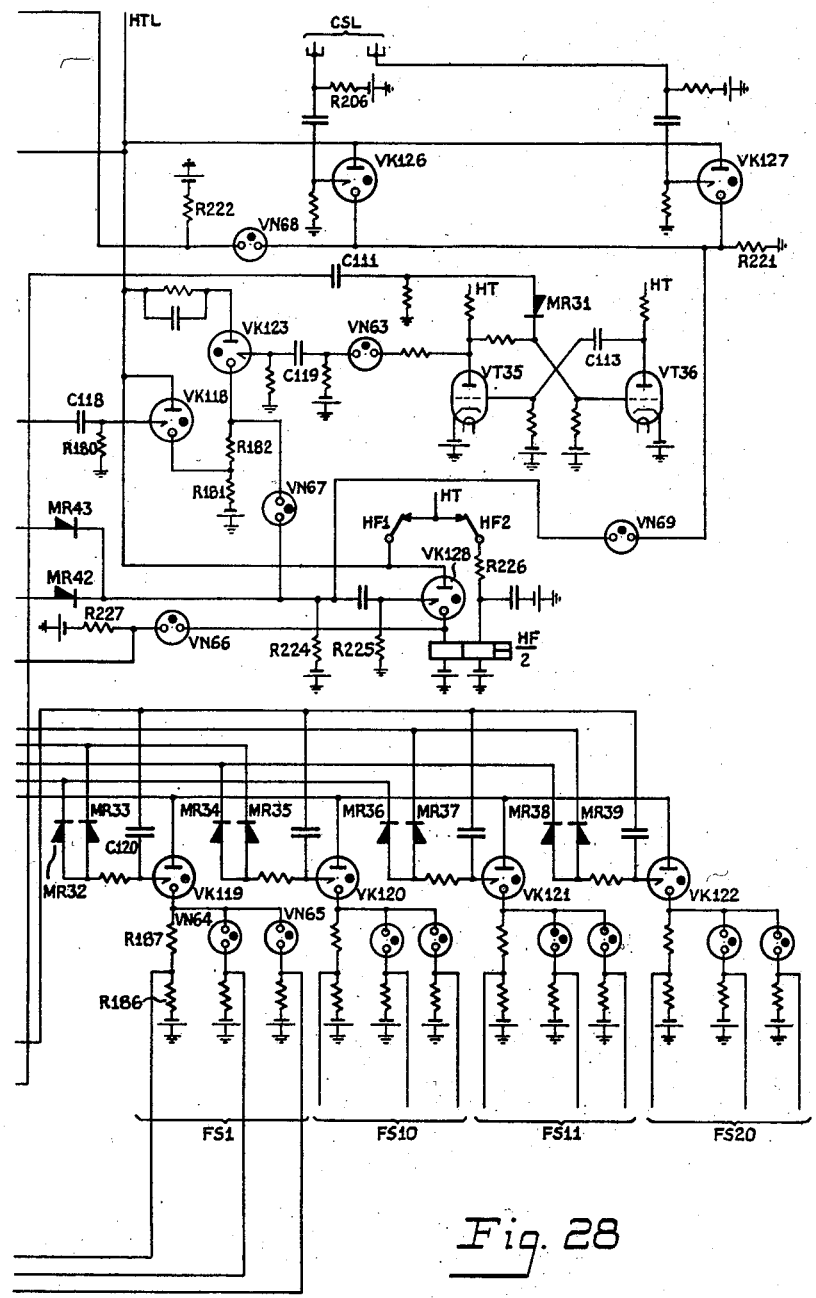

Referring now to the circuit diagram comprising Figs. 15 to 17 the V. F. signal applied from the group selector common control circuit over lead GTL to test whether the group selector is free, is transmitted by way of the register, register connector and trunk relay set to the grid of a thermionic amplifier associated with the trunk from the calling trunk relay set. There are 100 of these amplifiers associated with the 100 trunks 1TK to 100TK. The ten tubes represented by VT45, VT46, are associated with primary switch P1 and other sets of ten tubes are provided for the other primary switches.

Assuming that the trunk relay set taken into use by the line finder/final selector is one associated with the primary switch P1 and is connected to the first trunk incoming to that switch, a V. F. signal over the appropriate lead GTL is applied via capacitor C130 to the grid of tube VT45. If the primary switch is free, tube VT45 is suitably biased so that the V. F. signal is amplified and a signal from the anode of the tube is returned over lead GSL to inform the group selector common control that the group selector is free. A V. F. signal is also applied from the anode of tube VT45 to the trigger electrode of tube VK130, via capacitor C131. This is the first of the EC tubes VK130, VK131 and so on, which operate the select magnets of primary switch P1.

Tube VK130 is already primed by the earth connection to its trigger electrode over resistor R190 and the tube therefore fires on receipt of the V. F. pulse. The firing of any of the ten tubes VK130, VK131 and so on, fires the associated diode e. g. VN70 in the case of tube VK130, in series with the common cathode resistor R191 and resistor R192 connected in parallel with R191 by rectifier MR45. The rise in voltage at the junction point of rectifier MR45 and resistor R192 raises the cathode potential of the ten V. F. amplifying tubes VT45, VT46 and so on and these tubes are thereby biased off to indicate that primary switch P1 is being set up.

The rise in potential at resistor R191 applies a pulse via capacitor C132 to the trigger electrode of the free link marking tube VK132 which is primed by an earth connection over resistor R193. The tube fires and the rise in potential at its cathode tests for a free link and applies a priming bias to each secondary switch select magnet operating tube associated with a free link. The links that are free will be characterised by an unoperated bridge magnet in the primary switch and the test is therefore made by way of the break contacts of the primary switch bridge magnets.

For the switch P1, these contacts are denoted by 1BM1(P1) to 20BM1(P1), and if one or more of these is closed, a path or paths will be available from the cathode of tube VK132 for striking the appropriate diode of the series VN71, VN72 and so on via the corresponding link to negative battery over the resistor connected to the corresponding secondary switch select magnet operating tube. For example, if the first link from switch P1 is free, tube VN71 strikes over the circuit: cathode of tube VK132, contacts 1BM1(P1), tube VN71, link 1LK, resistor R194 to negative battery. The rise in potential across resistor R194 primes the VK133, which is the first of the series of ten select magnet operating tubes in switch S1. Similarly, if any other links available to switch P1 are free, corresponding select magnet operating tubes in the other switches S2 to S20 will be primed.

Each secondary switch has an associated tube whose purpose it is to mark free outgoing trunks. Tube VK135 in switch S1 is such a tube. The trunk marking tube in each secondary switch associated with a free link from the primary switch in use is arranged to be fired at the same time as the link is marked. In the case of the link between switches P1 and S1, a path is available from the cathode of tube VK132 via normal contacts 1BM1(P1), diode VN73, resistor R195 to negative battery for striking diode VN73, and when this tube strikes, a pulse is applied via capacitor C133 to the trigger electrode of tube VK135. Similarly for any other free links from switch P1, tubes in the series VN73, VN74 and so on, would fire and apply a pulse to the trunk marking tube in the corresponding secondary switch. Tube VK135 is primed by connection to the potential divider comprising resistors R196 and R197 connected between the H. T. supply and negative battery and on the receipt of a pulse the tube fires.

The firing of tube VK135 and corresponding tubes in other secondary switches tests all the trunks from the appropriate secondary switches over the break contacts of the secondary switch bridge magnets. If one or more outgoing trunks from a secondary switch associated with a free link is free, the corresponding bridge magnet will be unoperated and a path will be available for striking the diode associated with the break contacts of the bridge magnet. For example, if the first bridge magnet of secondary switch S1 is unoperated, the diode VN75 will strike over the path: cathode of tube VK135, normal contacts 1BM1(S1), tube VN75, lead FML and a resistor such as R198 (Fig. 11) in the appropriate line finder/final selector secondary switch.

The firing of tube VK135 and corresponding tubes in other secondary switches also primes tubes associated with the secondary switch bridge magnet operating tubes. In the case of secondary switch S1, tube VN76 strikes to negative battery in series with resistor R200 and the rise in potential at this resistor applies a priming bias to the trigger electrode of the 20 secondary switch bridge magnet priming tubes VK137, VK138 and so on via resistors such as R201.

Meanwhile, the line finder/final selector has received a marking from the group selector common control circuit giving an indication of the wanted line and if a free path is available through the switch to one or more of the calling incoming trunks, the marking bias applied over the appropriate lead or leads FML results in a pulse being returned from the line finder/final selector over a lead GPL to the group selector. It is possible that in the line finder/final selector marked by the group selector common control, all five incoming trunks are marked as being free by the group selector, but only one of these trunks will be chosen by the line finder/final selector and a pulse is returned to the group selector over the corresponding lead GPL.

The pulse will be applied to the trigger electrode of the bridge magnet marking tube associated with the selected free trunk via a capacitor such as C134 and the appropriate primed tube will fire. Assuming that tube VK137 is the one which has struck, the rise in potential across the common cathode resistor R202 will bias off the remaining 19 priming tubes and the diode VN77 will strike in series with resistor R203, applying a priming bias to the trigger electrode of the bridge magnet operating tube VK139.

The firing of a secondary switch bridge magnet priming tube applies a pulse from the common cathode resistor R202 to the trigger electrodes of all the select magnet operating tubes VN133, VN134 and so on, of the secondary switch via capacitors such as C135 and the one associated with the marked free link will fire, being previously primed from the calling primary switch. At the same time a bias will be applied from resistor R202 via rectifier MR46 to the junction point of resistors R204 and R205 in the cathode circuit of the free outgoing trunk marking tube VK135, to bias off this tube and prevent it from firing in the event of another primary switch being taken into use during the setting up of the pending connection.

The rise of potential at resistor R202 also applies a pulse to the time delay one-shot circuit PD5, which, after a delay of about 60 ms. applies a pulse to a second time delay circuit PD6 and also to the trigger electrodes of the 20 secondary switch bridge magnet operating tubes VK139, VK140 and so on, via capacitors such as C136. The bridge magnet operating tube which is already primed will fire and in due course the corresponding bridge magnet will operate. The object of introducing a 60 ms. delay is to give the select magnet of the switch time to operate before a bridge magnet is energised.

The firing of a select magnet operating tube in the secondary switch, e. g. tube VK133, causes a biasing voltage appearing at the centre point of the two windings of the select magnet 1SM(S1) associated with the tube to be applied over the link to prime the corresponding primary switch bridge magnet operating tube (VK141). A pulse is also applied from the cathode of tube VK133 via capacitor C137 to strike the diode VN78 momentarily to negative battery over lead CSL to a resistor R206 in the group selector common control circuit. A pulse is also applied back over the link to a pulse delay one-shot circuit PD7 associated with switch P1.

After about 60 ms. a pulse is repeated from circuit PD7 to the trigger electrodes of the 20 bridge magnet operating tubes VK141, VM142 and so on, via capacitors such as C138 and the one which has been primed by a secondary switch bridge magnet operating tube now fires. It will be recalled that the primary switch select magnet associated with the calling trunk relay set has already been energised and the bridge magnet of the selected link will operate in due course. A pulse from the delay circuit PD7 is also applied to the delay circuit PD8.

The delay circuits PD6 and PD8 in the primary and secondary switches involved in the call are arranged to repeat a pulse after about 100 ms. This gives the bridge magnet in each switch time to operate and to complete holding circuits for themselves over their make contacts to earth over the bridge commons associated with the p-wire (e. g. contacts 1BM2(P1) and 1BM2(S1) respectively). After the delay period, circuit PD6 applies a pulse via capacitor C139 to the trigger electrode of tube VK143. This tube is already primed by an earth connection over resistor R207 and fires to operate relay HC. Contacts HC1 disconnect the H. T. supply from all tubes in the switch except the trunk marking tubes VK135, VK136 and so on, which are supplied from the common control circuit via lead HTL. Also contacts JC2 of relay HC disconnect a pre-energizing circuit for the left-hand winding of the relay. The discharge of capacitor C140 through this winding maintains the relay operated until tube VK143 has de-ionized, after which the relay releases and connects the H. T. supply to the switch again.

A pulse from the delay circuit PD8 strikes tube VK144 and relay HD operates to disconnect, in a similar manner to that described for the secondary switch, H. T. from the cold cathode tubes of the primary switch, with the exception of the link marking tubes VK132 and so on, which are supplied from the common control circuit over lead HTL. When tube VK144 fires, the diode VN79 strikes in series with resistor R191 and a bias is applied thereby to the cathode of tube VT45 to prevent the switch from being seized while the H. T. supply is disconnected.

The operation of primary and second bridge magnets extends the + and —ve conductors of the calling line to the appropriate incoming trunk of a line finder/final selector secondary switch.

*Line finder/final selector and control-incoming call*

When the line finder/final selector common control is free to accept an incoming call, a pulse is received from the group selector common control over lead ICP as previously explained. This pulse is applied to a reset pulse repeater circuit PR20 and also to the grid of tube VT56 which is one of the pair of tubes VT55 and VT56 comprising a binary circuit which controls the gate circuit GC1. At the instant the pulse is applied to tube VT56, tube VT55 will be conducting (for reasons which will appear presently) and tube VT56 will be biased off due to the reduced anode voltage of tube VT55. The application of the pulse increases the grid potential of tube VT56 sufficiently to cause the tube to conduct and a negative pulse is applied from the anode of this tube via capacitor C165 to the grid of tube VT55 to bias off the latter tube. The rise in potential at the anode of tube VT55 when it stops conducting is applied to the grid of tube VT56, which now remains conducting. Tube VN100 strikes in series with resistors R235 and R236 and a bias is applied to one gating lead of the gating circuit GC1. This circuit comprises the two tubes VT57 and VT58 and is arranged so that the bias on one of these tubes is altered depending on the condition of the binary circuit comprising tubes VT55 and VT56. The bias applied to the grid of tube VT57 from resistor R236 via resistor R237 is such that a pulse applied to the tube via capacitor C166 is transmitted from the anode via capacitor C167. A pulse applied to the grid of tube VT58 at this time would not be repeated at the anode because this tube is biased from negative battery over resistors R238 and R239.

When tube VN100 strikes, a bias is also applied to the grids of tube VT59, VT60, VT61 and VT62, which all conduct. When tube VT59 starts conducting, a long pulse induced into the battery-connected winding of transformer TR1 is applied to all the subscriber's line circuits SLC in the 500-line group, where it renders rectifier MR1 conducting and simulates the subscriber calling condition. Tubes VT60, VT61 and VT62 in conducting reduce the anode voltage of the associated multi-cathode tubes VMK1, VMK2 and VMK3 respectively and these latter tubes are extinguished. The hundreds, tens and units pulse and bias supply is therefore cut off.

Meanwhile the pulse repeater PR20, which has a common cathode resistor with repeaters PR3 and PR6, has repeated the pulse from lead ICP to the reset circuit MR0, which, as previously described, changes state on receipt of a pulse via capacitor C43 and relay HA in the anode circuit of tube VT2 is momentarily released. The H. T. supply to the common control and subscriber's line circuits is thereby temporarily disconnected. If the line finder/final selector common control circuit is marked busy by a potential on lead FSB when the group selector common control circuit is attempting to strike the marking tube appropriate to the required 500-line group, the pulse received over lead ICP as soon as the bias is removed from lead FSB will be repeated by circuit PR20 and will coincide with the reset after the common control has finished with the outgoing call.

At the end of the reset period, a pulse from the anode of tube VT4 is applied to the pulse delay circuits PD9, PD10 and PD11. These circuits are similar to circuit PD1 with the exception of circuit PD9, the first tube of which receives a priming bias from resistor R235 when tube VT55 is cut off. After a delay of about 500 ms. the pulse is repeated from circuit PD9 to the trigger electrode of the 10 units marking tubes VK165, VK166 and so on, via capacitors such as C168 and to the trigger electrodes of the 10 tens marking tubes VK167, VK168 and so on, via capacitors such as C169 and also to the trigger electrodes of the 5 hundreds marking tubes such as VK169.

A priming bias is extended from the group selector common control circuit over one lead in each of the groups HDL, TDL and UDL to one tube in each of the series VK169 and so on, VK167 and so on and VK165 and so on. On receipt of a pulse from circuit PD9, the tube which is primed in each of these series strikes. From the cathode of the tube in the series VK167, VK168 and so on, which has struck, a priming bias is applied to the corresponding tube in the 5 tens pulse distributing circuits of which the first, comprising the pulse repeating tubes VK2, VK3 and so on, is shown. The one of the 5 tubes such as VK169 which has fired applies a bias from its cathode to the grid of the associated thermionic tube e. g. VT1. From the cathode of the tube in the series VK165, VK166 and so on, which has struck, a priming bias is applied via the cross-connection field of the I. D. F. to the trigger electrodes of all the line calling tubes such as VK1 which are associated with the former tube.

After a delay of about 2 ms. circuit PD10 repeats the pulse from the reset circuit MRO to the grid of tube VT57 in circuit GC1 via capacitor C1166. A negative pulse is transmitted from the anode of tube VT57 via capacitor C167 to the pulse inverting circuit PC1, which applies a positive pulse to the grids of the 5 tubes such as VT1 via capacitors such as C3. The tube which has been biased repeats the pulse from its cathode to the trigger electrode of the 10 tubes of the associated tens pulse distributing circuit, e. g. tubes VK2, VK3 and so on via capacitors such as C6. The tube in this series which has been primed now strikes and from its cathode a pulse is applied via the cross-connection field of the I. D. F. and capacitors such as C1 to the rectifiers such as MR1 in the 10 subscriber's line circuits with which the tube is associated.

Rectifier MR1 and corresponding rectifiers in all the other subscriber's line circuits in the 500-line group are conducting due to the long pulse applied from transformer TR1 and the coincidence of a pulse via capacitor C1, rectifier MR1 and capacitor C9 and the bias via resistor R19 at the trigger electrode of the line calling tube VK1 of the wanted subscriber's line causes this tube to fire unless the subscriber's line is busy, in which case rectifier MR1 will be biased off by the high voltage applied from lead 18 over contacts K3 operated. If tube VK1 strikes, the condition of the subscriber's line circuit now simulates that of a subscriber calling and a test is made for a free path through the line finder/final selector unit in the manner similar to that already described.

Tube VK1 in firing increases the potential at resistor R2 and this biases off tube VK170. A pulse from resistor R2 is applied to the pulse repeater circuit PR5 which repeats the pulse to the time throw-out one-shot circuit TTO. After a delay, a pulse is repeated from circuit TTO to pulse repeater circuit PR6 which repeats the pulse to the reset circuit MRO. If the common control circuit has not by that time selected a path through a line finder-final selector unit and reset itself, the pulse applied from circuit TTO to circuit MRO causes the common control to be reset.

The rise in potential at resistor R2 is applied as a bias via rectifier MR65 to lead FSB which extends to the group selector common control circuit and indicates that the line finder/final selector common control circuit is busy. This bias, however, has no effect on the present call. A pulse from resistor R2 is also applied to the trigger electrodes of tubes VK25 and VK26, via capacitors C18 and C19 respectively. The bias existing on lead ICW primes tube VK26 but biases off tube VK25 and on the application of a pulse tube VK26 only fires. From its cathode a bias is applied to the gating lead of the incoming hunt repeater circuit IHR, to the incoming test repeater circuit ITR and to the trigger electrode of the repeating tube VK171.

*Busy conditions*

A pulse is applied to the trigger electrode of tube VK171 via capacitor C171 from circuit TTO in the event of a free path not being available through a line finder/final selector unit and the tube is struck. A pulse is repeated from the cathode resistor R243 of tube VK171 to the group selector common control circuit via lead LSB to indicate that a busy condition exists. 3 ms. after receiving the pulse from circuit MRO, circuit PD11 repeats the pulse to the trigger electrode of tube VK170 via capacitor C172. This tube is already primed from the earth connection over resistor R244 and will strike on receipt of a pulse unless it is biased off from resistor R2. In the event of the line calling tube VK1 not having struck because the wanted subscriber's line is busy, no bias will be applied to the cathode of tube VK170 from resistor R2 and the striking of the latter tube causes the diode VN103 to strike in series with resistor R243 and a pulse to be applied to the group selector common control over lead LSB to indicate that the wanted subscriber's line is busy.

Supposing that a free path is available and that the wanted subscriber's line circuit is free, when a test has been made and a free link found, tubes VK8 and VN6 fire and test for a free trunk to a trunk relay set as previously described. A pulse will be applied via unoperated secondary switch bridge magnet contacts and capacitors C16, C17 and so on, to the trigger electrodes of tubes in the series VK9, VK12 and so on associated with free trunks. Tubes in the series VK9, VK10 and so on, which are associated with free outgoing trunks will be primed from the corresponding trunk relay set over leads TB and these will fire on receipt of the pulse. One or more tubes in the series VK11, VK12 and so on will be primed by a bias over a lead or leads FML from a group selector and will also fire on receipt of the pulse.

Assuming that tube VK11 has fired, the associated diode VN9 strikes in series with resistor R240 and backs off the corresponding tube VK37 of the series VK37, VK38 and so on. The priming bias from resistor R240 is applied to the trigger electrode of the corresponding tube VK23 of the series VK23, VK24 and so on, over resistor R241. Diode VN13 also strikes in series with resistor R34 and a pulse is thereby applied to the pulse repeating circuit ITR. The pulse is repeated to the trigger electrodes of all the primary switch select magnet priming tubes in the series VK19, VK20 and so on via capacitors such as C22 and the tube which is primed from the subscriber's line circuit fires on receipt of the pulse. The tube which fires applies a pulse to the trigger electrodes of the two priming tubes VK21 and VK22 associated with the double group switching select magnets of the primary switch and the one which is primed from the subscriber's line circuit fires on receipt of the pulse. When one of these tubes fires the pulse is applied from the common cathode resistor R48 to the outgoing and incoming hunt repeater circuits OHR and IHR. The gating lead of circuit IHR is biased from the cathode circuit of tube VK26 and the pulse from resistor R48 will be repeated from circuit IHR to the hunting circuit comprising tubes VK37, VK38 and so on.

This hunting circuit functions in the same way as that comprising tubes VK13, VK14 and so on which has been previously described. A test is made of the secondary switch bridge magnet priming tubes VK23, VK24 and so on and the first one which is primed now fires. Assuming that tube VK23 has fired, diode VN102 strikes in series with resistor R242, and a priming bias is thereby applied to the trigger electrode of the corresponding secondary switch bridge magnet operating tube. Diode VN103 also fires in series with resistor R53 and a pulse is thereby applied to the pulse repeater circuit PR1. A pulse is returned over a lead GPL from the cathode circuit of the conducting tube to indicate which trunk has been selected. The setting up of a connection now proceeds as for an outgoing call.

When the common control circuit has set up the call the reset circuit is operated as previously described and a pulse is received from the group selector common control over lead LCC which causes tube VT55 to conduct and VT56 to be cut off. Tube VN104 fires and tube VN100 extinguishes, changing the state of the gating circuit GC1 so that pulses from the multivibrator circuit MU1 are again passed by tube VT58.

The operation of a bridge magnet in the primary and secondary switches which have been marked, completes the connection between the calling and called subscriber's lines.

We claim:

1. In a telephone system, a switching stage comprising a plurality of crossbar switches, gas-filled discharge tubes having an ionizing electrode, an anode and a cathode, magnets for effecting the operation of said switches, each magnet included in the anode-cathode circuit of one of said tubes, high speed control equipment common to crossbar switches of said stage, means in said control equipment for determining over which crossbar switch a connection is to be set up, means in said control equipment for determining which magnets of the selected crossbar switch are to be operated and for applying a priming potential to the gas-filled discharge tubes in the anode-cathode circuits of which said magnets of the selected crossbar switch are included and means controlled by said control equipment upon the selection of the crossbar switch for applying ionizing potentials to the gas-filled discharge tubes whereby the magnets are operated by current flow through said tubes in circuits which are local to the selected crossbar switch.

2. A switching stage as claimed in claim 1 wherein said crossbar switches each include a hold conductor and each bridge magnet of said crossbar switches is provided with an energizing winding and a holding winding, the energizing winding being connected in series with a gas-filled discharge tube while the circuit for said holding winding is completed over bridge magnet contacts to the hold conductor.

3. A switching stage as claimed in claim 1 and comprising, in addition, in each crossbar switch, first and second control gas discharge tubes and a pulse generator, means in said control equipment responsive to the selection of a crossbar switch and the selection of the magnets of the selected crossbar switch for applying an ionizing potential to said first control gas discharge tube whereby said tube is momentarily ionized, means responsive to the momentary ionization of said tube for applying a potential to said pulse generator whereby said pulse generator is energized to apply an ionizing potential to the gas discharge tubes in the anode-cathode circuit in which said magnets of the selected crossbar switch are included and to said second control gas discharge tube to cause said gas discharge tubes and said second control gas discharge tube to ionize and means responsive to the ionization of said second control gas discharge tube for preventing further momentary ionization of said first control gas discharge tube.

4. In a telephone system comprising a plurality of switching stages, each consisting of primary crossbar switches and secondary crossbar switches, inlets to said primary crossbar switches and link circuits between outlets of the primary crossbar switches and inlets of the secondary crossbar switches, gas-filled discharge tubes having an ionizing electrode, an anode and a cathode, magnets for effecting the operation of said crossbar switches, each magnet being included in the anode-cathode circuit of one of said tubes, high speed control equipment common to primary and secondary crossbar switches of a switching stage, means in said control equipment for marking all available paths from an inlet of a primary switch to the secondary switches by applying priming potentials to the gas discharge tubes controlling the magnets of the crossbar switches concerned with said available paths for selecting and for applying ionizing potentials to the gas discharge tubes controlling the magnets of the crossbar switches concerned with the selector path whereby the magnets are operated and the path completed through the switching stage on the ionization of said last mentioned gas discharge tubes.

5. In a telephone system, a switching stage comprising a plurality of switching units each having at least one primary crossbar switch and one secondary crossbar switch, subscribers' line circuits each connected to corresponding individual crosspoints of the primary switches in all the switching units, inlets for the secondary switches each multipled to corresponding crosspoints in all the bridges of the secondary switches, links extending between the bridges of the primary switch of each switching unit and the inlets of the corresponding secondary switch, outlets for the secondary switches connected to the bridges thereof, gas-filled discharge tubes in said switches each having an ionizing electrode, an anode and a cathode, select and bridge magnets for said switches, each magnet being connected in the anode-cathode circuit of one of said tubes, high speed control equipment common to all the switching units, means in said control equipment responsive to the application of a potential from a subscriber's line circuit to the corresponding inlets of the primary switches of all the switching units for applying priming potentials to the gas discharge tube in each of the primary crossbar switches which controls the select magnet in each switch as determined by the crosspoint in each switch to which said corresponding inlets are connected, for applying priming potentials to the gas discharge tube in each of the secondary switches which controls the select magnet in each of the secondary crossbar switches which corresponds to the link extending from the primary crossbar switch bridge including said crosspoint and for testing the outlets of the secondary switches, means responsive to the finding of an available outlet for applying a priming potential to the gas discharge tube which controls the bridge magnet of one of the secondary switches to which the selected outlet is connected, means in the one switching unit giving access to the selected outlet for applying an ionizing potential to the gas discharge tubes controlling the said primary switch select magnet and the said secondary switch select magnet of said one switching unit and for applying a delayed ionizing potential to the gas discharge tube controlling the said secondary switch bridge magnet and to the gas discharge tube controlling the primary switch bridge magnet of the bridge which includes said crosspoint and means responsive to the ionization of the gas discharge tube of said secondary switch select magnet for applying a priming potential to said primary switch bridge magnet.

6. A switching stage as claimed in claim 5 wherein the means for testing the outlets of the secondary switches comprises a hunting circuit having a plurality of stages corresponding in number to the number of outlets and each stage having at least two gas-filled discharge tubes.

7. In a telephone system, a group selecting stage comprising primary and secondary crossbar switches having select and bridge magnets, brides in each crossbar switch, each bridge being controlled by one of said bridge magnets, inlets and outlets to said primary and secondary crossbar switches, each inlet of the primary and secondary crossbar switches being controlled by one select magnet by multiplying the inlet across the bridges and each outlet being connected to one bridge, link circuits connecting the outlets of a primary crossbar switch to inlets of different secondary crossbar switches, gas-filled discharge tubes having an ionizing electrode, an anode and a cathode, each of said select magnets and each of said bridge magnets of the primary and secondary crossbar switches being connected in the anode-cathode circuit of one of said tubes, means responsive to the seizure of an inlet to a primary crossbar switch for striking the gas-filled discharge tube of the select magnet of said inlet, means responsive to the striking of said gas-filled discharge tube for priming the gas-filled discharge tubes of a select magnet of each of said different secondary switch over available link circuits, means for selecting an available outlet from one of said secondary switches, for priming the gas-filled discharge tube of the bridge magnet of said one secondary switch to which said outlet is connected and for striking the primed gas-filled discharge tube of the select magnet of said one secondary switch to which is connected the link circuit over which the secondary switch is seized, means for striking the gas-filled discharge tube of said bridge magnet of said one secondary switch, means responsive to the striking of said last-mentioned gas-filled discharge tube for priming the gas-filled discharge tube of the bridge magnet of the primary switch to which is connected the link circuit extending to said one secondary switch and means for striking the gas-filled discharge tube of said bridge magnet of said primary switch.

8. A group selecting stage as claimed in claim 7 and including a first pulse delay circuit, means responsive to the selection of an available outlet from one of said secondary switches for applying a pulse to said first pulse delay circuit, the output from said first pulse delay circuit striking the gas-filled discharge tube of said bridge magnet of said one secondary switch.

9. A group selecting stage as claimed in claim 8 and including an energizing winding and a holding winding for each of said bridge magnets, a single winding for each of said select magnets, the energizing winding of a bridge magnet and the single winding of a select magnet being connected in the circuit of the associated gas-filled discharge tube, a second pulse delay circuit to which a pulse is delivered from said first pulse delay circuit, means responsive to a pulse delivered by said second pulse delay circuit for extinguishing the conducting discharge tubes of the magnets of the secondary switch thereby to release the select magnet and means for maintaining the operated bridge magnet over said holding winding.

10. A group selecting stage as claimed in claim 9 and including a third pulse delay circuit to which a pulse is delivered from said second pulse delay circuit, means responsive to a pulse delivered by said third pulse delay circuit for extinguishing the conducting discharge tubes of the magnets of the primary switch thereby to release the select magnet and means for maintaining the operated bridge magnet over said holding winding.

11. A switching stage as claimed in claim 6 and comprising, in addition, means responsive to the ionization of one tube in a stage of said hunting circuit corresponding to an available outlet for energizing a pulse generator and for applying a priming potential to the gas discharge tube which controls said bridge magnet of said one secondary switch.

12. A switching stage as claimed in claim 11 and comprising a pulse delay circuit and means responsive to the energization of said pulse generator for applying an ionizing potential to said gas discharge tubes controlling the said primary switch select magnet and said secondary switch select magnet of said one switching unit and for energizing said pulse delay circuit.

13. A switching stage as claimed in claim 12 and comprising means responsive to the energization of said pulse delay circuit for applying a delayed ionizing potential to said gas discharge tube controlling the said secondary switch bridge magnet and to said gas discharge tube controlling said primary switch bridge magnet, and for applying a release potential to said control equipment to cause the release thereof.

14. A telephone system as claimed in claim 13 and including an operating winding and a holding winding for each of said bridge magnets, a single winding for each of said select magnets, a second pulse delay circuit energized from said first pulse delay circuit, means responsive to the energization of said second pulse delay circuit for extinguishing the conducting discharge tubes of the magnets of the switches thereby to release the select magnets and means for maintaining the operated bridge magnets over said holding windings.

References Cited in the file of this patent

UNITED STATES PATENTS

| | | |
|---|---|---|
| 2,326,458 | Hall | Aug. 10, 1943 |
| 2,582,959 | Bruce et al. | Jan. 22, 1952 |
| 2,609,454 | Hecht | Sept. 2, 1952 |
| 2,681,386 | Davison et al. | June 15, 1954 |